(12) United States Patent
Fukuda et al.

(10) Patent No.: US 7,436,737 B2
(45) Date of Patent: Oct. 14, 2008

(54) ELECTRIC TIMEPIECE

(75) Inventors: Masami Fukuda, Tokyo (JP); Kiyotaka Igarashi, Tokyo (JP); Shinichi Komine, Tokyo (JP); Ryoji Iwakura, Tokyo (JP); Shigeru Morokawa, Tokyo (JP)

(73) Assignee: Citizen Holdings Co., Ltd., Tokyo (JP)

( * ) Notice: Subject to any disclaimer, the term of this patent is extended or adjusted under 35 U.S.C. 154(b) by 216 days.

(21) Appl. No.: 10/493,898

(22) PCT Filed: Mar. 4, 2003

(86) PCT No.: PCT/JP03/02493

§ 371 (c)(1),
(2), (4) Date: Aug. 30, 2004

(87) PCT Pub. No.: WO03/074976

PCT Pub. Date: Sep. 12, 2003

(65) Prior Publication Data

US 2005/0002277 A1    Jan. 6, 2005

(30) Foreign Application Priority Data

| Mar. 4, 2002 | (JP) | ............ 2002-056936 |
| Jul. 4, 2002 | (JP) | ............ 2002-195391 |
| Oct. 11, 2002 | (JP) | ............ 2002-298163 |
| Nov. 11, 2002 | (JP) | ............ 2002-326388 |

(51) Int. Cl.
*G04B 19/24* (2006.01)
*G04B 19/04* (2006.01)

(52) U.S. Cl. .......................... 368/28; 368/80

(58) Field of Classification Search ............... 368/28, 368/29, 35, 37, 76, 77, 80, 223, 237, 220
See application file for complete search history.

(56) References Cited

U.S. PATENT DOCUMENTS

| 4,449,086 A | | 5/1984 | Hoffmann et al. |
| 4,492,910 A | | 1/1985 | Radacanu |
| 4,843,387 A | | 6/1989 | Arai et al. ............ 340/870.37 |
| 5,298,153 A | * | 3/1994 | Scherzer ............ 208/120.15 |
| 6,038,523 A | * | 3/2000 | Akahane et al. ............ 702/150 |
| 6,088,302 A | | 7/2000 | Nakajima et al. ............ 368/35 |

(Continued)

FOREIGN PATENT DOCUMENTS

EP          874 293          10/1998

(Continued)

*Primary Examiner*—Vit W Miska
(74) *Attorney, Agent, or Firm*—Greer, Burns & Crain, Ltd.

(57) ABSTRACT

An electric watch is characterized by including a transmitting circuit 6 for generating a plurality of transmitted signals, transmitting electrodes 1 and 2 for outputting the output signals generated by the transmitting circuit 6, a signal modulating member 3 composed of a rotor arranged adjacently to the transmitting electrodes 1 and 2 in a non-contact manner for modulating the transmitted signals, a receiving electrode 4 arranged adjacently to the signal modulating member 3 in a non-contact manner for receiving the transmitted signals modulated by the signal modulating member 3, a receiving circuit 7 for amplifying received signals received by the receiving electrode 4, and a detecting circuit 8 for detecting mechanical position information of the signal modulating member 3 based on the received signal amplified by the receiving circuit 7.

25 Claims, 59 Drawing Sheets

U.S. PATENT DOCUMENTS 6,307,814 B1 * 10/2001 Farine et al. .................. 368/80
6,385,136 B2 * 5/2002 Higuchi et al. ................ 368/28
6,473,367 B2 * 10/2002 Peng ........................... 368/47
6,483,321 B2 * 11/2002 Brasseur ..................... 324/660

FOREIGN PATENT DOCUMENTS

| JP | 59-180462 | 10/1984 |
| JP | 63-308514 | 12/1988 |
| WO | WO99/34264 | 7/1999 |

* cited by examiner

Fig. 4
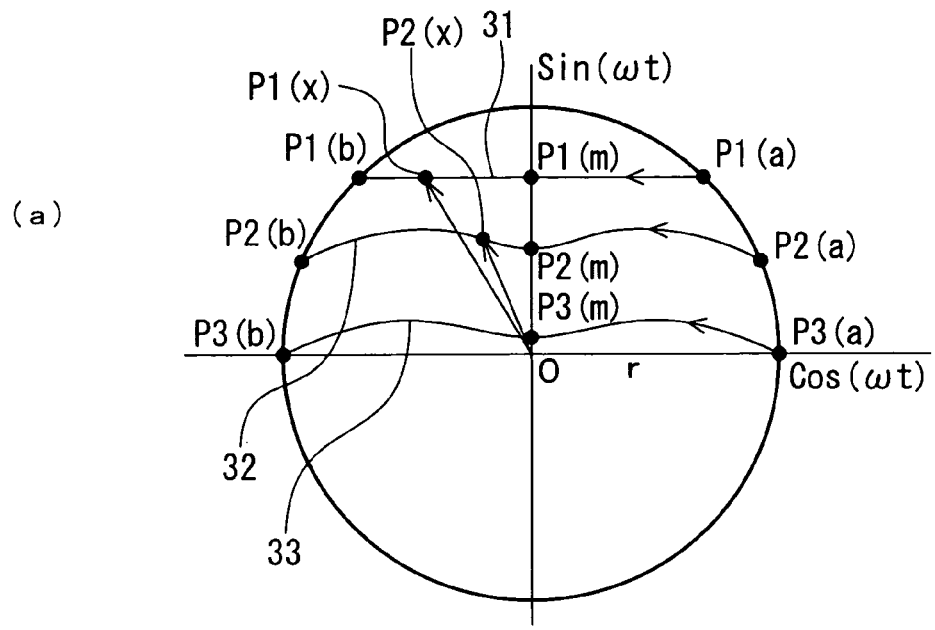
(a)
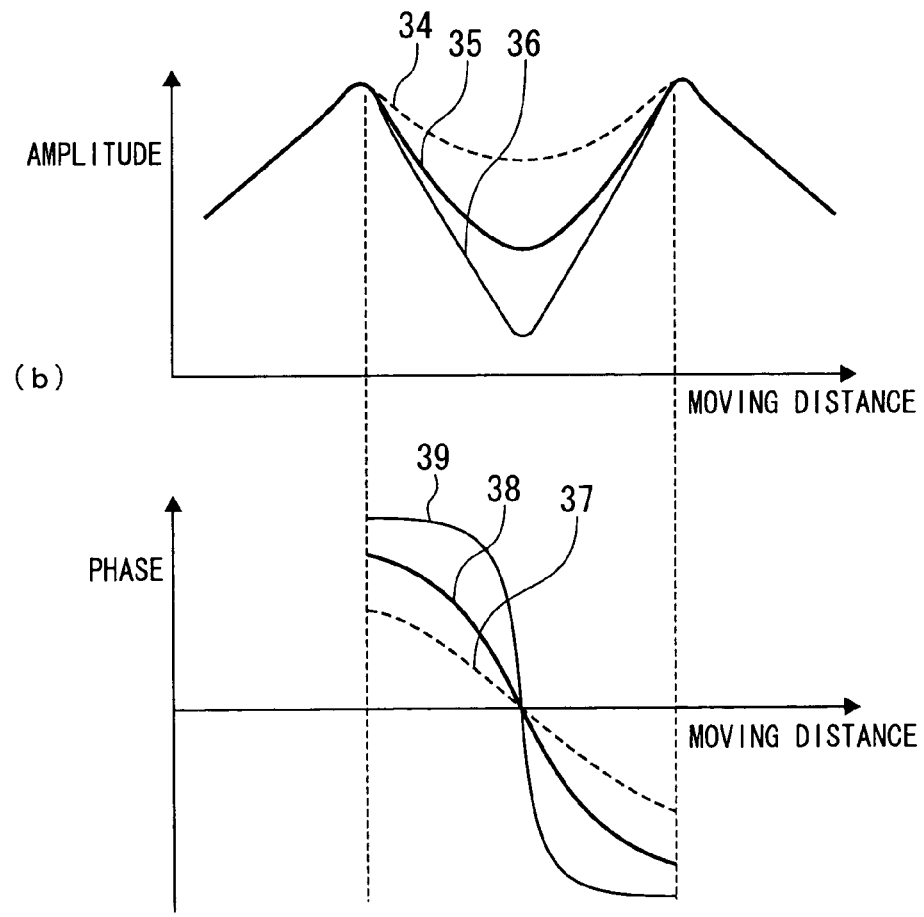
(b)

Fig. 17
(a)
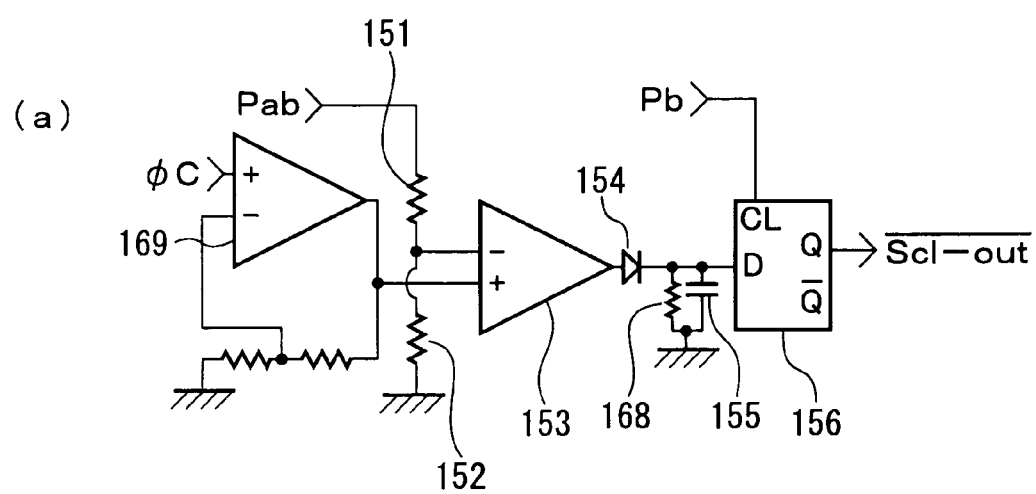
(b)
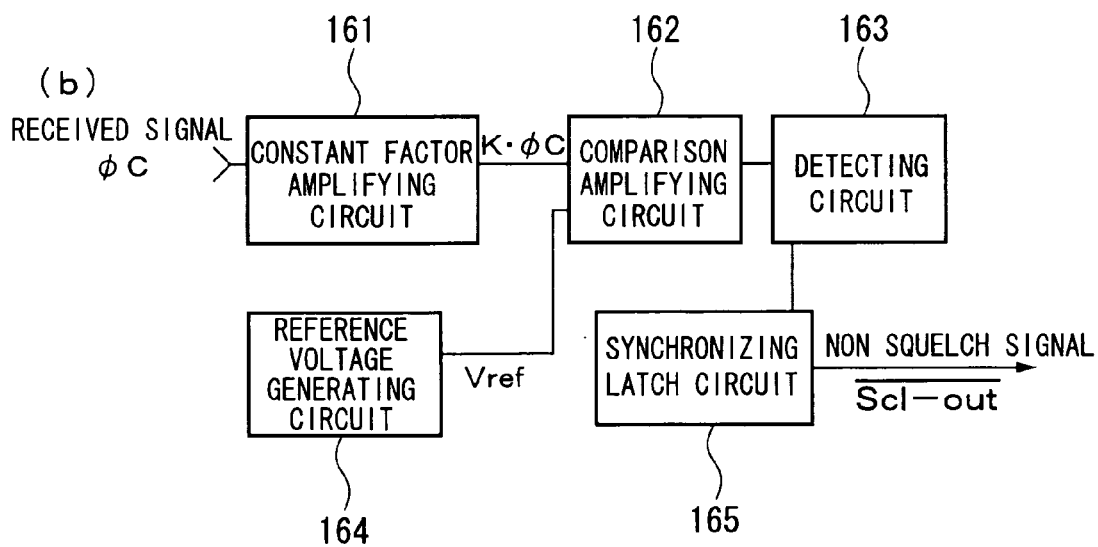

Fig. 19
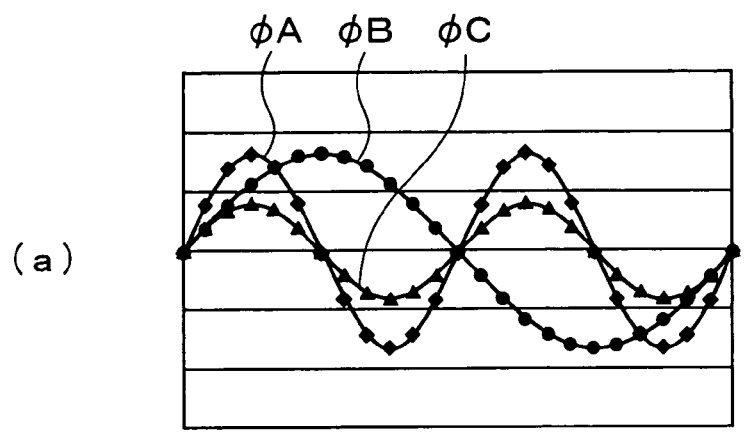
(a)
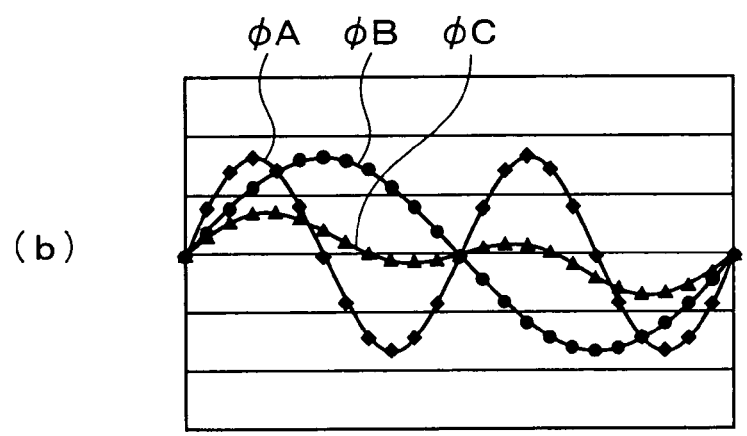
(b)
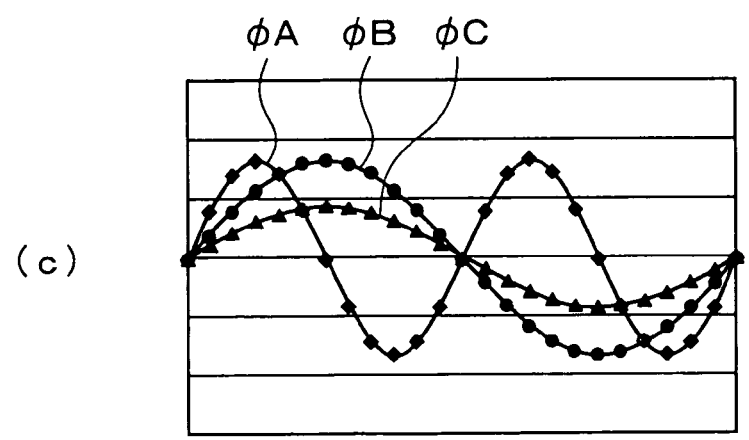
(c)

Fig. 41
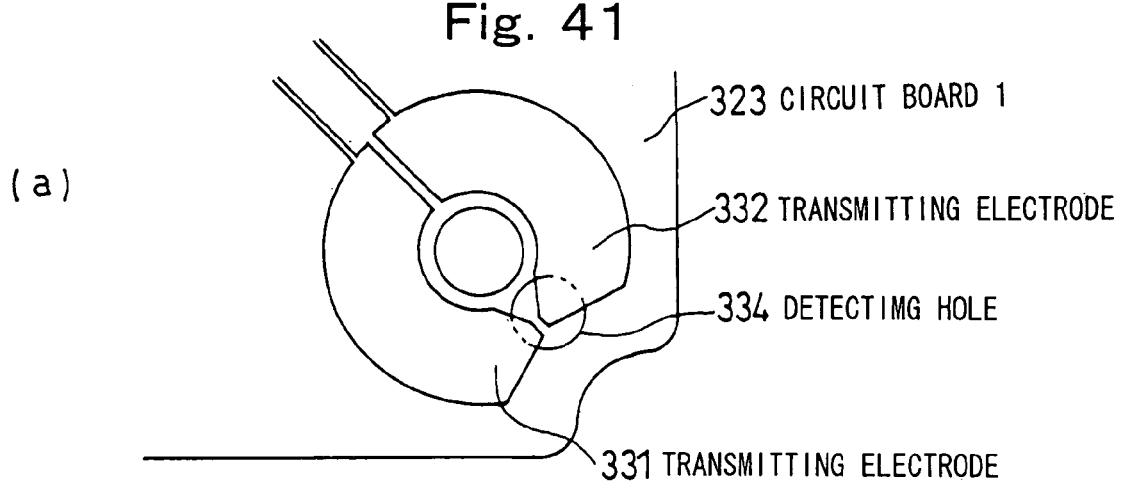
(a)
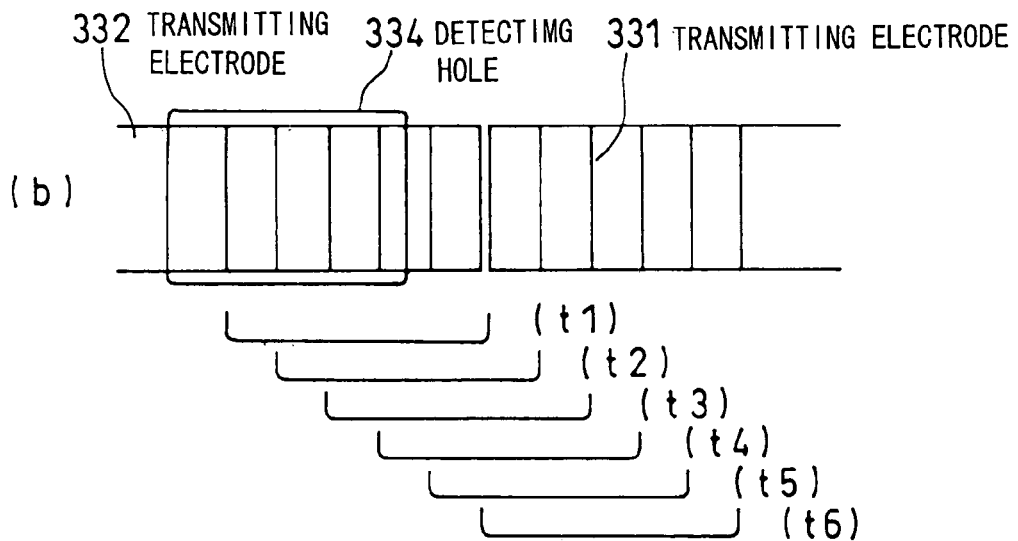
(b)
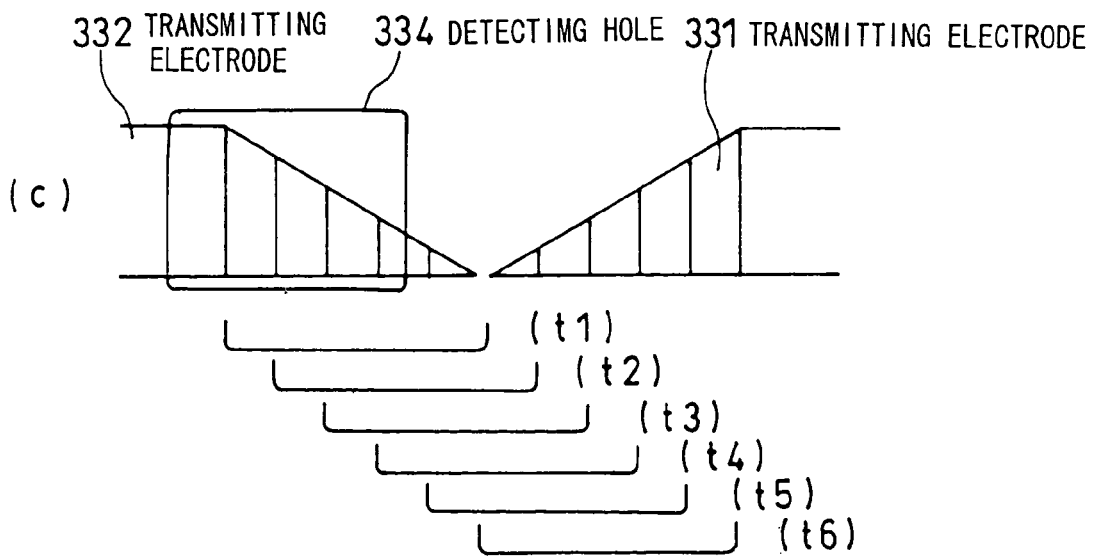
(c)

Fig. 53
(a)
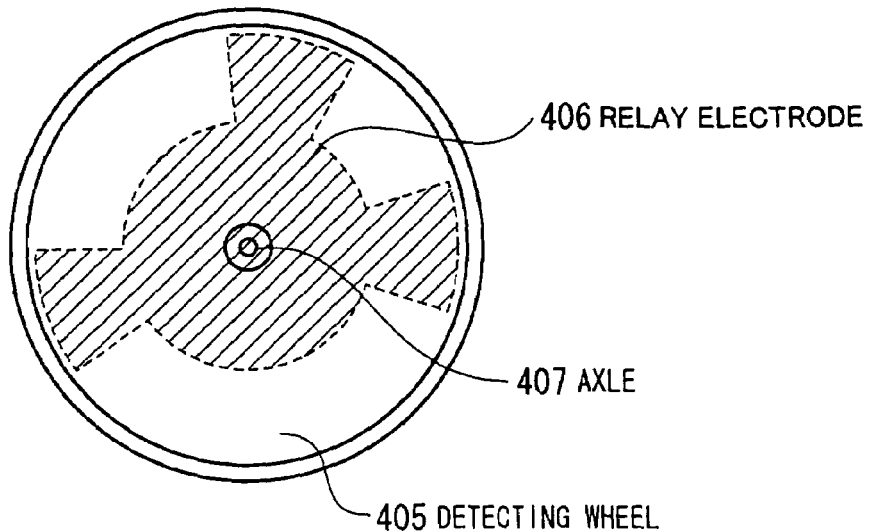
(b)
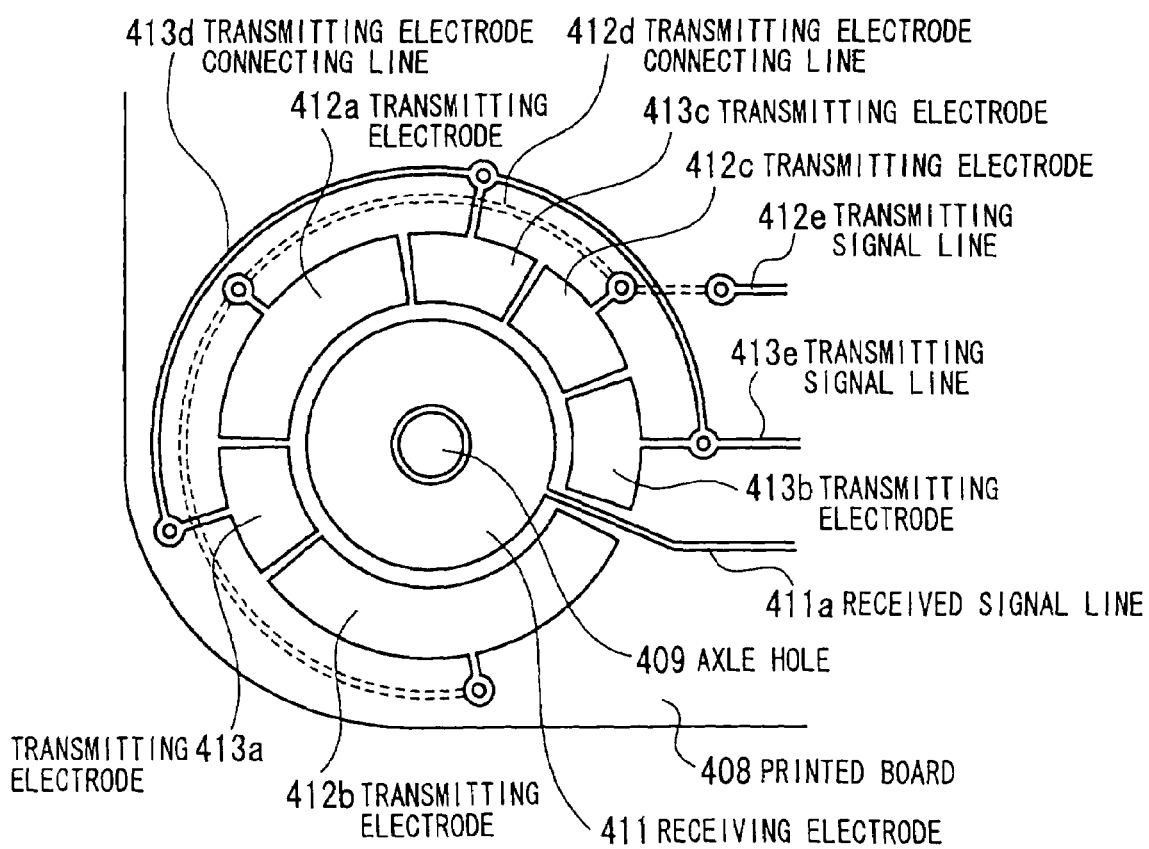

Fig. 57
(a)
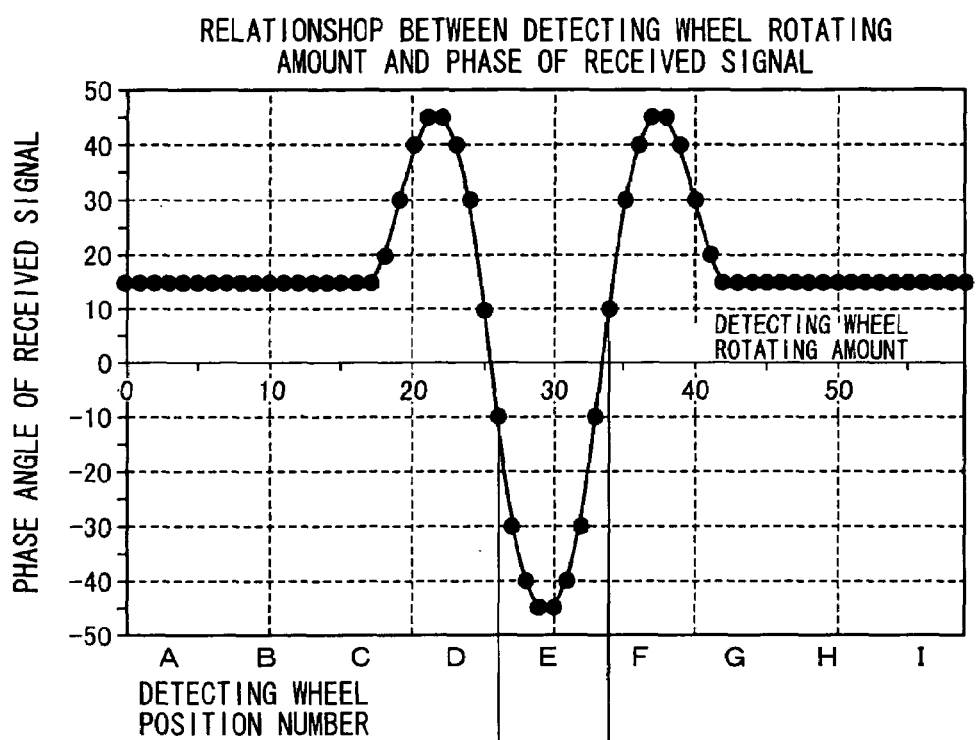
(b)
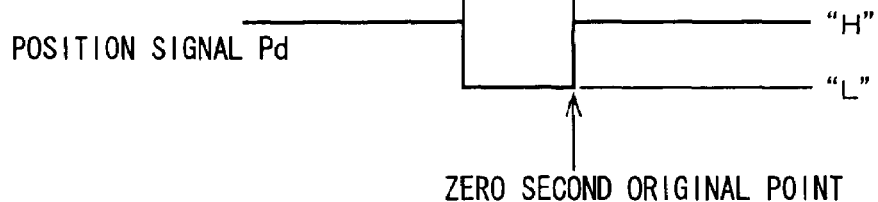

ELECTRIC TIMEPIECE

TECHNICAL FIELD

The present invention relates to an electric watch for mechanically displaying time and calendar information using a quartz oscillating circuit as a reference signal source, which is provided with a position detecting system which detects a rotating angle or a rotating position of a wheel train or the like by detecting an electric field, thereby mechanical mis-operations are preventing from being occurred so as to display correct time information.

BACKGROUND ART

Conventionally, power consumption decreasing techniques for electric watches are established, and small primary batteries are used as power sources of the electric watches. The primary batteries are, however, disposable, and replacement of batteries is troublesome, and it is estimated that terrestrial environmental pollution due to the disposal of the primary batteries becomes more serious problem in the future. In view of such problems, power generating type electric watches, which use secondary batteries charged with power generating energy instead of the primary batteries, are put into practice. The power generating energy is obtained from energy sources such as solar power generation using solar battery, thermoelectric power generation using a temperature difference between an atmosphere and a wrist, and mechanical power generation using a revolution cone.

The power generating type electric watches, therefore, are eco-friendly, but the energy to be built up is not enough, and thus there arises a potential problem that the lack of the charged energy with which the secondary batteries are charged deteriorates reliability of time holding. Particularly in mechanical analog wrist watches, in order to reduce the consumption of the energy as much as possible, a wheel train mechanism is driven by a minimum driving torque. For this reason, when a shape of hands is large, there is a fear that time indication by the hands is shifted due to shock, disturbance, and the like, and in order to prevent this, the shape and size of the hands have a certain limitation.

Further, in a calendar display mechanism of mechanical electric watches for displaying time using mechanical hands, date of a date display section should be corrected manually at the end of the month approximately every two months. For this reason, it is very troublesome and difficult to use the mechanical electric watches. When a complicated mechanism is adopted, a month-end automatic correcting function can be added, but since such a function has a complicated mechanism, the assembly cost becomes high, and the reliability of a stable operation for a long time is deteriorated. Since the power consumption increases, it is difficult to operate in an uninterruptible manner with the charging energy. When only a date section adopts electro-optical liquid crystal display in order to solve this problem, a time display surface provides improper design.

In order to eliminate the above disadvantage, a function for detecting a mechanical angle and a rotating position of hands display and calendar display is necessary. Conventionally suggested techniques are as follows. (1) Japanese Patent Application Laid-Open No. 57-67877 discloses a technique that a mechanical switch is provided to a portion of a rotational wheel train. (2) Japanese Patent Application Laid-Open No. 8-179058 discloses a technique that a light emitting element and a light receiving element are arranged so as to sandwich a rotational wheel train having a hole and the light receiving element detects presence/non-presence of the hole at the time of rotation. (3) Japanese Patent Application National Publication No. 2001-524206 or (4) U.S. Pat. No. 6,307,814 discloses capacity detection in which electronic detecting means detects a change or the like in electric properties including capacity change between electrodes utilizing a rotating member.

Publicly known references relating to the present invention include: (5) Japanese Patent Application Laid-Open No. 54-91278 which discloses a position detecting system which is provided with a mechanically contact switch on a part of a rotational wheel train; (6) Japanese Patent Application Laid-Open No. 2000-35489 which discloses a system where a light emitting element and a light receiving element are arranged so as to sandwich a rotational wheel train having a hole and a light receiving optical switch detects presence/non-presence of the hole at the time of rotation; and (7) Japanese Patent Application Laid-Open No. 54-92360 which discloses a position detecting mechanism adopting capacity detection for detecting a change in a capacity between hands, a wheel train or the like and a position detecting member due to a rotating movement.

The position detecting mechanisms which have been suggested, however, have a lot of disadvantages. The position detection (1) which utilizes the mechanical contact switch mechanism has a constitution where a position is detected by contacting with the rotating movement member such as the wheel train, and thus requires many driving energy. This disadvantage becomes a serious problem particularly for the power generating type electric watches having insufficient power generating energy, and the position detection might cause a shift of the position. Further, the contact switch mechanism causes abrasion of the contact member, and thus reliability is low.

In the constitution (2) utilizing an optical sensor, since it is necessary to arrange the light emitting element and the light receiving element on upper and lower surfaces of a rotating member, a thickness of the watch increases. For this reason, this constitution cannot be adopted to thin wrist watches. Considerable electric power consumption is required to operate optical elements such as the light emitting element and the light receiving element, and thus the detection is carried out only about once a day. Since driving voltage having a threshold value higher than a certain value is necessary for light emission, it is difficult to apply this constitution to power generating electric watches having large fluctuation in a power supply voltage.

In the constitution (3) or (4) where a change in the capacity between the electrodes is directly detected by the rotating member, since a change in the capacity which is detected by a very small position detecting part adaptable to a size of wrist watches is very small, detecting accuracy is low. Further, the detection is easily influenced by external environment such as changes in position, temperature and the like due to carrying postures, and thus the reliability of the position detection is very low.

It is an object of the present invention to provide an electric watch having a position detecting system with high reliability for being capable of securely detecting a time difference between mechanical holding time and electric holding time. The position detecting system of the present invention solves the above problems, does not require a lot of energy, avoids a problem caused by a defective contact or the like due to aged deterioration of a contact type detecting mechanism so as to prevent deterioration of reliability, realizes a constitution thinner than an optical sensor system, does not require a high voltage for driving a light emitting element, and is not influenced by external environment such as temperature as compared with a system for detecting a change in an electrostatic capacity and in an absolute quantity of a magnetic force.

DISCLOSURE OF THE INVENTION

In order to achieve the above object of the present invention, the present invention basically adopts following technical constitutions.

That is to say, a first aspect of a basic constitution of an electric watch having a detecting mechanism for detecting position information of a rotating member to be measured according to the present invention, characterized by including:

a transmitting circuit for generating a plurality of transmitted signals;

a transmitting electrode for outputting output signals generated by the transmitting circuit;

a signal modulating member comprising a rotating member and arranged adjacently to the transmitting electrode in a non-contact manner for modulating the transmitted signals;

a receiving electrode arranged adjacently to the signal modulating member in a non-contact manner for receiving the transmitted signals modulated by the signal modulating member;

a receiving circuit for inputting the received signal received by the receiving electrode; and a detecting circuit for detecting mechanical position information of the signal modulating member based on the received signal input into the receiving circuit.

Further, a second aspect of the basic constitution of an electric watch having a detecting mechanism for detecting position information of a rotating member to be measured according to the present invention, characterized by including:

a transmitting circuit for generating a plurality of transmitted signals;

signal modulating means having a transmitting electrode, to which an output signal of the transmitting circuit is applied, a receiving electrode for receiving signals from the transmitting electrode, and a rotor arranged between the transmitting electrode and the receiving electrode for modulating the transmitted signals output from the transmitting electrode;

a receiving circuit for inputting modulated signals received by the receiving electrodes;

a reference signal generating circuit for generating a reference signal for detecting the position information of the rotor based on the transmitted signals output from the transmitting circuit; and a detecting circuit for comparing the output signals from the receiving circuit with the reference signal from the reference signal generating circuit so as to detect mechanical position information of the rotor.

BRIEF DESCRIPTION OF THE DRAWINGS

FIGS. 4(a) and 4(b) are explanatory diagrams illustrating amplitude and phase properties of a detected signal according to the present invention.

FIGS. 17(a) and 17(b) are a circuit diagram and a block diagram of another noise control circuit according to the first example.

FIGS. 19(a), 19(b) and 19(c) are diagrams for explaining another example of the first example.

FIG. 39(a) is a plan view of the receiving electrode; FIG. 39(b) is a plan view of the detecting wheel; and FIG. 39(c) is a plan view of the transmitting electrode.

FIG. 41 is a diagram explaining a tenth example: FIG. 41(a) is a plan view of the transmitting electrode; FIG. 41(b) is an explanatory diagram when the transmitting electrode of the seventh example is used; and FIG. 41(c) is an explanatory diagram when the transmitting electrode of the tenth example is used.

FIG. 45(a) is a plan view of the receiving electrode; FIG. 45(b) is a plan view of the detecting wheel; and FIG. 45(c) is a plan view of the transmitting electrode.

FIG. 53(a) is a plan view of the detecting wheel according to the fifteenth example; and FIG. 53(b) is a plan view of the transmitting electrode and the receiving electrode according to the fifteenth example.

FIGS. 55(A) to 55(I) are state diagrams at steps of every 400.

FIG. 56(a) illustrates a positional relationship when the received signal is +15°; FIG. 56(b) illustrates a phase relationship when the received signal is +45°; and FIG. 56(c) illustrates a phase relationship when the received signal is −45°.

FIG. 57(a) is a graph illustrating a phase change in the received signal every one second with respect to a rotating amount of the detecting wheel according to the fifteenth example; and FIG. 57(b) illustrates a waveform of a position signal Pd corresponding to the received signal.

FIG. 61(a) is a plan view of the transmitting electrode and the receiving electrode; FIG. 61(b) is a plan view of the relay electrode arranged on the detecting wheel; and FIGS. 61(c) to 61(f) are plan views illustrating a position relationship between the transmitting electrode, the receiving electrode and the transmitting electrode.

BEST NODE FOR CARRYING OUT THE INVENTION

The examples of an electric watch according to the present invention are detailed below with reference to the drawings.

FIRST EXAMPLE

FIGS. 1 to 21 are diagrams for explaining a first example of the present invention.

The first example of the present invention realizes a basic constitution of the electric watch of the present invention. Concretely, the electric watch which has a mechanism for detecting an angle rotating position of a rotating member to be measured includes a transmitting circuit, a transmitting electrode, a signal modulating member, a receiving electrode, a receiving circuit, and a detecting circuit. The transmitting circuit generates a plurality of transmitted signals. The transmitting electrodes outputs the output signals generated by the transmitting circuit. The signal modulating member is arranged approximately to the transmitting electrode in a non-contact manner and is composed of a rotor for modulating the transmitted signals. The receiving electrode is arranged approximately to the signal modulating member in a non-contact manner and receives the transmitted signals modulated by the signal modulating member. The received signal received by the receiving electrode is input to the receiving circuit. The detecting circuit detects mechanical position information of the signal modulating member based on the received signal received by the receiving circuit.

With reference to FIGS. 1 to 5, a basic operation of the present invention is explained below.

Figure 1:
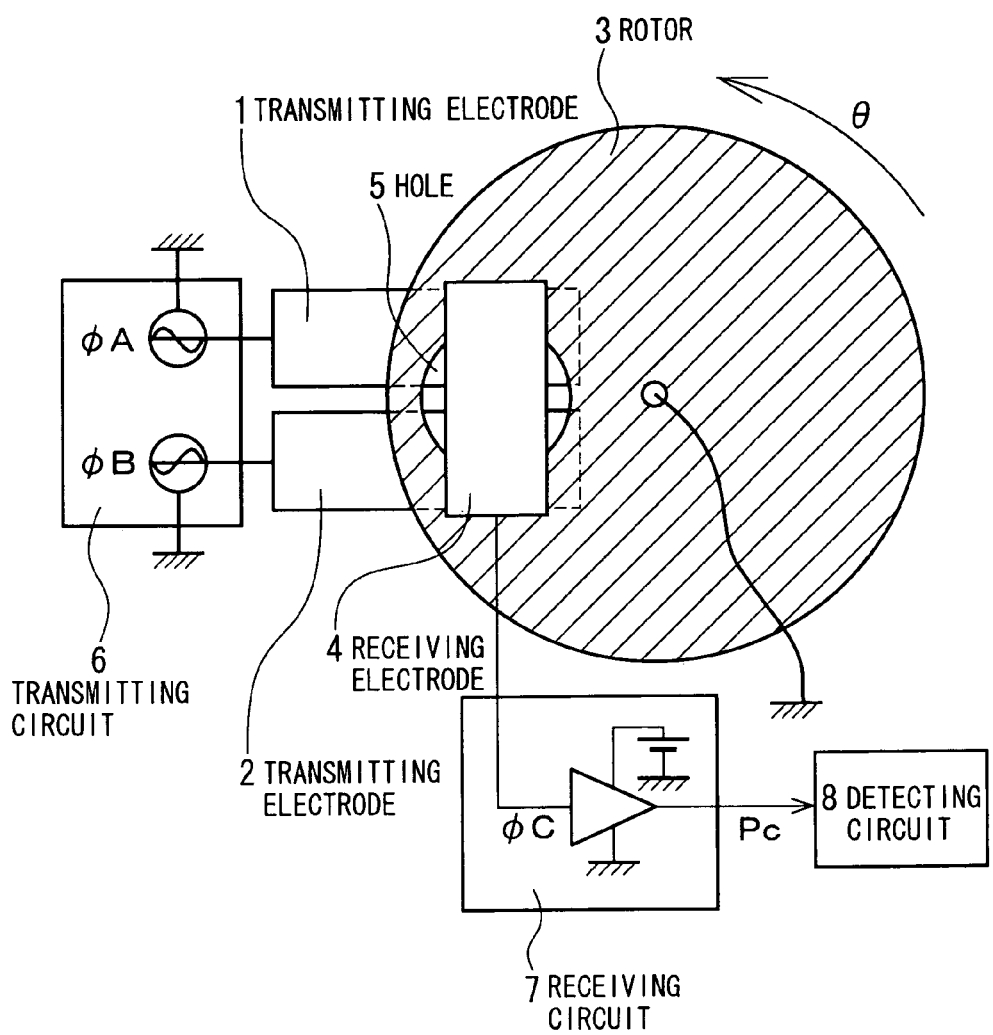
FIG. 1 is a plan view illustrating a schematic signal modulating constitution according to a first example of the present invention.
Figure 2:
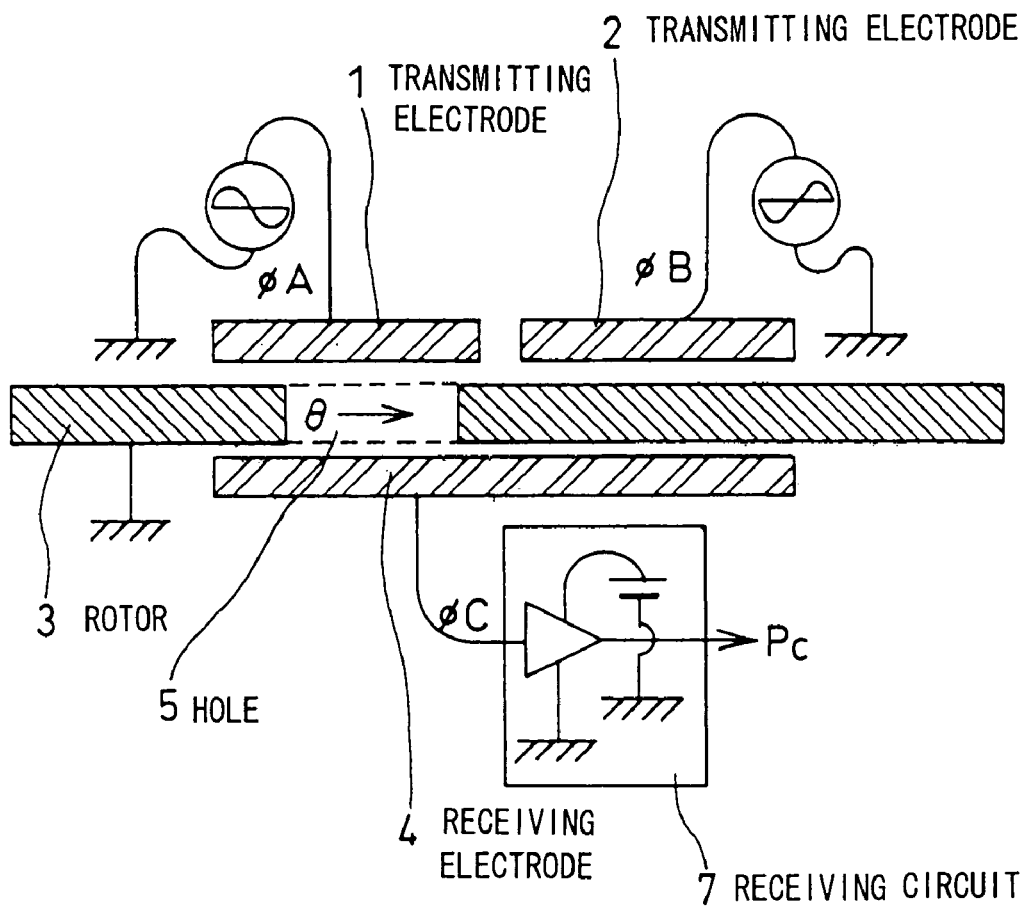
FIG. 2 is a sectional view of FIG. 1.

FIG. 1 is a plan view illustrating a schematic signal modulating section of the electric watch according to the present invention, and FIG. 2 is a sectional view of FIG. 1.

In FIGS. 1 and 2, reference numerals 1 and 2 designate the transmitting electrodes, and the transmitting electrodes 1 and 2 are arranged so as to be opposed to the receiving electrode 4 across the rotor 3 as the signal modulating member. The transmitting electrodes 1 and 2 adjoin the rotor 3 in a non-contact manner, and the rotate 3 adjoins the receiving electrode 4 in a non-contact manner. The transmitted signals from the transmitting electrodes 1 and 2 reach the receiving electrode 4 via a hole 5 with a line of electric force extending from both the transmitting electrodes 1 and 2. The rotor 3 is a gear-like object of a wrist watch wheel train, for example, and is made of a metal or plastic material coated with metal so as to have electrical conductivity. The rotor 3 is arranged so that its axis, not shown, or another portion is electrically grounded.

The numeral 6 designates the transmitting circuit for outputting a plurality of transmitted signals, and it forms two kinds of transmitted signals $\phi A$ and $\phi B$ of a sine wave with different phases and same frequency, for example. The transmitting electrode 1 outputs the transmitted signal $\phi A$, and the transmitting electrode 2 outputs the transmitted signal $\phi B$. The transmitted signals $\phi A$ and $\phi B$ are received as a received signal $\phi C$ by the receiving electrode 4 via the rotor 3 for modulating the transmitted signals $\phi A$ and $\phi B$.

Although amplitude of the received signal $\phi C$ is greatly lowered as compared with those of the transmitted signals $\phi A$ and $\phi B$, the received signal $\phi C$ is induced from a synthesized electric field of the transmitted signals $\phi A$ and $\phi B$. For this reason, if when the frequencies of the transmitted signals $\phi A$ and $\phi B$ are equal with each other, the frequency of the received signal $\phi C$ is also equal thereto, and if when there is a phase difference between the transmitted signals $\phi A$ and $\phi B$, the received signal $\phi C$ takes a middle phase between these phases. The hole 5 moves according to rotation of the rotor 3, a spatial relative position relationship between the transmitting electrodes 1 and 2 and the receiving electrode 4 changes. Further, amplitude and phase of an AC signal from the receiving electrode 4 to be induced change due to overlapping of the electric field in the vicinity of the receiving electrode 4. That is to say, when the position of the hole 5 of the rotor 3 changes and thus the spacial relationship between the transmitting electrodes 1 and 2 and the receiving electrode 4 changes according to a rotating angle $\theta$ of the hole 5 of the rotor 3, the phase and the amplitude of the received signal $\phi C$ change as functions of the rotating angle $\theta$.

When the received signal $\phi C$ is amplified by the receiving circuit 7, the sine wave signal with large amplitude is saturated so as to have a trapezoid shape, and when it is further amplified, the sine wave signal becomes a detected signal Pc of a rectangular waveform. Since the phase information is maintained even in this case, the phase information can be extracted easily by phase detection. This method is equivalent to a mechanism of high-quality FM broadcasting. A different point is that a broadcasting station modulates frequency or phase of a signal and then transmits the signal, but in the present invention, the phase of the received signal is modulated by mechanical change of the rotor provided on a transmission path between the transmitting electrodes and the receiving electrode. The present invention is similar to the FM broadcasting in that disturbance due to noise in a watch mechanism or circuit noise is eliminated efficiently by phase detecting means.

The detected signal Pc is input into the detecting circuit 8, and the mechanical position information of the rotor 3 is obtained from the received signal $\phi C$. The detecting circuit 8 maybe a phase detecting circuit for detecting phase information, or an amplitude detecting circuit for detecting amplitude information. Relative intensity information of the received signal is detected by the amplitude detecting circuit so that the mechanical position information is roughly determined, and the phase information of the received signal is detected by the phase detecting circuit so that the mechanical position information may be determined.

Figure 3:
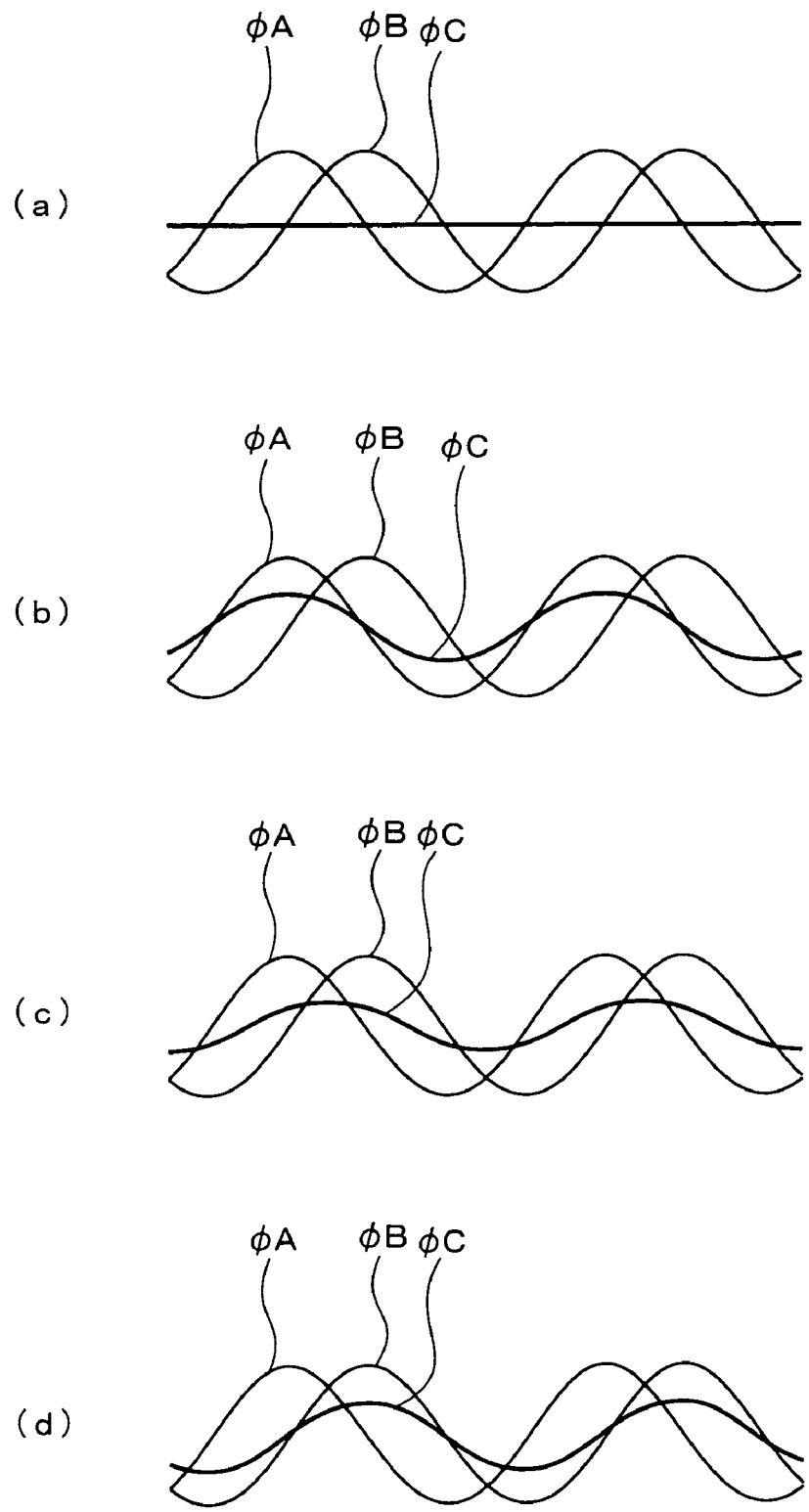
FIGS. 3(a), 3(b), 3(c) and 3(d) are waveform charts for explaining a principle of modulation of a signal according to the present invention.

FIG. 3 is a waveform chart illustrating modulation processes of the received signal $\phi C$ according to the embodiment shown in FIGS. 1 and 2. When the position of the hole 5 is distant from the transmitting electrodes 1 and 2, the line of electric force obtained by the transmitted signal $\phi A$ to be applied to the transmitting electrode 1 and the line of electric force obtained by the transmitted signal $\phi B$ to be applied to the transmitting electrode 2 are shielded by the electrically conductive rotor 3. In this state, a voltage induced by the receiving electrode 4 becomes a signal with very small amplitude as shown in FIG. 3(a). In this state, a meaningless noise component mostly occupies residual phase information.

When the rotor 3 is rotated and the hole 5 is positioned between the transmitting electrode 1 and the receiving electrode 4 as shown in FIG. 2, the signal from the transmitting electrode 1 is transmitted to the receiving electrode 4, but the signal from the transmitting electrode 2 is shielded by the rotor 3 so as not to be transmitted. That is to say, the amplitude of the received signal $\phi C$ is small as shown in FIG. 3(b), but its phase is the approximately same as that of the transmitted signal $\phi A$.

When the rotor 3 further rotates and the hole 5 moves to a direction of an arrow in FIG. 2 so as to be positioned in a middle position between the transmitting electrode 1 and the transmitting electrode 2 as shown in FIG. 1, a signal obtained by synthesizing the transmitted signals $\phi A$ and $\phi B$ is transmitted to the receiving electrode 4. For this reason, as shown in FIG. 3(c), the received signal $\phi C$ becomes a signal having an intermediate phase between the phases of the transmitted signals $\phi A$ and $\phi B$.

When the rotor 3 further rotates and the hole 5 is positioned between the transmitting electrode 2 and the receiving electrode 4, only the transmitted signal $\phi B$ is transmitted to the receiving electrode 4. For this reason, the received signal $\phi C$ becomes a signal with the approximately same phase as that of the transmitted signal $\phi B$ as shown in FIG. 3(d).

That is to say, when the hole 5 of the rotor 3 is distant from the vicinities of the transmitting electrodes 1 and 2, the amplitude of the received signal $\phi C$ is almost zero. When the rotor 3 rotates continuously and passes through the transmitting electrodes 1 and 2, the received signal $\phi C$ transmit a signal with an amplitude and the phase of the received signal $\phi C$ gradually changes from the phase of the transmitted signal $\phi A$ to the phase of the transmitted signal $\phi B$. The phase change or the amplitude change of the received signal $\phi C$, or both of them is or are detected, so that a reference position of the rotor 3 can be detected.

In the constitution of FIGS. 1 and 2, proximity of the hole 5 is detected from the amplitude of the received signal $\phi C$, and when the amplitude is not less than a certain value, a determination is made that the phase detected information of the received signal $\phi C$ is proper. As a result, the position of the rotor 3 can be detected easily. When the amplitude of the received signal $\phi C$ is not more than the certain value, a publicly known squelch circuit is operated so as to stop the operation of the hole position detecting circuit. When the electrically conductive rotor 3 is used, since the effect for shielding the transmitted signals φA and φB with respect to the received signal φC is great, the squelch operation is easily utilized. A concrete configuration of the squelch circuit is detailed later.

The phase of the received signal φC takes a value between the phases of the transmitted signals φA and φB as mentioned above, and the amplitude also changes as the function of the mechanical position of the rotor 3. This can be easily derived from a synthesized formula of a trigonometric function representing the electric field. Hereinafter, particularly when the AC signals φA and φB are expressed as a time periodic function of an angular velocity ω in which time t is a variable, they are represented by φA(ωt) or φB(ωt). They are also represented by φA and φB in abbreviated form. The reference position detection using two transmitted signals with different phases is explained, but the position detection using signals with different frequencies is also possible.

The relationship between the amplitude and the phase of the received signal φC is further explained below with reference to FIG. 4. FIGS. 4(*a*) and 4(*b*) illustrate the relationship between the phase and the amplitude of the received signal φC when the transmitted signals φA and φB have the same frequency but different phases. FIG. 4(*a*) is a diagram in which the received signal φC is vector-displayed with Cos(ωt) is plotted along the x axis and Sin(ωt) is plotted along the y axis.

In FIG. 4(*a*), when the hole 5 is positioned just below the transmitting electrode 1 for transmitting the transmitted signal φA, the received signal φC is represented by Ps(a). When the hole 5 is positioned just below the transmitting electrode 2 for transmitting the transmitted signal φB, the received signal φC is represented by Ps(b). When the hole 5 is positioned in a middle position between the transmitting electrodes 1 and 2, the received signal φC is represented by Ps(m) (s=1, 2, 3).

A path 31 which passes from the P1 (a) to P1 (b) via P1 (m) represents a vector trajectory when a phase difference between the transmitted signals φA and φB is π/2. Similarly, a path 32 which passes from P2 (a) to P2 (b) via P2 (m) represents a vector trajectory when the phase difference between the transmitted signals φA and φB is 3π/4 A path 33 which passes from P3 (a) to P3 (b) via P3 (m) represents a vector trajectory when the phase difference between the transmitted signals φA and φB approaches π. The respective points on the paths are represented by Ps (x).

Amplitude of detecting voltage at the points Ps (x) on the paths is represented by a length of the vector of point 0→point Ps (x). The amplitude of the received signal φC is expressed by a relative value. The phase of the detecting voltage at the point Ps (x) on the paths is represented by a component of a projected length on the x axis. For example, on the path 33 where the phase difference between the transmitted signals φA and φB is π, the phase advances by π/2 and the amplitude moves from P3 (a) as a starting point at which the amplitude is equal with a radius r of a circle passing through at P3(m) at which the phase becomes zero and the amplitude is small to P3(b) at which the phase delays by π/2 and the amplitude is equal with the radius r of the circle.

FIG. 4(*b*) is a diagram illustrating the relationships between the phase and the amplitude, respectively, as the function of the rotating angle of the rotor 3. In FIG. 4(*b*), a moving distance of the hole 5 of the rotor 3 is plotted along a lateral axis, and the amplitude and the phase are plotted along a vertical axis. When the phase difference between the transmitted signals φA and φB is π/2, 3π/4 and about π, the path of the amplitude is expressed by line 34, 35 and 36, respectively, and the path of the phase is expressed by lines 37, 38 and 39, respectively.

As shown in FIG. 4(*b*), as the phase difference between the transmitted signals φA and φB exceeds π/2 so as to increase up to π, an amplitude fluctuation is large and a difference in the modulated phase is also large.

When the phase difference between the transmitted signals φA and φB approaches to π, the amplitude of the received signal φC shows double-humped characteristics, and the amplitude in the middle between the humps is lowered, thereby disturbing the detection of the phase information. For this reason, it is preferable that the phase difference is set to be smaller than π to a certain extent. Practically, it is necessary to extract and use only the received signal phase information in the position of the rotating angle for providing large receiving amplitude. The amplitude, however, can be uniform by saturating and amplification as long as the amplitude does not become extremely small.

When the change in the amplitude is used for not the phase detection but for the position detection, the phase difference between the transmitted signals φA and φB is set to be close to π, so that steepness of the amplitude function of the received signal φC in the vicinity of the center of the hole can be utilized. That is to say, as the rotation of the rotor 3 proceeds, after the position with large amplitude is detected, abrupt decrease or increase in the amplitude is detected, thereby detecting the reference position.

One of requirements which a plurality of transmitted signals satisfies is that the transmitted signals include a plurality of AC vector signal components in an orthogonal relationship, and the amplitude of the vector sum of the received signal is not 0 all the time. When Sin(ωt) is applied to one electrode, the other electrodes should include a Cos(ωt) component which is orthogonal to the signal or a high-frequency component. When the two transmitting electrodes are, therefore, used, and a phase difference α is set according to the following equations:

$$\phi A = \mathrm{Sin}(\omega t - \alpha/2)$$

$$\phi B = \mathrm{Cos}(\omega t + \alpha/2); \text{ (ω and α are constants, and t is time),}$$

it is necessary that α>π, when phase difference α is to be set.

It is not necessary that both the signals do not always establish the orthogonal relationship, but they should include orthogonal vector components. When the orthogonal components composed of different frequencies are, for example, as follows:

$$\phi A = \mathrm{Sin}(\omega t + \beta)$$

$$\phi B = \mathrm{Sin}(n \times \omega t + \gamma); \text{ (n=2, 3, 4 . . . ; β and γ are constants),}$$

synchronous detection is made by using a common signal which is the basis for creating the transmitted signals φA and φB as a reference phase, and a differential amplifying circuit is used for extracting a position detecting signal from a difference between the synchronous detecting output signals.

Figure 5:
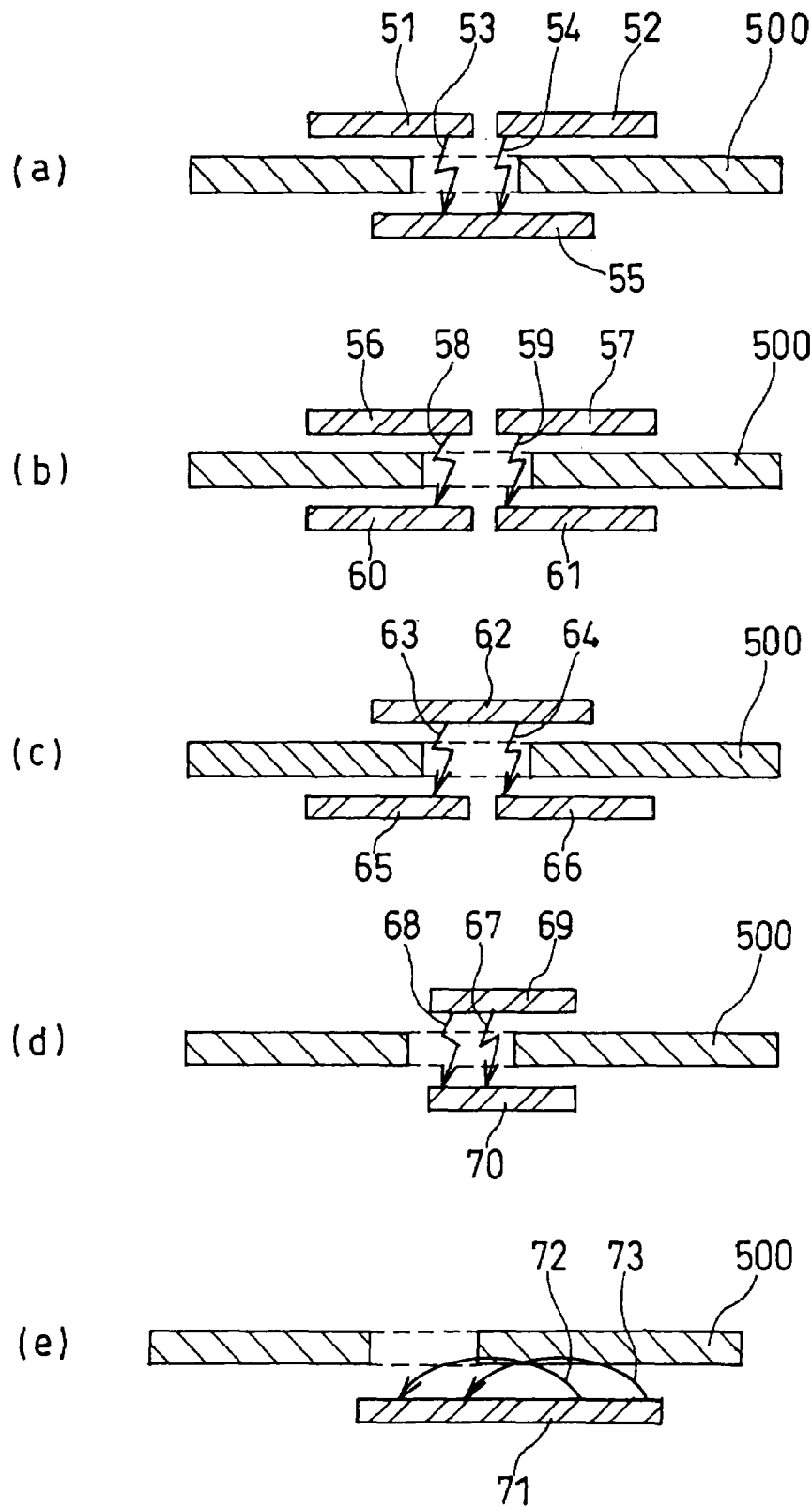
FIGS. 5(a), 5(b), 5(c), 5(d) and 5(e) are diagrams illustrating variations of a signal transmission path.

Constitutions of the various transmission paths for the transmitted/received signals are explained below with reference to FIG. 5. FIG. 5 is an explanatory diagram of the transmission paths for the position information detected signals, and FIGS. 5(*a*) to 5(*e*) illustrate five kinds of embodiments.

FIG. 5(*a*) is an explanatory diagram illustrating the constitution composed of a plurality of transmitting electrodes 51 and 52 and a single receiving electrode 55. Transmitted signals 53 and 54 with different phases or frequencies from the transmitting electrodes 51 and 52 pass through the hole of a rotor 500 and are synthesized so as to be transmitted to the receiving electrode 55. That is to say, the signals with the same frequency and different phases or the signals with different frequencies are transmitted from the electrodes 51 and 52, and are received by the receiving electrode 55 on the receiving electrode side. A position information of the rotor 500 is extracted as the function of the mechanical position of the rotor 500 from a difference in the transmitting properties between the transmission paths. Particularly the phase demodulation transmitting/receiving system suppresses an influence of disturbing electric field noise so as to be capable of measuring an accurate position of a wheel train. This corresponds to an FM (frequency modulation=equivalent phase modulation) broadcasting system which has good sound quality and is resistant to a noise radio.

The constitution of FIG. 5(*a*) is a first candidate of the position detecting mechanism of the present invention. The constitution, in which signals with different phases are transmitted simultaneously and a change in the phase of the received signal is detected, has high detecting sensitivity and reliability as mentioned below. The transmitting electrodes 51 and 52 transmit sine wave signals having frequency of several kHz and a phase difference of several dozen° to hundred and several dozen°, and the receiving electrode 55 receives signals whose phase and amplitude are modulated by the rotor, and detects and analyzes the signals.

The transmission and reception are carried out with the timing being shifted, and the received information is stored in a storage circuit, and a plurality of data received later are compared. Such a method can be used but the following method is superior to this. That is to say, signal differential operations of the different transmission paths are prosecuted simultaneously in the transmission path space, so that the signal difference is detected from a circuit noise and an operation error. The simultaneous transmission can generate an interference electric field due to overlapping of the transmission paths and the common receiving electrode. As a result of the overlapped interference of the transmitted signals 53 and 54 on the receiving electrode 55, a signal whose phase and the amplitude are modulated can be obtained. Since the differentiation is carried out by the interference of an electromagnetic wave according to a principle of the electromagnetic overlapping, no noise is generated and S/N is not deteriorated, and this is a superior method. As mentioned above, it is a characteristic of the present invention that the rotor 500 is used as the phase modulating means which is sensitive to the electromagnetic wave.

A system for transmitting a plurality of transmitted signals at different timings is considered. In this case, the receiving electrode 55 receives a single sine wave signal, but since the same internal system of the watch is used, an accurate phase of the received signal by using a signal from a transmitting source as a reference can be measured. The phases of the signals received from the different transmitting electrodes at different timings on a time base can be measured accurately. Since a circuit process for taking a difference of the phase and amplitude of the minute signals is, however, executed via the receiving circuit, this system is inferior to a simultaneous transmission simultaneous receiving constitution, in which a differential process can be executed directly by utilizing the overlapping principle on the transmission paths, in view of S/N.

FIG. 5(*b*) is an explanatory diagram of a constitution composed of the plural transmitting electrodes 56 and 57 and the plural receiving electrodes 60 and 61. The transmitting electrodes 56 and 57 transmit the signals 58 and 59 with different phases or frequencies, and the signals passes through the hole of the rotor 500 so as to be transmitted to the receiving electrodes 60 and 61, respectively.

That is to say, this is a system for comparing a difference in the transmission characteristics between the transmission paths using the receiving electrodes 60 and 61 so as to measure and analyze the difference. In the measurement on the transmission paths of the single transmitting electrode and the single receiving electrode, since an error due to mechanical jolting of the wheel train is directly detected, a detecting error is large, and thus the reliability of the measured result is fairly deteriorated. The detection can be made by the modulation of amplitude or the modulation of phase, but the difference between the received signals is created and they are compared at a process in the circuit after the signals is received on the receiving electrodes 60 and 61. For this reason, the detection is easily influenced by an internal noise of the circuit, and as compared with the constitution in FIG. 5(*a*), the sensitivity of the position detection tends to be deteriorated.

FIG. 5(*c*) is an explanatory diagram of a constitution composed of the single transmitting electrode 62 and the plural receiving electrodes 65 and 66. The transmitting electrode 62 transmits a plurality of signals 63 and 64, and the signals pass through the hole of the rotor 500 so as to be transmitted to the receiving electrodes 65 and 66.

That is to say, the constitution is such that the single transmitting electrode 62 and the plural receiving electrodes 65 and 66 are provided, and signals induced in the receiving electrodes 65 and 66 are compared reciprocally. The reception timing and the comparison timing are not necessarily simultaneous on the receiving electrodes 65 and 66. Since the signals have the equal frequency and approximately equal phase, a homodyne detecting method, in which simultaneous detection is executed based on the transmitted signals and filtering is executed in order to eliminate a noise, is adopted. This method has less advantages because a number of electrodes is not decreased and further the detecting accuracy is deteriorated.

The complication of the circuit for creating the plural transmitted signals 63 and 64 is, however, decreased. When the receiving electrodes 65 and 66 detect the positions of the plural wheel members, time division is carried out so that the transmitting electrode 62 and the receiving electrodes 65 and 66 are successively classified into groups, and time division can be switched. In this case, the constitution composed of the single transmitting electrode 62 and a plurality of receiving electrodes 65 and 66 can be used to detect position information of a day plate where error tolerance is large.

FIG. 5(*d*) is an explanatory diagram of a constitution composed of the single transmitting electrode 69 and the single receiving electrode 70. The single transmitting electrode 69 transmits signals 68 and 67 with different frequencies in a synchronous relationship and the signals pass through the hole of the rotor 500 so as to be transmitted to the receiving electrode 70.

That is to say, a pair of the transmitting and receiving electrodes are arranged in the vicinity of the rotor 500, radio waves with different frequencies are transmitted from the transmitting electrode 69 and are received by the receiving electrode 70 simultaneously or at different times which are close to each other temporally. Transmitting characteristic data corresponding to the frequencies are compared reciprocally in the same position of the rotor, and a change in a difference between the transmitting characteristics is taken as the function of the rotating position of the wheel train, so that the position of the rotor 500 can be estimated. This system has an advantage such that a number of the electrodes is two.

FIG. 5(*e*) is an explanatory diagram of a constitution in which one electrode is used as both the transmitting electrode and the receiving electrode. The transmitting/receiving electrode 71 transmits signals 72 and 73 with different frequencies, and the signals pass through the vicinity of the rotor 500 so as to be received by the transmitting/receiving electrode 71.

That is to say, only one electrode is prepared for both the transmitting electrode and the receiving electrode, and the electrode is driven via a high-output impedance element by a constant voltage driving circuit using a plurality of AC sources with different frequencies. An electrode voltage of the transmitting/receiving electrode 71 adjacent to the rotor and its phase are compared with a voltage of the constant voltage driving circuit and its phase. A change is detected by an I/O terminal of a driving integrated circuit and the constant voltage driving circuit in the integrated circuit. In another manner, the measurement is carried out by using different frequencies simultaneously or intermittently at a plurality of times which are close to each other temporally, so that the mechanical position information of the rotor 500 is obtained from frequency dependency of electromagnetic load characteristics of the transmitting/receiving electrode.

Although the detecting sensitivity is low, only one electrode is used for detection, so that the system can be miniaturized. The high-impedance element uses high resistor formed in the watch integrated circuit, so that influences of humidity and electromagnetic field outside the integrated circuit are suppressed. The deterioration in the detecting sensitivity and the influence of the jolting of the wheel train cannot be avoided, but this system can be sufficiently applied to clocks having enough volume.

The above-mentioned wheel train position detecting constitutions are generally explained. The electrodes arranged in the vicinity of the wheel train detect a change in a difference of the different electromagnetic components detected via the transmission paths as the function of the mechanical rotating position of the wheel train so as to obtain the position information of the wheel train.

That is to say, plural kinds of the AC signals are transmitted through the transmission paths which are spatially or temporally different, and the electric field between the transmitting electrode and the receiving electrode is modulated at least by a partially common member. As a result, the difference of the transmission characteristics is generated in the transmission space and is detected, so that the position of the wheel train is detected. In the actual watch mechanism, simplification of the mechanism, reduction of volume, reduction of thickness, reduction in the cost of assembly and adjustment, reduction in the cost of members, reduction in the cost of the driving/detecting integrated circuit, and the like are demanded. The optimization is achieved under these conditions. For this reason, a complicated constitution is not allowed, and the deterioration of the measuring accuracy and the reliability is not allowed.

Figure 6:
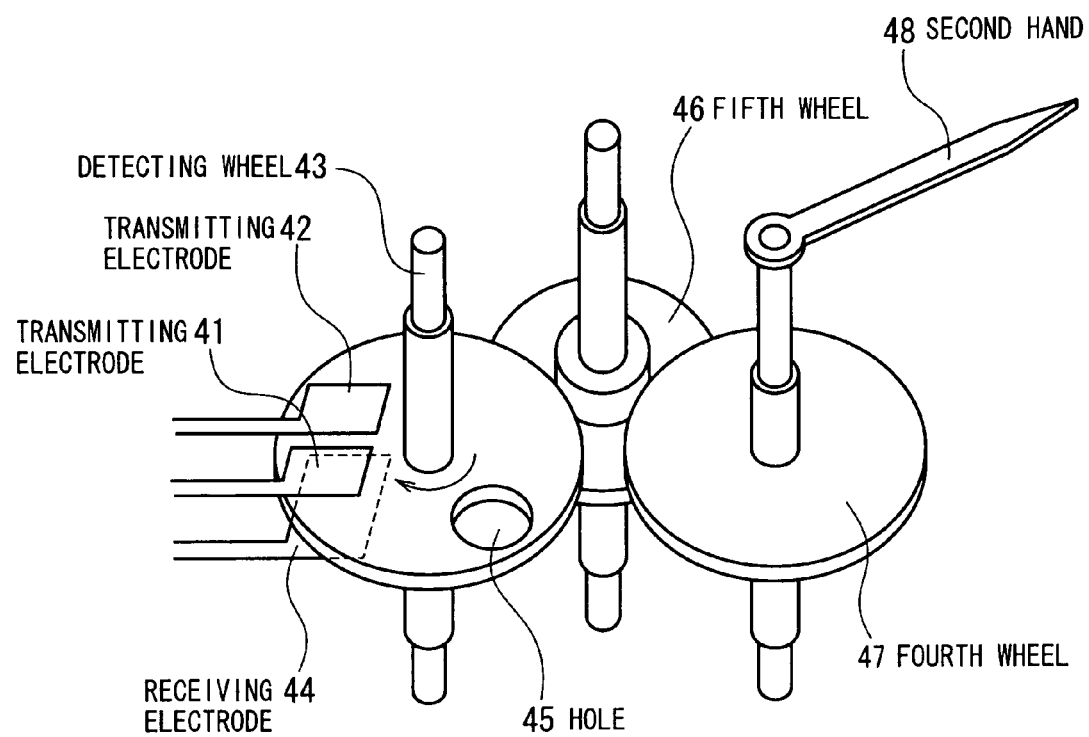
FIG. 6 is a perspective view of the first example where the present invention is applied to a watch.

The example in which the present invention is applied to a hand position detecting mechanism for a second hand of the wrist watch is detailed below. FIG. 6 is a perspective view of the wheel train portion having the second hand position detecting mechanism. In FIG. 6, the numeral 46 designates a fifth wheel for decelerating and transmitting rotation of a rotor in an electromechanical converting mechanism. The fifth wheel 46 transmits the rotation of a same reducing ratio to a fourth wheel 47 and a detecting wheel 43 as a signal modulating member. A second hand 48 is fixed to the fourth wheel 47, and displays second information. The fourth wheel 47 and the detecting wheel 43 move the second hand in a synchronous stepwise manner of 60 steps per rotation, namely, 6° per step.

That is to say, in the present invention, the fourth wheel 47 corresponds to one example of the rotating member to be measured in this application.

On the other hand, the detecting wheel 43 may be another example of the rotating member to be measured in this application.

The detecting wheel 43 is made of a metal member having electrical conductivity, and its bearing portion, not shown, is grounded. A gear portion of the detecting wheel 43 has a hole 45. Conductivity or permittivity of the hole portion of the detecting wheel 43 is different from that of another portion thereof separated from the hole 45 in the direction due to the hole 45. The hole 45 of the detecting wheel 43 is not limited to an actual hole form, and may be a notched form or a convexo-concave form in a sectional direction of the gear as long as a distance between an upper/lower surface of the gear and the electrodes changes due to the rotation. The transmitting electrodes 41 and 42 are provided on a top side of the gear of the detecting wheel 43, and the receiving electrode 44 is provided on a bottom side. They are opposed to each other so as to be adjacent in a non-contact manner.

Every time when the detecting wheel 43 rotates by one step, the transmitting electrodes 41 and 42 transmit sine wave signals with different phases. The signal waveforms are not limited to the complete sine waveforms, and may be waveforms approximate to the sine waveforms. For example, the transmitting electrode 41 transmits a sine wave signal $\phi A$ whose phase advances by 45° with respect to a certain reference signal, and the transmitting electrode 42 transmits a sine wave signal $\phi B$ whose phase delays by 45°.

When the hole 45 is not present in the vicinity of the transmitting/receiving electrodes, the signals are shielded by the detecting wheel 43 grounded electrically so as not to be transmitted. When the detecting wheel 43, however, rotates and the hole 45 comes to the transmitting electrode 41, a voltage change of the sine wave signal $\phi A$ between the transmitting electrode 41 and the receiving electrode 44 is transmitted as a change in an electrostatic capacity to the receiving electrode 44. When the rotation of the detecting wheel 43 advances and the hole 45 comes between the transmitting electrode 41 and the transmitting electrode 42, both the transmitted signals are synthesized, and the synthesized signal is transmitted to the receiving electrode 44. When the rotation further advances and the hole 45 comes to the transmitting electrode 42, only the transmitted signal $\phi B$ from the transmitting electrode 42 is transmitted.

Since the rotation of the detecting wheel 43 changes the phase of the signal $\phi C$ received by the receiving electrode 44 from +45° to −45°, the time when the phase of the received signal $\phi C$ passes through 0° with respect to the reference signal with phase of 0° can be detected as a reference position of the detecting wheel 43. A reference position of the second hand 48 in a synchronous relationship with the detecting wheel 43 can be, therefore, detected.

Operation control of the watch according to this embodiment is explained below. In this embodiment, the watch is constituted so that hour, minute and second are indicated by three hands, the second hand is driven by an electromechanical transducer (motor), and a minute hand and a hour hand (explanation about them is omitted) are driven by another electromechanical transducer (motor). When this embodiment is applied to a watch having an additional function, the second hand indicates not only second but also calendar information such as day, month and leap year in a switching manner. Further, the second hand can be used as a stopwatch, a timer hand and the like in a switching manner.

A method of attaching the second hand at the time of assembly is explained. A stem, not shown, is pulled out so as to attain a reset state. At this time, the electromechanical transducer outputs a transducer driving signal, and a second wheel train fast moves the secondhand forward per second. After the second wheel train is driven, every time when the hand is moved, the transmitting electrodes 41 and 42 output the transmitted signals φA and φB, and the receiving electrode 44 receives the received signal φC. The phase of the received signal φC is detected, and a moment when the phase is changed from an advanced state into a delayed state with respect to the reference signal is detected as the reference position of the detecting wheel 43, and the fast and forward moving of the hand is stopped. Since the detecting wheel 43 and the fourth wheel 47 rotate synchronously, the reference position of the detecting wheel 43 can be the reference position of the fourth wheel 47. For this reason, in this state, the second hand 48 is attached to the fourth wheel 47 with the second hand 48 matches the position of zero second.

When the second hand 48 is attached and the stem is returned to a 0 step position, one pulse of the transducer driving signal is output per second, and the second hand 48 starts to be moved per second so as to indicate second of current time. IC which controls the entire watch system outputs the transducer driving signal, and counts a number using an electrical counting mechanism, so as to hold the electrical time. The electrically held time is started to be counted from a state that the reference position of the second hand 48 is detected, and is reset at 60th counting. Every time when the detecting wheel 43 is driven to be rotated, detected signals are transmitted from the transmitting electrodes 41 and 42 and are received by the receiving electrode 44. If the detecting wheel 43 is rotated accurately by the driving signal of the IC, the second hand 48 returns to an original position every 60 seconds, namely, every one minute, so that the reference position can be detected. That is to say, the reference position of the second hand 48 matches the 0 position of the electrically holding time at every 60 seconds.

When the detecting wheel 43, however, does not rotate normally due to the influence of impact or external magnetic field or is forcibly rotated by an external force, the reference position of the second hand 48 shifts from the electrically holding time. When the shift is detected, the transducer driving signal and the hand position detected signal are continuously output, and the detecting wheel 43 is driven to rotate fast to a regular direction until the reference position is detected. In such a manner, the shift of the reference position from the 0 position of the electrically holding time is corrected. In this embodiment, the transducer for driving the second hand 48 and the transducer for driving the hour and minute hands, not shown, are provided separately. For this reason, even when the detecting wheel 43 which is driven simultaneously with the second hand 48 is rotated to the regular direction, the time information about hour and minute is not shifted.

Even if the reference position of the second hand 48 is temporarily shifted due to external factors such as impact and magnetic field in the finished watch, the position of the second hand is corrected every one minute, and the watch with high display accuracy can be realized. Further, in the case where even if the position of the hand is shifted, it is corrected every one minute, large display hands which may cause shift due to impact can be used.

Figure 7:
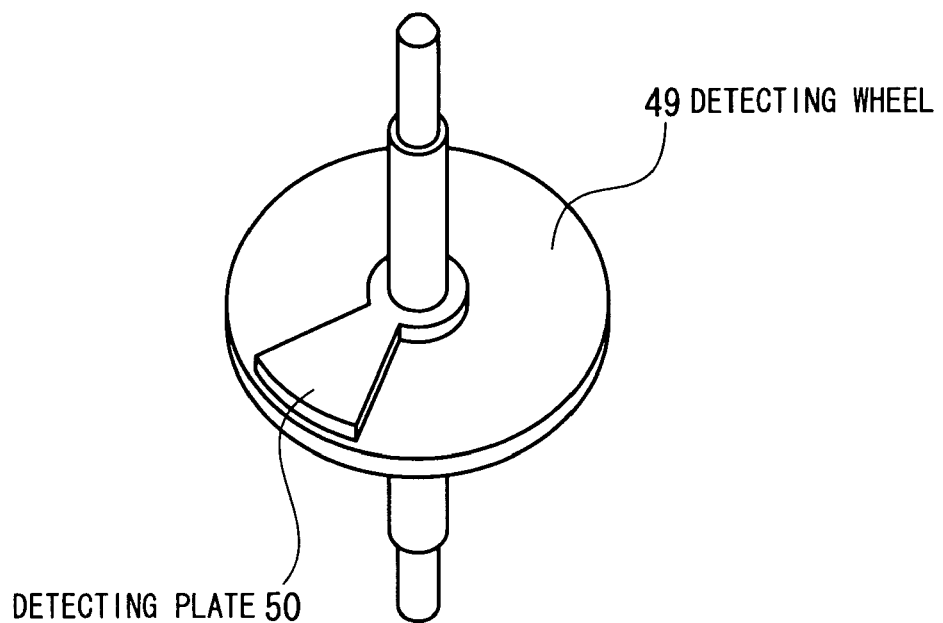
FIG. 7 is a perspective view illustrating another example of a detecting wheel.

In the above-mentioned embodiment, the hole 45 is provided on the detecting wheel 43 made of the metal member, but a constitution composed of a plastic gear and a metal plate as shown in FIG. 7 can be used. In FIG. 7, the detecting wheel 49 is injection-molded by the plastic material, and thus does not have electrical conductivity. A detecting plate 50 made of metal is arranged on the upper surface of the gear of the detecting wheel 49 which is press-fitted to the shaft of the detecting wheel 49. When the detecting wheel 49 rotates and the detecting plate 50 comes to the vicinity of the transmitting/receiving electrode, the electrostatic capacity changes between the detecting plate 50 and the transmitting/receiving electrode. For this reason, the position information can be detected. The manufacturing cost of this constitution can be reduced by forming the detecting wheel 49 using plastic.

Further, a more simplified constitution can be achieved in the following manner. A portion of the gear surface of the detecting wheel made of plastic is plated with metal, or on the contrary, the entire gear surface other than one portion is plated with metal, and the transmitted signals are modulated by the rotation of the detecting wheel. In addition to the reduction in the cost due to use of the plastic material, the effect due to reduction in the thickness can be expected.

A block constitution of the entire watch system according to this embodiment is explained below with reference to FIG. 8.

Figure 8:
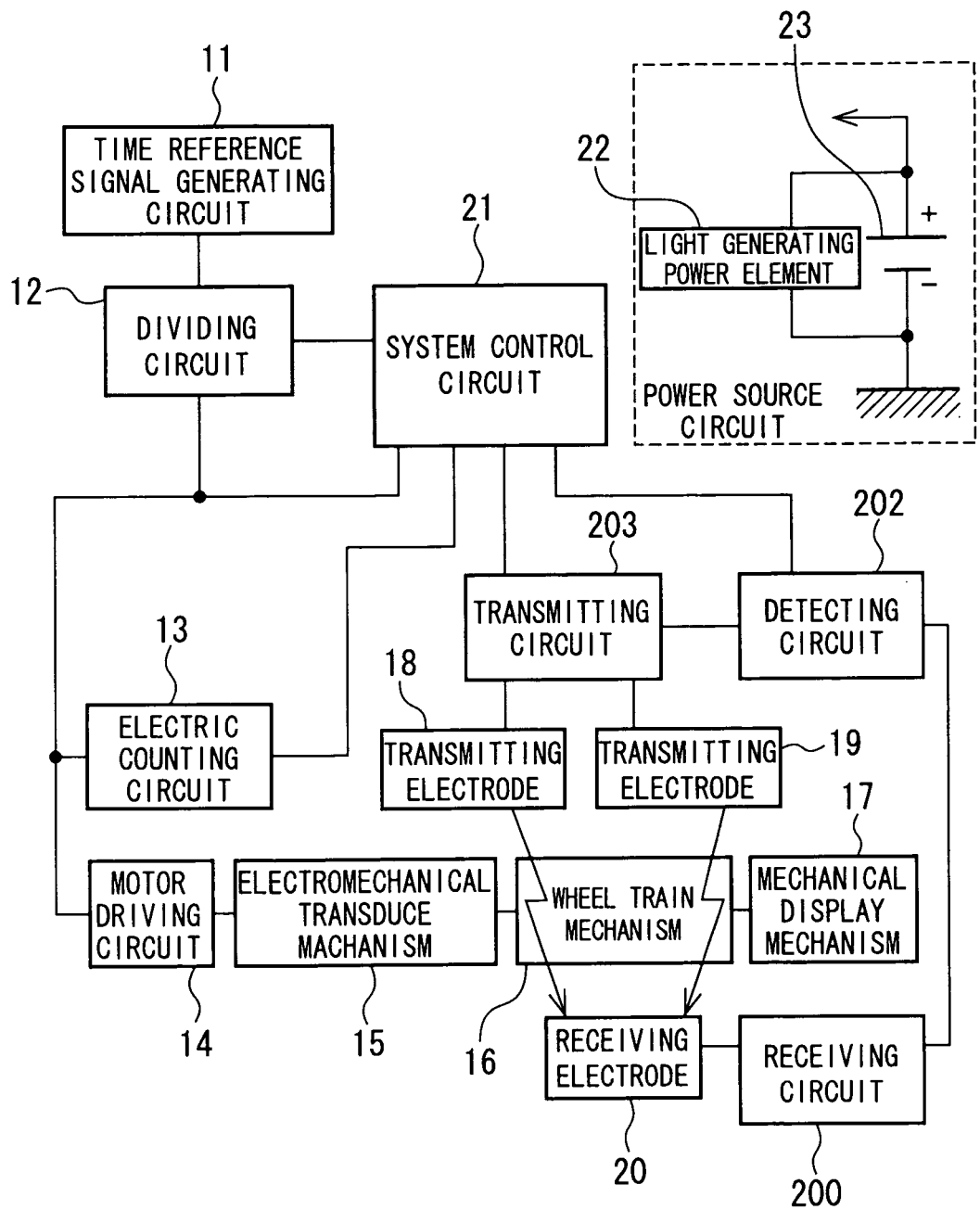
FIG. 8 is a block diagram of an entire watch system according to the first example.

In FIG. 8, the watch system of the present invention has a photo charging power supply including a photoelectric generating element 22 and a secondary battery 23. The watch system of the present invention has a time reference signal generating circuit 11 composed of a quartz oscillator including a quartz resonator in order to create minimum unit time of the watch time. A dividing circuit 12 divides the time reference signal output from the time reference signal generating circuit 11, so as to generate a counting time unit signal on a minimum time basis of the time holding in the watch. The numeral 21 designates a system control circuit for controlling the operation of the entire watch system. The counting time unit signal generated by the dividing circuit 12 is input into a motor driving circuit 14 by control of the system control circuit 21, and the motor driving circuit 14 drives a pulse motor in an electromechanical transducing mechanism 15. In the meantime, the counting time unit signal is input into an electrical counting circuit 13, and the counting time unit signal is counted so that the electrical time is held. Further, the wheel train mechanism 16 connected with the pulse motor of the electromechanical transducing mechanism 15 holds the mechanical time information. The mechanical time information held by the wheel train mechanism 16 is displayed by the hands of a mechanical display mechanism 17.

Sine wave signals with different phases are created by the transmitting circuit 203 according to control of the system control circuit 21, and are output from the transmitting electrodes 18 and 19 arranged in the vicinity of the wheel train mechanism 16. The transmitted signals 18 and 19 are synthesized and modulated so as to be transmitted to the receiving electrode 20 by the wheel train mechanism 16. The receiving circuit 200 detects the received signal. Phase of the detected received signal is compared with phase of the reference signal created in the transmitting circuit 203 at the detecting circuit 202, and the mechanical time information which is held by the wheel train mechanism 16 is detected according to the compared result. The system control circuit 21 controls time synchronization, mis-operation correction or time setting according to the mechanical time information obtained from the detecting circuit 202 and the electrical time information held by the electrical counting circuit 13. Control information is input into the system control circuit 21 from an external operating mechanism, not shown, in order to input time information from the outside, and the wheel train mechanism 16 is operated directly and mechanically so as to be capable of setting the mechanical time.

Concrete configurations of the transmitting circuit 203, the receiving circuit 200 and the detecting circuit 202 are explained below.

Figure 9:
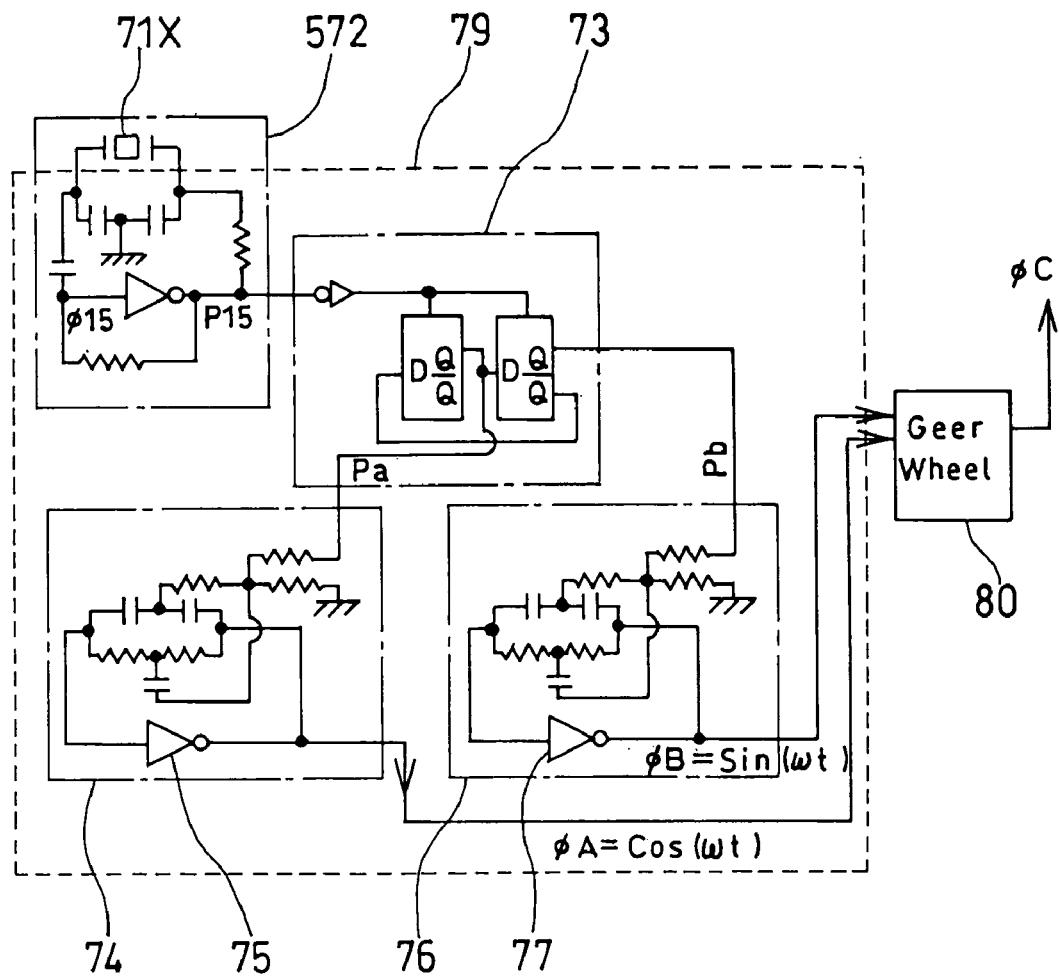
FIG. 9 is a circuit diagram of a transmitting circuit according to the first example.

FIG. 9 illustrates an example of a system configuration of the transmitting circuit 203 for creating a transmitted signal. 71X designates the quartz resonator, and 572 designates a quartz oscillating circuit for generating an accurate frequency for creating pitch of the holding time of the watch. The oscillating frequency is a $2^{15}$ Hz. The numeral 79 designates an integrated circuit for the electric watch constitution. 73 designates a ¼ dividing circuit included in the integrated circuit 79, and it outputs pulse signals Pa and Pb with $2^{13}$ Hz in this embodiment. The phases of both the signals are different from each other by $\pi/2$. The numerals 74 and 76 designate bandpass amplifying circuits for amplifying only a signal with $2^{13}$ frequency. The circuit configuration is such that band eliminating filter circuits composed of resistors and capacitors are combined with inverter circuits 75 and 77, and a voltage is divided to be attenuated by a resistance voltage dividing circuit. For this reason, signals other than a signal with specified frequency is attenuated, and only the signal with specified frequency is amplified. The above-mentioned specified frequency amplifying circuit is combined with the 1/4 dividing circuit, so that the sine wave signals ϕA and ϕB, amplitude of which is stable and a phase difference between them is fixed, are created from pulse signals Pa and Pb.

Figure 10:
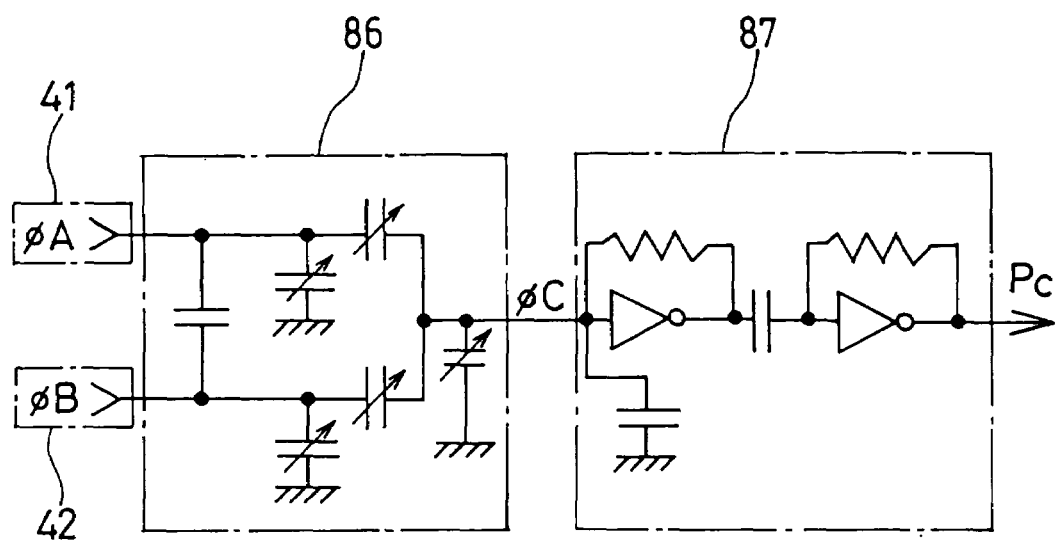
FIG. 10 is a circuit diagram of an equivalent circuit of a modulating mechanism and a receiving circuit according to the first example.

FIG. 10 illustrates an example of the receiving circuit composed of an equivalent circuit as modulating means and a pre-amplifying circuit for detection which is used in the present invention. The transmitting electrodes 41 and 42 transmit the transmitted signals ϕA and B which are different from each other. The phase and amplitude of transmitted signals ϕA and ϕB are modulated by a transmission path 86 passing through the detecting wheel 43, and the signals are received as the received signal ϕC by the receiving electrode 44. A ground potential and phase are given from electric potential allocation due to a capacity bridge composed of a capacitor on the transmission path 86 to the voltage of the induced signal ϕC on the receiving electrode 44.

The received signal ϕC is, thereafter, amplified by an amplifying circuit 87. When the phase is detected, it is necessary to retain only phase information, the received signal ϕC is saturated and amplified so as to become a pulse signal Pc.

Figure 11:
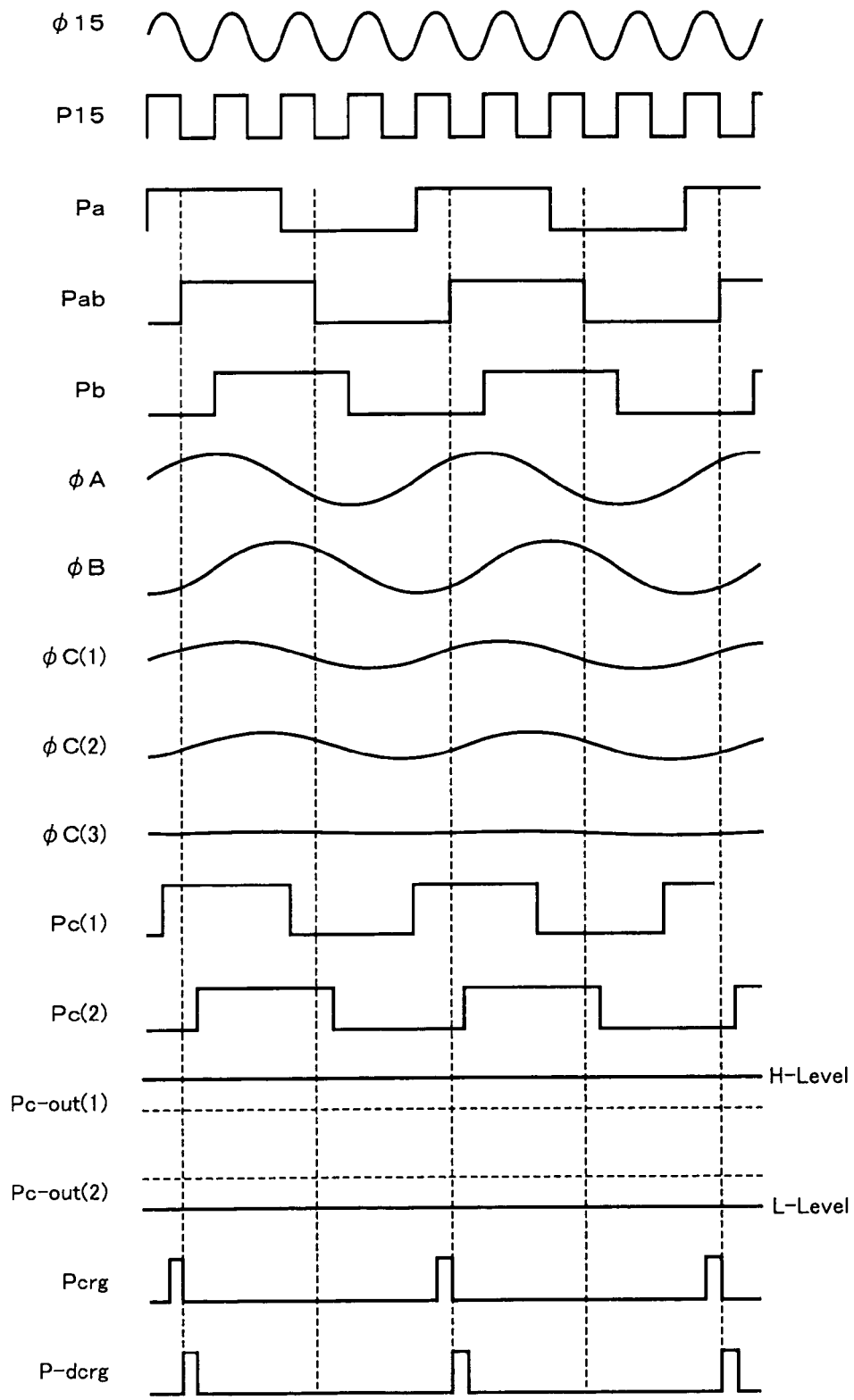
FIG. 11 is a waveform chart illustrating signal waveforms of respective portions according to the first example.

FIG. 11 illustrates signal waveforms in the respective circuits. The relative phase relationship between the respective waveforms are maintained to be displayed. ϕ15 designates a voltage waveform at a terminal of the quartz resonator 71x in the quartz oscillating circuit 572 in FIG. 9. P15 designates a pulse signal of $2^{15}$ Hz, namely, 32768 Hz obtained by shaping the sine wave signal of the quartz oscillator, and this is used also as a clock signal for determining the phase for controlling a logic circuit in the electric watch of the present invention. The pulse signals Pa and Pb shown in FIG. 9 are created based on via P15, and the sine wave signals ϕA and ϕB of $2^{13}$ Hz, namely, 8192 Hz whose phases are different from each other by $\pi/2$ are created via the bandpass amplifying circuits 74 and 76. The frequency can be arbitrarily selected. Normal watches use the quartz oscillator with $2^n$ Hz according to a common specification in the art in order to heighten mass-production effect.

The sine wave signals ϕA and ϕB are modulated by the rotating position of the detecting wheel 43, and the received signal ϕC (x) (x=1, 2, . . . ), whose phase takes a value between the phases of the transmitted signals ϕA and ϕB, is transmitted to the receiving electrode 44. When the detecting wheel 43 rotates to a direction of an arrow in FIG. 6 and the hole 45 is in the vicinity of the transmitting electrode 41, the received signal ϕC has a waveform of a received signal ϕC (1) whose phase is close to that of the transmitted signal ϕA. When the hole 45 comes to the vicinity of the transmitting electrode 42, the received signal ϕC has a waveform of a received signal ϕC (2) whose phase is close to the transmitted signal ϕB. The phase of the received signal ϕC changes in such a manner. Further, when the hole 45 of the detecting wheel 43 is not in the vicinity of the transmitting/receiving electrodes, the transmitted signals ϕA and ϕB are shielded by the detecting wheel 43 so as not to be transmitted to the receiving electrode 44. A received signal ϕC (3)has a waveform with few amplitude including only a noise component.

Since the received signal ϕC (3) at this time is noise signal without a phase component necessary for the position detection, it is cut by a squelch circuit, detailed later. Since the received signal ϕC (x) including the phase information is transmitted by a change in the electrostatic capacity between the electrodes, it's amplitude is very small, but its phase information is held. The received signal ϕC (x) is amplified so as to be saturated by the amplifying circuit 87 shown in FIG. 10 and becomes to be a rectangular detected signal Pc (x) (x=1, 2, . . . ).

The system for detecting the received signal is explained below.

Figure 12:
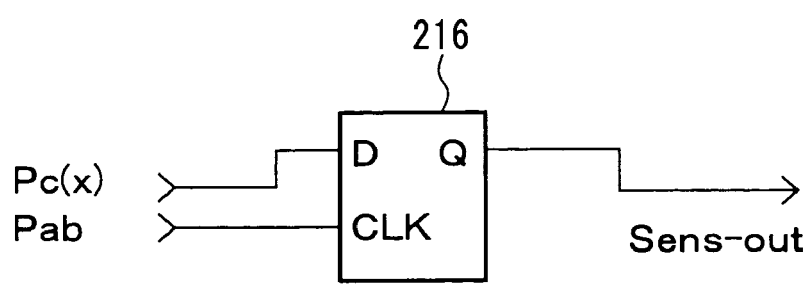
FIG. 12 is a circuit diagram where a phase of a received signal is detected according to the first example.
Figure 13:
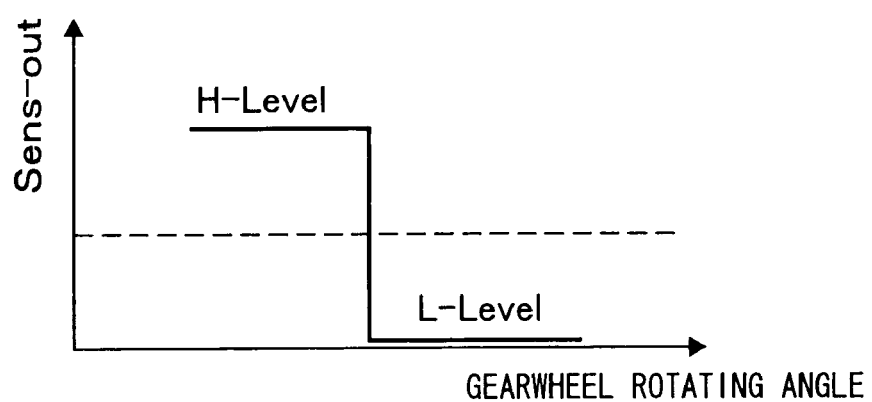
FIG. 13 is a waveform chart of a detected signal which is an output of the detected result in FIG. 12.

FIG. 12 is a circuit diagram illustrating a detecting circuit for detecting the phase of the received signal. FIG. 13 is a waveform chart of a signal representing the detected result as an output of the detected result. The detecting circuit shown in FIG. 12 changes an output voltage of the phase detecting circuit according to whether the phase of the received signal modulated by the detecting wheel 43 advances or delays with respect to the phase reference signal as the reference of the phase detection.

In FIG. 12, a pulse signal Pab with phase just in the middle between the phases of the signals Pa and Pb shown in FIG. 11 is input to a data input flip-flop 216 as clock signal thereof which is a reference signal. The reference signal Pab is created easily from the transmitted signals Pa and Pb. On the other hand, the detected signal Pc (x), which is obtained by amplifying and saturating and shaping the received signal ϕC (x), is input to the flip-flop 216 as a data signal. The flip-flop 216 outputs a detected result signal Sens-Out with a rise of the clock signal Pab being used as a trigger.

When the phase of detected signal Pc (x) advances further than that of the reference signal Pab like the signal Pc (1) shown in FIG. 11, a H level "1" of the detected result signal Sens-Out is output. When the phase of the detected signal Pc (x) delay from that of the reference signal Pab like the received signal Pc (2)the level of the detected result signal Sens-Out is switched into an L level "0". The timing at which the H level of the detected result signal Sens-Out is switched into the L level can be detected as the reference position of the detecting wheel 43.

A phase detecting system which is different from the above one is explained below.

The logic circuit as the pulse generating means generates a charge instructing signal P-crg and a discharge instructing signal P-dcrg shown in FIG. 11 from the detected signals Pc (1), Pc (2)and the reference signal Pab. Since the phase of the received signal Pc (1)advances further than that of Pab, and the phase of the received signal PC (2) delays from that of Pab, the following relationships are established:

$$P\text{-}crg = [Pc] \cap [/Pab]$$
$$= [Pc1] \cap [/Pab]$$
$$P\text{-}dcrg = [/Pc] \cap [Pab]$$
$$= [/Pc2] \cap [Pab]$$

:(∩ represents logical OR, and/represents logic inversion) The frequency of the transmitted signal is $2^{13}$ Hz, namely, about 8 kHz, and a storage capacitor of small capacity is charged to a plus side via the resistor at the H level "1" of P-crg. The capacitor is discharged to a minus side via the resistor at the H level "" of P-dcrg. The time constant of the capacitor is set to be larger than a cycle of 8 kHz by one digit, and the phase information of the received signal with respect to the transmitted signal is obtained as the voltage of the capacitor.

When the phase of Pc advances further than the Pab, the signal P-crg of "1" is obtained, and its pulse width becomes large in proportion to the phase difference, so that the capacitor is charged and the voltage of the capacitor is saturated to the plus side.

On the contrary, the phase of Pc delays from the Pab, the signal P-dcrg of "1" with a pulse width proportional to a delayed phase is obtained, and electric charges of the capacitor are discharged to the minus side, so that the voltage of the capacitor becomes zero. In such a manner, the phase change of the detected signals is converted into the voltage change of the capacitor so as to be read, and the reference position is detected.

Figure 15:
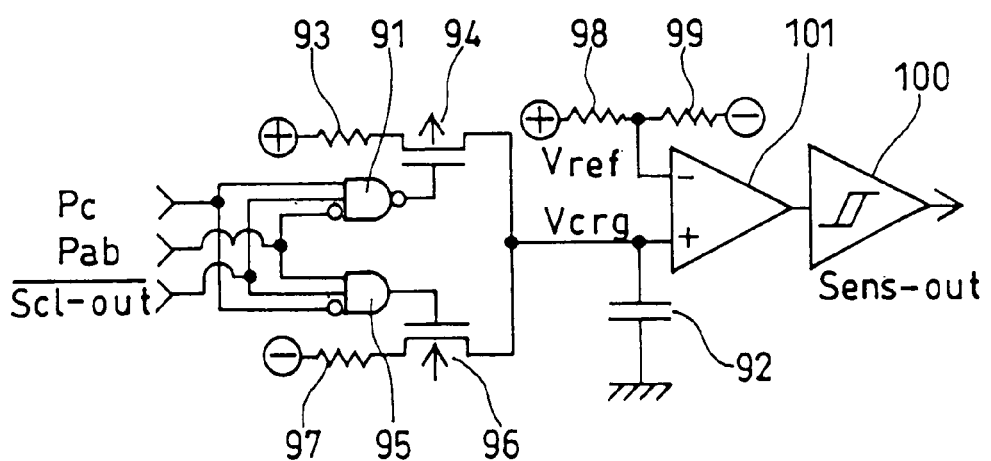
FIG. 15 is a circuit diagram of the detecting circuit for obtaining the output of FIG. 14.

FIG. 15 illustrates a concrete example of the phase detecting circuit using the capacitor.

In FIG. 15, a gate 91 charges the capacitor 92 for storing electric charges into the plus side via the resistor 93. The condition that the switch element 94 for setting a charging condition is turned on is as follows:

{detected output: Pc=H} &
{phase reference signal: Pab=L} &
{non-squeltch:/Scl–out=H}=H.

A logical level of the gate 91 becomes L, and a P channel FET 94 (field effect transistor) is turned on so that the capacitor 92 is charged via the resistor 93. The AND operation is explained as follows. The non-squelch:/Scl–out=H represents that the hole is present in the vicinity of the detecting electrode. The phase reference signal: Pab (ωt)=L and the detected output: Pc=H represent that the phase of the detected output advances with respect to the phase reference signal. That is to say, this means that the hole 45 is close to the transmitting electrode 41 in FIG. 6.

Similarly the discharging condition of the capacitor 92 is that a gate potential of the N channel transistor 96 is set to an H level. The condition that an output of the gate 95 becomes the H level is as follows:

{detected output: Pc=L} &
{phase reference signal: Pab=H} &
{non-squelch: /Scl–out=H}=H.

When the FET switch 96 is turned on, discharge is carried out via the resistor 97 The condition at this time is such that the hole is in the vicinity of the detecting electrode and the phase of the detected Output is delayed from the phase of the phase reference signal. That is to say, the rotation of the detecting wheel 43 continues, and the hole 45 is close to the transmitting electrode 42 in FIG. 6.

The gates 91 and 95 are advance/delay detecting means which detect that the amplitude of the detected signal Pc is at a constant level, and detect whether the phase of the received signal Pc advances or delays with respect to the phase reference signal Pab so as to output the result. The FET switches 94 and 96 are charge/discharge switching means which switch the charge/discharge state according to the outputs from the gates 91 and 95 as the advance/delay detecting means.

In the actual constitution, the resistor 93 and the switch element 94 are united, and an ON resistor of FET as the switch element 94 is designed so as to have a suitable value, thereby eliminating the resistor 93. Similarly, the function of the resistor 97 is included in the ON resistor of FET for discharge as a switch element 96. A comparator 101 compares a voltage Vcrg of the capacitor 92 and a reference voltage value Vref which is divided by the resistors 98 and 99. When Vcrg≧Vref, an H level of a detected result signal Senc_out is output as a logic output via a Schmitt circuit 100.

Figure 14:
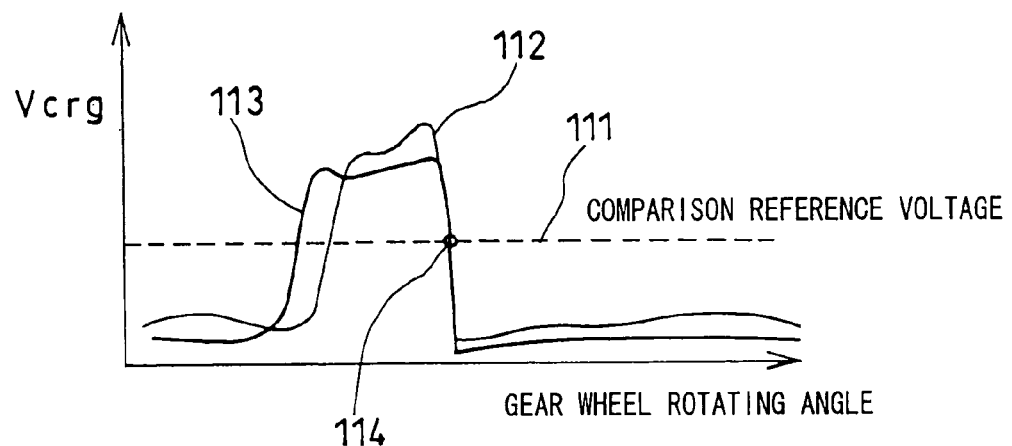
FIG. 14 is a diagram illustrating an output of another detecting circuit according to the first example.

FIG. 14 illustrates the voltage Vcrg of the capacitor 92 with respect to the rotating angle of the detecting wheel 43. When the rotation of the detecting wheel 43 proceeds and the hole 45 adjoins the transmitting electrode 42, the capacitor is charged, and the voltage Vcrg is changed from an "L" state into an "H" state with respect to a comparison reference voltage 111. Thereafter, the hole 45 passes through the middle portion between the transmitting electrodes 41 and 42, the electric charge storage capacitor 92 is discharged so that the voltage is again changed into "L".

All mechanical dimensions of the wheel train in the watch include errors, and clearance is present in an up-down direction and in a rotating direction of the gear. For this reason, the detected voltage Vcrg greatly changes and also the phase changes slightly according to backlash of pulse motor driving and a direction of the watch. As examples, a curve 112 in FIG. 14 represents a voltage when the watch faces upward, and a curve 113 represents a voltage when the watch faces downward.

As for the phase detected information, when the detected voltage Vcrg is low, an error signal is generated due to an influence of an noise. That is to say, there is a big possibility in that when the capacitor 92 is charged, the timing at which voltage of the capacitor changes from "L" to "H" with respect to the comparison reference voltage 111 is shifted. When the detected voltage Vcrg is, however, high, it is possible to obtain accurate position information. In a range, therefore, where the detected voltage Vcrg is changed from "H" to "L" in the vicinity of the hole center, namely, when the detected voltage Vcrg is high, the detection is hardly influenced by noise so that accurate position information can be obtained. A point 114, therefore, where Vcrg is changed from "H" into "L" is hardly changed due to a difference in the posture of the watch and the like, and thus it is effective that this timing is read as the reference position.

In FM broadcasting system, when a radio wave from a far broadcasting station becomes weak, the noise increases. In order to prevent this problem, a squelch circuit is provided in a FM receiver, and a threshold value of the squelch circuit is set to a received signal level in an FM receiver. And this squelch circuit suppresses a detected output having a level not higher than the threshold value. The present invention is used for transmitting and receiving a signal between electrodes in a close distance in the watch, but the squelch circuit is provided in order to suppress a noise when a pattern hole for detection of the detecting wheel 43 is in a position other than the periphery of the detecting electrodes.

The above-mentioned squelch circuit outputs a squelch signal in response to a received signal level. In another effective method, the squelch is attained by a time gate whereby a time at which next hole position is detected is predicted based on the timing with which the hole position detected signal is securely captured and masks input signals input for the periods up to the predicted time.

In the constitution of the present invention, the information about the phase measured result represents the hole position of the gear of the wheel train to be measured, and after the pulse motor for driving the wheel train is driven, the rotating position of the wheel train can be measured securely only once in every time of the measurement. It is not always necessary to measure the hole position continuously. The detected information which is obtained by the most simplified detecting system in the present invention is 1 bit, and it represents whether or not the rotating angle of the hole position of the wheel train gear exceeds a specified angle at specified time. In order to define the angle of the wheel train gear, therefore, the counting number is reset, and the electric counting circuit and the pulse motor for driving the wheel train are driven in parallel by one rotation of the gear, and position detected data are stored by using the counted value of the electric counting circuit as an address. Thereafter, the hole position as the result can be determined according to the pattern of the data with respect to the address.

The contents of the measurement are briefly explained as follows. The position is measured intermittently from a state in which the pattern hole for detection is not present in the vicinity of the detecting electrode. The rotating angle of the wheel train is measured in the following procedure. Wait state information until the pattern hole for detection reaches the detecting electrode is detected. An L level of the detected data obtained from a time when the pattern hole for detection is arrived at the detecting electrode to a time when the center of the pattern hole for detection is detected. A change of the detected data from the "L" level into the "H" level at the center of the pattern hole for detection is detected. Thereafter, maintenance of the H level according to the movement of the gear is confirmed, and the wait state information for the period from passing of the pattern hole for detection over the detecting electrode to the original rotating position is detected.

In order to measure the hole center position, it is necessary that presence of the detecting electrode in the vicinity of the hole position is measured and the angle position of the wheel train in the vicinity of the hole is measured finely. In order to decide the position thereof from the entire image of the measured data, a circuit which make a determination based on an amplitude component of the detected signal that the measured data has less noise and represents "a non-wait state" in that the phase detected information serve as important data or a circuit which stores a certain wait time zone after the phase detecting circuit changes the output logic value as wait time zone in the electric watch is required. A non-squelch signal {/Scl–out} gate signal is generated based on the amplitude detected signal or the time zone signal of the electric watch.

Figure 16:
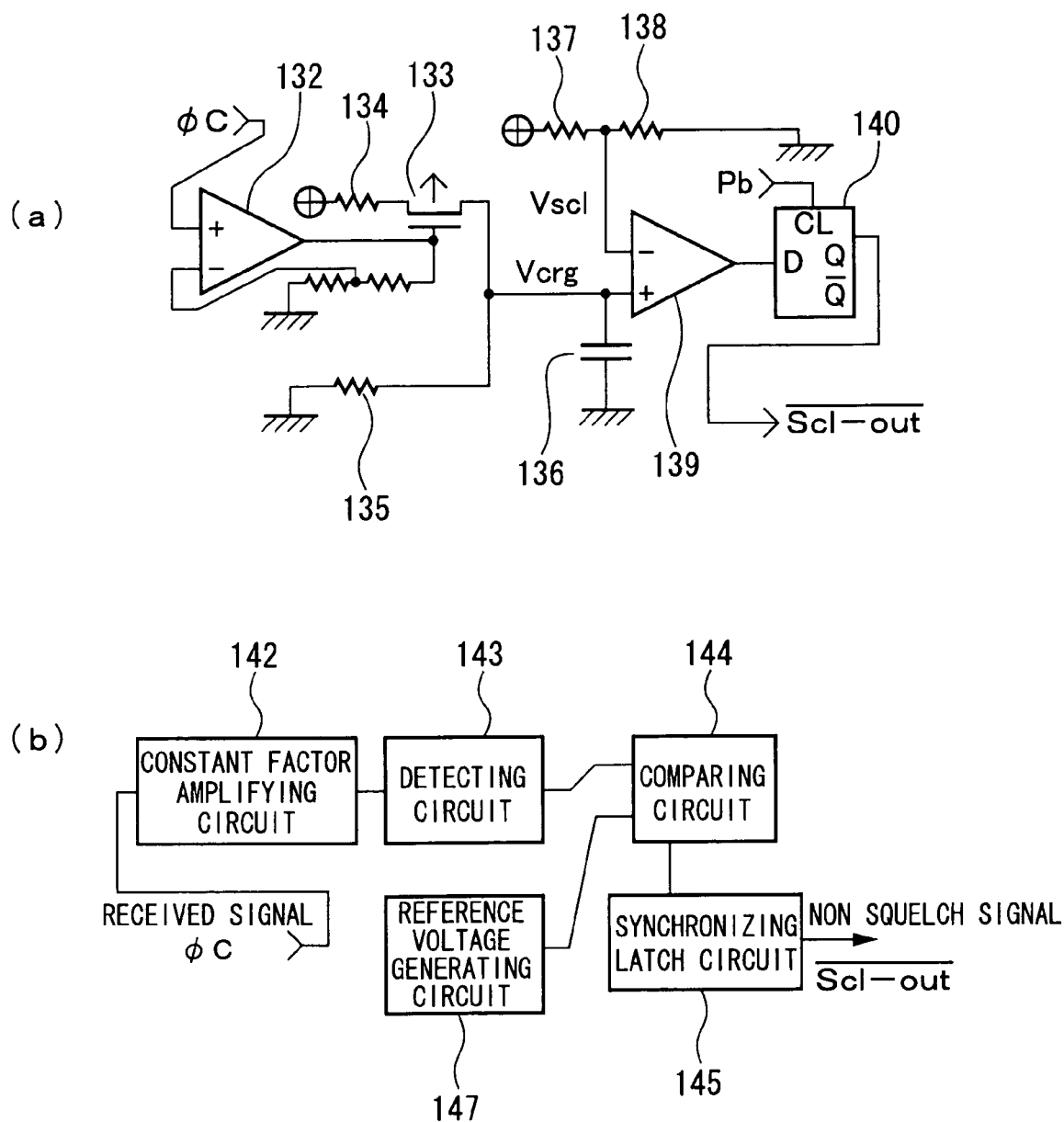
FIGS. 16(a) and 16(b) are a circuit diagram and a block diagram of a noise control circuit according to the first example.

FIG. 16(*a*) illustrates one example of the amplitude detecting circuit for suppressing noise in order to generate the non-squelch signal {/Scl–out}. An amplifying circuit 132 with constant amplification factor amplifies the weak received signal φc. The amplifying circuit 132 is multiplied by negative feedback of 1/K due to resistance potential division so that the amplification factor becomes K times as large as the original amplification factor regardless of ambient temperature and power supply voltage.

The threshold value, which is the reference of the amplification comparison, is determined by a threshold value and carrier mobility of an FET 133 and is slightly larger than the threshold value of the FET 133, and temperature characteristics of the threshold value and temperature characteristics of the mobility are compensated by each other. A resistor 134 determines a current level of the charging operation of the FET 133, and a resistor 135 determines a current level of discharge. When K×(a crest value) of the received signal φC of AC input exceeds the threshold value of the FET 133, the capacitor 136 starts to be charged. When discharge resistance 135 is set to be sufficient large, the capacitor 136 is charged with electric charges in a sampling manner according to the crest value which exceeds the threshold value of the FET 133, and the electric charges are held for time corresponding to about electrical discharge time constant.

A comparing circuit 139 compares the voltage Vcrg of the capacitor 136 due to the electric charges stored in the capacitor 136 with the voltage Vscl obtained by dividing the power supply voltage using the resistors 137 and 138. A logic value of the result is stored in a latch circuit 140 in a cycle of the transmitted signal. In such a manner, the discrimination of the crest value component of the AC detected signal and the generation of the non-squelch signal (/Scl–out) can be realized. A source supply potential on a source side of the FET 133 can be a periodically fluctuating threshold value by applying a pulse of the reference signal Pab instead of a +DC power supply voltage or a voltage obtained by dividing the sine wave voltage from which harmonic of Pab is removed. The removal of the harmonic can be realized by a circuit similar to the bandpass amplifying circuit 74 in FIG. 9 where an input dividing circuit is combined with a selection amplifying circuit.

The constitution of FIG. 16(*a*) is represented by a functional block as shown in FIG. 16(*b*). In FIG. 16(*b*), the amplifying circuit 142 with constant amplification factor amplifies the received signal φC according to constant magnification, and the detecting circuit 143 extracts an amplified component. The comparing circuit 144 compares the received signal φC with the reference voltage generated by a reference voltage generating circuit 147 so as to detect that the received signal φC has an amplitude not less than the set amplitude. A latch circuit 145 latches the output signal of the comparing circuit 144, and outputs a non-squelch signal (/Scl–out) which represents that the phase detected output has meaning.

FIG. 17(*a*) illustrates another example of the amplitude detecting circuit for generating the non-squelch signal {/Scl–out}. An amplifying circuit 169 with constant amplification factor amplifies the weak received signal C. The amplitude threshold value comparison value is obtained from reference signal Pab, and this amplitude threshold value comparison value, namely, the fluctuation threshold value, is obtained by dividing Pab using by resistors 151 and 152. A slightly complicated circuit for replacing a signal by a signal obtained by removing harmonic component from Pab obtains a rational threshold value. A comparison amplifying circuit 153 compares a signal voltage obtained from the amplifying circuit 169 with the fluctuation threshold value, and a diode 154 rectifies the signals, and a circuit having the discharge time constant determined by a capacitor 155 and a resistor 168 temporarily holds the result. A latch circuit 156 stores the result as a logic value thereinto and outputs a non-squelch output (/Scl–out) using a signal Pb as a clock.

The constitution in FIG. 17(*a*) is represented by a functional block as shown in FIG. 17(*b*). In FIG. 17(*b*), K·φC is obtained in such a manner that an amplifying circuit 161 with K-times constant magnification amplification factor amplifies the received signal φC so as to obtain a signal K·φC, and a comparison reference voltage Vref is generated by a reference voltage generating circuit 164. K·φC and the comparison reference voltage Vref are input into a comparison amplifying circuit 162, and the input signal is amplified and the saturated signal is output. The amplified signal is detected by a detecting circuit 163, and is temporarily stored in a latch circuit 165 so as to be output as a non-squelch output (/Scl–out).

The position detecting system in the above-explained example is constituted so that the amplitude of the received signal φC is detected, a detection is made that the hole is close to the transmitting/receiving electrode, and the accurate position is detected by the phase information of the received signal φC. The position thereof can be, however, detected by either one of the detection of the phase and the detection of the amplitude. In this case, the reliability of the position detection is deteriorated due to a noise or the like, but the circuit configuration can be simplified.

One of main points in the constitution of the present invention is that the influence of the clearance in the mechanism is suppressed by the differential operation using a plurality of transmission paths.

Figure 18:
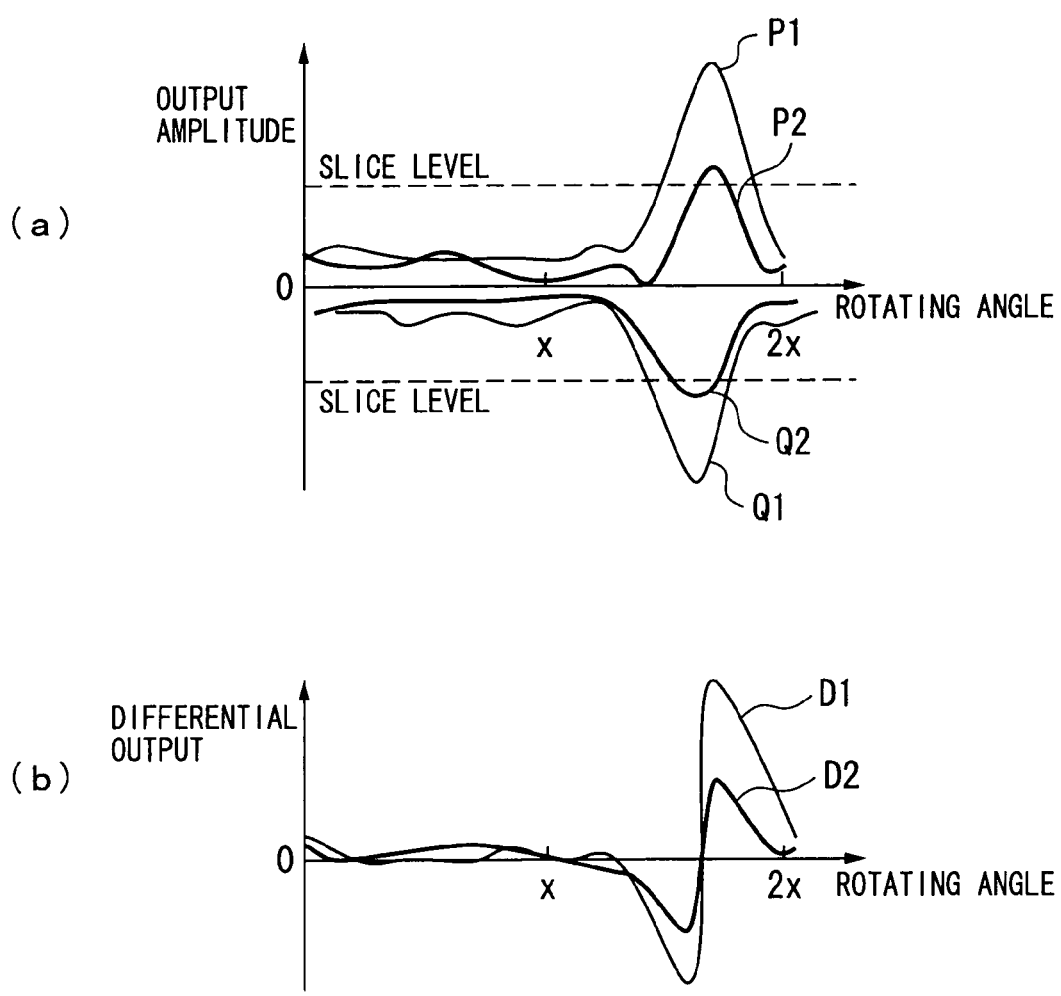
FIGS. 18(a) and 18(b) are diagrams illustrating each single transmission path detected output and differential output properties of a plurality of transmission paths according to the first example.

According to the above viewpoint, FIG. 18(*a*) represents sets of the amplitude voltages of a φC component {P1, Q1} and {P2, Q2} which are on up and down positions with respect to an axis of the amplitude 0 and in which the rotating angle is read along the lateral axis. Note that when each one of the transmitting signals φA and φB is independently transmitted through a single transmission path, respectively, and the φC component corresponds to the transmitted signals φA and φB and is taken out from the received signal φC, and a set of the amplitude voltage of the φC component corresponding to the transmitted signals φA and φB is determined as {P1, Q1} and {P2, Q2}, respectively. Jolting of the gear due to the clearance in axial direction differs depending on the postures of the wrist watch, for example, like the sets of the amplitude of the received signal {P1, Q1} and {P2, Q2}. When, therefore, the detected voltage is sliced on a single transmission path at a constant slice level, detecting angles of P1 and P2 (=rotating angle where the slice level match the detecting level) show different values according to the postures of the wrist watch.

FIG. 18(*b*) is a graph where the differences in FIG. 18(*a*) are calculated. In the drawing, D1=P1–Q1 ., and D2=P2–Q2. As to D1 and D2, the rotating angles at the zero cross point where the difference output signal switches a symbol become equal with each other, and thus the differential detecting method reduces the influence of the jolting of the wheel train.

Another constitution which suppresses noise and improves the reliability of the position detection is explained below. In a signal which is obtained by amplifying and saturating the received signal φC without suppressing noise, its internal noise is also amplified to a saturating level. For this reason, a spike-shaped noise signal is generated. When, however, the measurement is carried out successively three times, for example, and a majority logic of the obtained three signals is output, the spike-shaped noise is eliminated. Since the wheel train gear may be measured after the intermittent driving of the motor in the watch, in the actual position detection, the signal is sampling-detected intermittently.

Another constitution for eliminating noise is explained. The detected signal, which is obtained by amplifying the received signal φC including noise, becomes a pulse signal including a spike-shaped noise. The pulse type detected signal is allowed to pass through a low-frequency filter composed of a publicly-known approximate integrating circuit, and the spike noise component is eliminated so that P0 (θ) is obtained. Further, the latch circuit creates PΔ (θ) which is delayed by certain short time Δt logically.

When AND of inverted signals of P0 (θ) and PΔ (θ) is designated by Pdet:

$$Pdet=P0(\theta)\cdot\{/P\Delta(\theta)\}$$

Pdet becomes a pulse with width Δt which match a rise where the signal with narrow width from which the spike noise is eliminated is changed from the "L" level into the "H" level. This pulse gives the angle of the hole center position. When the low-pass filter can eliminate the spike noise sufficiently, the circuit for detecting the hole position can be simplified greatly. Suppression of noise by means of creation of a window function and a squelch signal can be omitted.

The above example uses the signals having different phases and same frequency as the transmitted signals, but can use signals with different frequencies in a synchronous relationship.

FIG. 19 is a diagram illustrating an example when the frequencies in the synchronous relationship are adopted.

In this example, 16,384 Hz is adopted as φA, and 8,192 Hz is adopted as φB. φA is input into the transmitting electrode 41 and φB is input into the transmitting electrode 42, and the received signal is taken out from the receiving electrode 44 via the detecting wheel 43.

When the hole 45 of the detecting wheel 43 is on the side of the transmitting electrode 41, as shown in FIG. 19(*a*), φC which is close to φA is obtained from the receiving electrode 44. When the hole 45 of the detecting wheel 43 is in the middle between the transmitting electrodes 41 and 42, φC shown in FIG. 19(*b*) is obtained. When the hole 45 of the detecting wheel 43 is on the side of transmitting electrode 42, as shown in FIG. 19(*c*), φC which is close to φB is obtained from the receiving electrode 44.

An output change from the receiving signal 44 is detected, and the phase of the output change is compared with the phase of the reference signal so that the position of the detecting wheel 43 can be detected.

In this case, the position of the detecting wheel 43 may be detected based on the phase and the amplitude of the detected signal.

Figure 20:
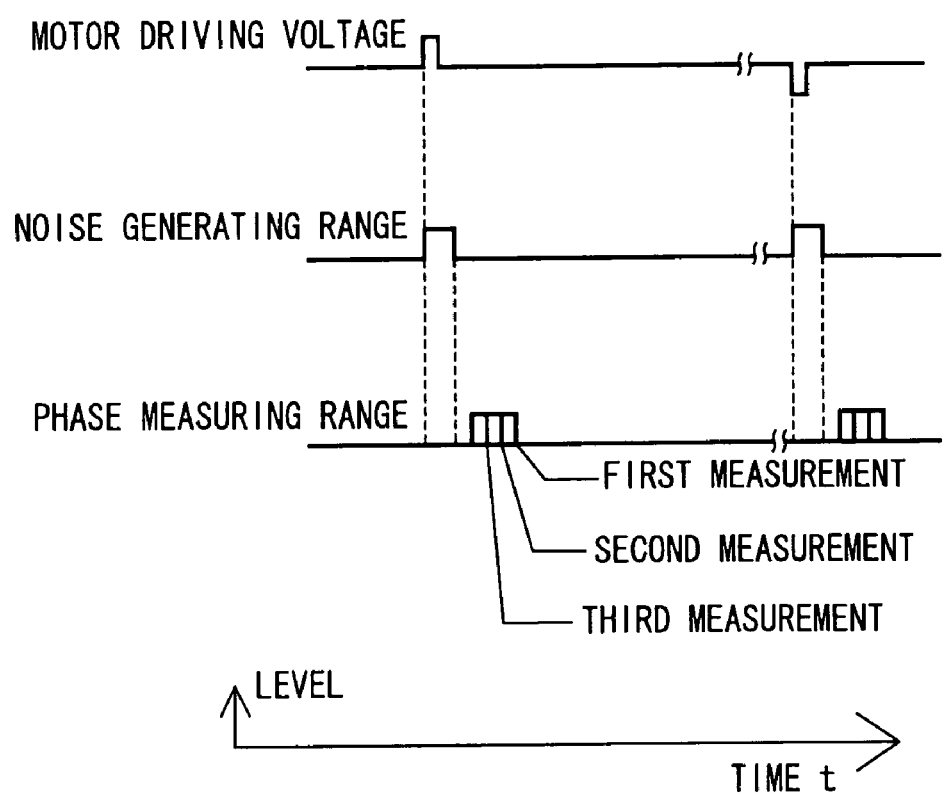
FIG. 20 is a diagram illustrating a relationship between a driving timing of a motor and a wheel track position detecting timing in the watch according to the first example.

FIG. 20 is a diagram for explaining the timing of the measurement of the wheel train gear position. At a moment when the pulse motor of the watch is driven, extremely large instantaneous power which is 1000000 times as large as an average power is consumed in the watch system of low power consumption. For this reason, while and just after the motor is driven, a voltage of a galvanic cell in the power supply fluctuates. At the moment of the driving, large electromagnetic noise is generated. The operation for the position detection according to the weak electric field detection in the present invention should be performed in such a manner that the operation is sufficiently separated from the motor driving phase, namely, in margin for time.

When disturbance due to the internal noise in the amplifying circuit is considered for the measurement of the weak electric field, it is necessary that the position measurement is carried out at plural times, and the measured results are processed by the majority logic circuit so that the most probable value is estimated. The measurement in FIG. 20 is an example of the timing chart in the case where the position is measured at odd number of times when certain time passes after the motor is driven. The detecting position is determined by majority of the detected results of the measurement at odd number of times at timing where the noise generating range is avoided.

Figure 21:
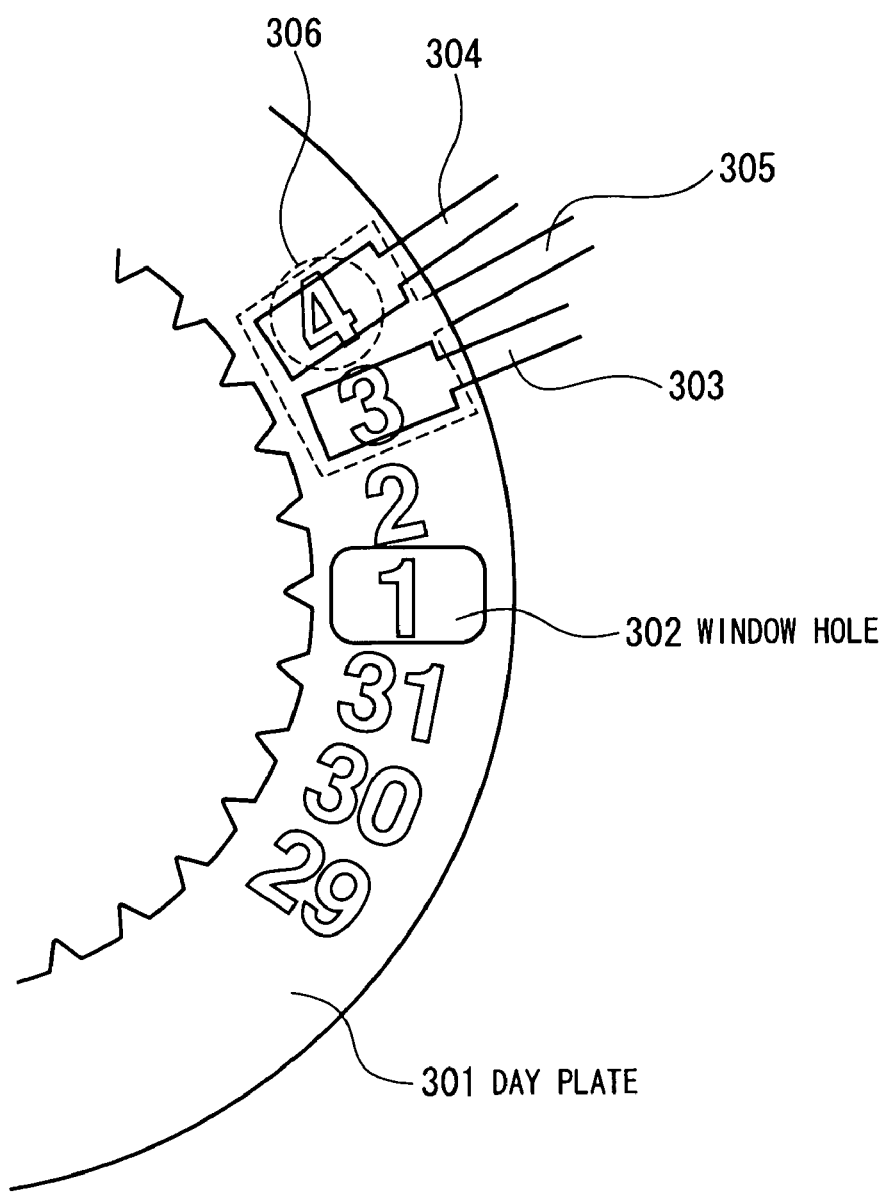
FIG. 21 is a plan view illustrating a day plate where the first example is applied to a calendar display watch.

The above embodiments explain the constitution for detecting the position of the time information by means of the driving wheel train, but as another embodiment, this constitution can be applied also to the detection of the information about the calendar display position. FIG. 21 is a plan view for explaining the constitution for detecting the position of the day plate 301 for displaying day. In FIG. 21, days from 1 to 31 are printed on the surface of the day plate 301, and one day is displayed through a window hole 302 of a dial plate.

In FIG. 21, a day of 1 is displayed. The rotation of the motor in the electromechanical transducer, not shown in the day plate 301, is transmitted to the day plate 301, so that the day plate 301 rotates by one display in one day. The transmitting electrodes 303 and 304 are arranged on the upper surface of the printed position of 3 and 4 on the day plate 301, and the receiving electrode 305 is arranged on the lower surface in an opposed manner. The day plate 301 is made of a plastic material, and a metal film is applied to its lower surface so as to be grounded with a watch move. The lower surface of the printed position of 4 has a circle 306 which is a non printing portion.

In the state of FIG. 21, only the signal from the transmitting electrode 304 is transmitted to the receiving electrode 305, and the signal from the transmitting electrode 303 is shielded by the day plate 301 so that the signal from the transmitting electrode 303 is not transmitted to the receiving electrode 305. When the day plate 301 once rotates and 2 is displayed through the window hole 302, the circle 306 moves to the transmitting electrode 303, so that only the signal from the transmitting electrode 303 is transmitted to the receiving electrode 305. A change of the signals transmitted to the receiving electrode 35 is read, so that a reference position of the day plate 301 can be detected. As shown in the drawing, when the position detection of the day plate 301 is executed in a day position different from that of the window hole 302, the detection can be executed without influencing the day display.

When positions of the day plate, a month plate and a year plate in the wrist watch can be confirmed, the wrist watch including a perpetual calendar, which does not require month-end date correction, can be realized by a simple mechanism. The detecting timing may be limited to around midnight. A detecting angle allowable error is large. Amplitude detection and impedance detection using two or one transmitting electrode(s) can be, therefore, utilized. At the initial setting in a wrist watch to be corrected by a radio wave, an electric time system is rewritten instantaneously based on the received information, and mechanical time should be synchronized with the electric time.

It takes a lot of time to correct date, hour and minute by rapid traverse of second, but when second, hour and minute, and date are corrected in three blocks in parallel, the initial storage setting can be realized extremely quickly. Since such great time shift occurs about once in a several years, namely, the frequency is low like just after connection of a power supply battery, a simple method may be used. In this method, while hour, minute and second are driven at high speed, the detection on the transmitting and receiving electrodes of the wheel train is made successively, and a code hole inscribed on the gear is optically read as a time series code.

As is clear from the above explanation, in the first example of this application, it is preferable that the transmitting circuit has a function for shaping a plurality of transmitted signals in which the electric field is used as a carrier. Further, it is desirable that the receiving circuit has a function for amplifying the received signal.

On the other hand, it is preferable that the detecting circuit of the present invention has a function such that the received signal received by the receiving circuit detects mechanical position information of the signal modulating member according to electric field propagating properties such that the electric field is propagated in a certain place but is not propagated in another place.

Further, the detecting circuit of the present invention is the phase detecting circuit, and it is desirably constituted so as to detect the mechanical position information of the signal modulating member according to the phase information of the received signal modulated by the modulating member. Moreover, the detecting circuit may be the amplitude detecting circuit, and in this case, it is desirably constituted so as to detect the mechanical position information of the signal modulating member according to signal intensity information of the received signal modulated by the signal modulating member.

In the present invention, the detecting circuit includes both the phase detecting circuit and the amplitude circuit, determines the detecting range of the mechanical position information of the modulating member based on the signal intensity information of the received signal modulated by the signal modulating member. Further the detecting circuit is desirably constituted so as to detect the position information of the signal modulating member based on the phase information of the received signal modulated by the signal modulating member. The plural transmitted signals may be signals with different phases and same frequency.

In the present invention, the transmitted signals may be signals with different frequencies in the synchronous relationship.

In the present invention, it is desirable that a plurality of the transmitted signals have sine waves or waveforms approximate to the sine wave.

On the other hand, in the present invention, it is desirable that the phase detecting circuit is configured so as to change a voltage of the phase detected output according to the states in which the phase of the received signal modulated by the modulating member advances or delays with respect to the phase reference signal which is the reference of the phase detection.

For example in the present invention, one of the preferable examples is such that the phase detecting circuit has a delay/advance detecting means, a charge/discharge switching means and a voltage detecting means. The delay/advance detecting means detects the delay or advance of the phase of the received signal with respect to the phase reference signal to be the reference of the phase detection, and outputs a pulse signal whose pulse width is a phase difference between the phase reference signal and the received signal. The charge/discharge switching means charges a capacitor with electric charges whose amount is proportional to the pulse width of the pulse signal according to delay/advance output, or discharges the capacitor at an electric charge amount proportional to the pulse width of the pulse signal. The voltage detecting means compares a terminal voltage of the capacitor with a predetermined voltage so as to output the compared result.

In the present invention, the signal modulating member may be constituted so that its shape or some of the components have/has conductivity or permittivity different from those of another portions. Further, the signal modulating member is made of a conductive metal material, and may have a hole, or its one portion having a notch or a convexo-concave shape.

In the present invention, the signal modulating member is made of a non-conductive member such as plastic and a conductive metal material, and one portion of the metal material may have a hole, a notch, or a convexo-concave shape. Further, the signal modulating member is made of a non-conductive member such as plastic, and one portion of the non-conductive member may be plated with metal.

The signal modulating member of the present invention may be composed of a part of the wheel train for transmitting the rotation driven by the electromechanical transducer to the rotating member to be measured having a hand display function. It is desirable that the signal modulating member is constituted so as to have a mechanism for detecting the reference position of the rotating member to be measured by the mechanical position information of the signal modulating member.

Meanwhile, as another example of the present invention, the signal modulating member is composed of a part of the wheel train for transmitting the rotation driven by the electromechanical transducer to the rotating member to be measured having the date display function or the date indicator. The signal modulating member may be constituted so as to have the month-end automatic correcting function for detecting the reference position of the rotating member to be measured or the date indicator based on the mechanical position information of the signal modulating member and automatically eliminating a month-end nothing day in even month based on the electric calendar information held in the watch circuit.

The transmitting electrode and the receiving electrode of the present invention may be arranged in an opposed manner so as to sandwich the modulating member. Further, the transmitting electrode and the receiving electrode may be arranged in the opposed manner on the one surface of the modulating member.

On the other hand, a single or plural number of the transmitting electrode may be arranged, or a single or plural number of the receiving electrode may be arranged.

In the present invention, a reference signal generating circuit may be provided so as to generate a reference signal for detecting the position information of the signal modulating member based on the plural transmitted signals output from the transmitting circuit. The signal modulating member may modulates the phase or the frequency of the transmitted signals.

As explained based on the first example, the mechanical position information of the wrist watch can be detected by non-contact, low current, low voltage, small space and low cost, and the electric watch with high reliability with less deterioration with time can be provided. Further, a wrist watch with high reliable holding time, a radio wave correcting wrist watch with a short-time time correcting function, and a wrist watch with month-end automatic correcting function can be realized. Further, an electric field detecting type thin wheel train position detecting mechanism, which has been required but could not be realized, can be realized by the differential detecting method using a plurality of the transmission paths for passing of the wheel train of the present invention in order to use large hands.

Further, according to the present invention, in the method of directly detecting a single electric field which is conventionally considered, since a principle that a change in spacial intensity of the electric field is detected is utilized, a change in the space dependence intensity of the electric field is smooth.

As a result, a specified point of the wheel train cannot be detected finely. Since the watch posture difference dependence of the electric field intensity due to the clearance of the wheel train is large, this prior art method cannot be used for the position detection. Such problems are solved in the differential detecting system on the plural transmission path according to the present invention. Particularly a difference of the phases is utilized, the phase detecting circuit is provided so that amplitude or polarity of the detected signal can cross zero when the signal passes through a specified point. As a result, a design in which the space position is detected finely can be provided. Further, the influence of the difference in the postures of the watch can be reduced by the differential detection.

SECOND EXAMPLE

Figure 22:
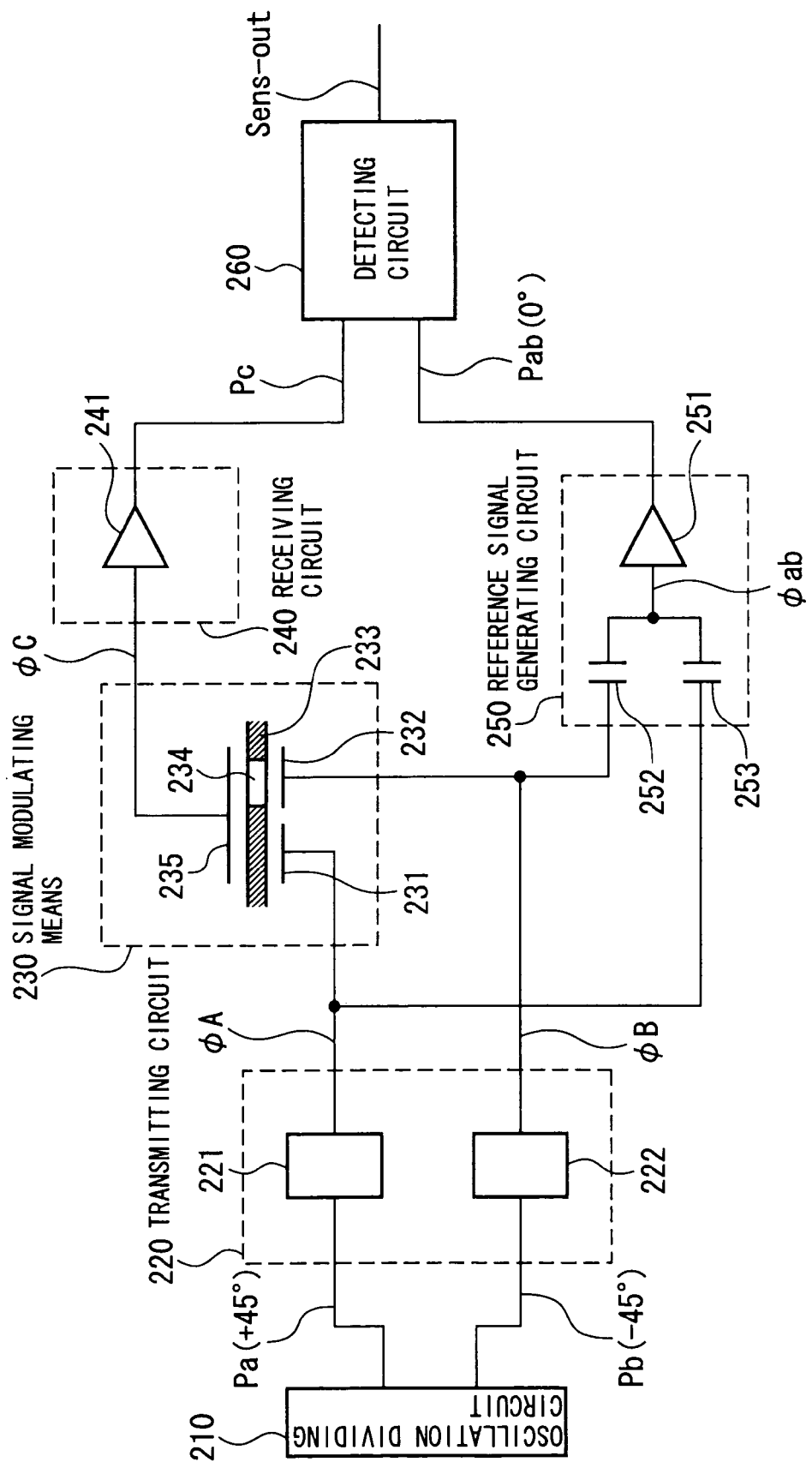
FIG. 22 is a block diagram illustrating a constitution of a position detecting system of an electric watch according to a second example of the present invention.
Figure 23:
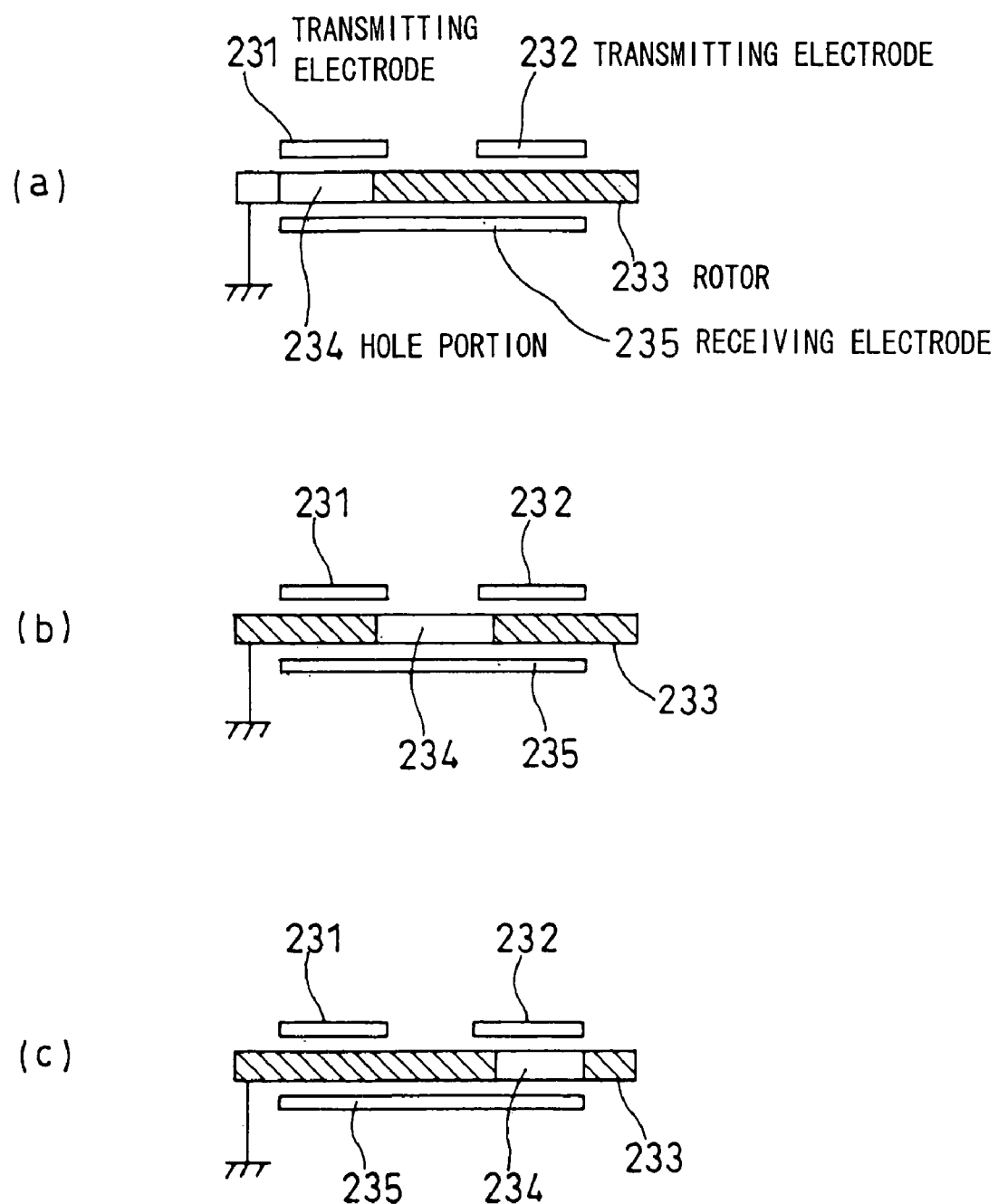
FIGS. 23(a), 23(b) and 23(c) are sectional views illustrating a positional relationship between a transmitting electrode, a receiving electrode and a hole portion of a rotor.
Figure 24:
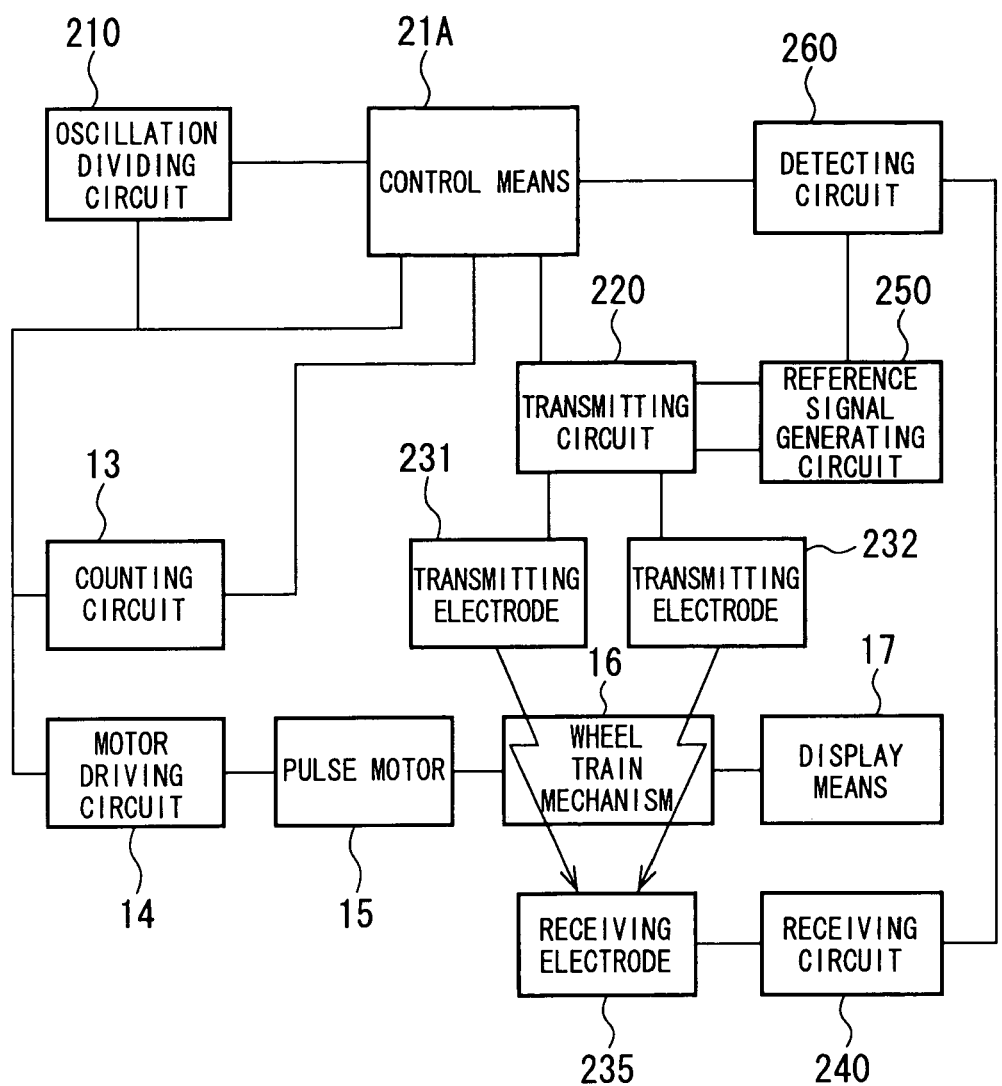
FIG. 24 is a functional block diagram of the second example.

FIGS. 22 to 24 are diagrams for explaining a second example of the present invention.

In the second example, the arrangement and the constitution of the transmitting electrode, the rotor and the receiving electrode are the same as those shown in FIG. 2 of the first example. Further, the arrangement and the constitution of the fourth wheel, the fifth wheel and the detecting wheel are the same as those shown in FIG. 6 of the first example. The waveforms of the respective portions are, therefore, same as those shown in FIG. 11.

That is to say, the basic technical constitution of the electric watch of the second example is as follows. The electric watch having the detecting mechanism for detecting the position information of the rotating member to be measured includes a transmitting circuit, the transmitting electrode, signal modulating means, the receiving electrode, a receiving circuit, a reference signal generating circuit and a detecting circuit. The transmitting circuit generates a plurality of transmitted signals. The output signal from the transmitting circuit is applied to the transmitting electrode. The receiving electrode receives a signal from the transmitting electrode. The rotor is provided between the transmitting electrode and the receiving electrode, and modulates the transmitted signal output from the transmitting electrode. The modulated signal received by the receiving electrode is input to the receiving circuit. The reference signal generating circuit generates a reference signal for detecting the position information of the rotor based on the transmitted signals output from the transmitting circuit. The detecting circuit compares the output signal from the receiving circuit with the reference signal from the reference signal generating circuit so as to detect the mechanical position information of the rotor.

The position detecting system in the electric watch according to the second example of the present invention is explained with reference to FIG. 22.

In FIG. 22, the position detecting system is composed of a transmitting circuit 220, signal modulating means 230, a receiving circuit 240, a reference signal generating circuit 250, and a detecting circuit 260. The transmitting circuit 220 includes two bandpass filter amplifying circuits (hereinafter, BPF amplifying circuits) 221 and 222. The signal modulating means 230 includes transmitting electrodes 231 and 232, a rotor 233 having a hole portion 234, and a receiving electrode 235. The receiving circuit 240 includes an amplifying circuit 241. The reference signal generating circuit 250 includes capacitors 252 and 253 and an amplifying circuit 251.

A connecting relationship in the position detecting system of FIG. 22 is explained below.

In the electric watch, an output terminal of an output pulse Pa (+45°) of an oscillation dividing circuit 210 is connected with an input terminal of the BPF amplifying circuit 221 in the transmitting circuit 220. An output terminal of an output pulse Pb (−45°) in the oscillation dividing circuit 210 is connected with an input terminal of the BPF amplifying circuit 222 in the transmitting circuit 220. Further, an output terminal of the BPF amplifying circuit 221 is connected with the transmitting electrode 231 of the signal modulating means 230 and one terminal of the capacitor 253 in the reference signal generating circuit 250. An output terminal of the BPF amplifying circuit 222 is connected with the transmitting electrode 232 of the signal modulating means 230 and one terminal of the capacitor 252 in the reference signal generating circuit 250. The receiving electrode 235 is connected with an input terminal of the amplifying circuit 241 in the receiving circuit 240. An output terminal of the amplifying circuit 241 is connected with a signal input terminal of the detecting circuit 260. An output terminal of the amplifying circuit 251 in the reference signal generating circuit 250 is connected with a detecting input terminal of the detecting circuit 260.

The oscillation dividing circuit 210 includes a quartz oscillating circuit for oscillating according to the reference oscillating frequency φ15 shown in FIG. 11. The reference oscillating frequency φ15 is converted into the pulse signal P15 so as to be used as the reference signal source. The pulse signal P15 is divided by a publicly-known dividing circuit, so that two output pulses Pa (+45°) and Pb (−45°) whose phases shift from each other by π/2 (hereinafter, Pa (+45°) is designated by Pa, and Pb (−45°) is designated by Pb. Pa is applied to the input of the BPF amplifying circuit 221 of the transmitting circuit 220, and Pb is applied to the input of the BPF amplifying circuit 222 of the transmitting circuit 220. As a result, the transmitted sine wave signals φA and φB whose phases are different from each other by π/2 are generated.

The transmitted sine wave signal φA is transmitted from the transmitting electrode 231 of the signal modulating means 230, and the transmitted sine wave signal φB is transmitted from the transmitting electrode 232 of the signal modulating means 230. The received sine wave signal φC which is received by the receiving electrode 235 becomes a signal which is modulated according to a change in the position relationship between the hole portion 234 and the transmitting electrodes 231 and 232 due to rotation of the rotor 233.

The received sine wave signal φc is modulated according to the change in the position relationship between the hole portion 234 and the transmitting electrodes 231 and 232 due to the rotation of the rotor 233. Since this state is already explained in the first example with reference to FIG. 11, the detailed explanation thereof is omitted.

The received sine wave signal φC is amplified so as to be saturated by the amplifying circuit 241, the amplified signal becomes a received signal Pc having phase information. The received sine wave signal φC as shown in FIG. 23(a) is indicated as a received signal φC(1) in FIG. 11, and the received sine wave signal φC as shown in FIG. 23(c) is indicated as a received signal φC(2). The received signal φC is amplified by the receiving circuit 240 so as to become a signal Pc, and the phase of the signal Pc is detected by the detecting circuit 260.

In the reference signal generating circuit 250 for generating the reference signal Pab for detection, the transmitted sine wave signal φA from the BPF amplifying circuit 221 of the transmitting circuit 220 is input into the capacitor 253 of the reference signal generating circuit 250. Further, the transmitted sine wave signal φB from the BPF amplifying circuit 222 is input into the capacitor 252. The capacities of the capacitors 252 and 253 are equal with each other, so that the sine wave with the phase which is just intermediate between the transmitted sine wave signals φA and φB is input into the input terminal of the amplifying circuit 251 and is amplified so as to be saturated by the amplifying circuit 251. As a result, the reference signal Pab of FIG. 11 can be obtained.

When a pulse signal, which is obtained by dividing the pulse signal P15 of the oscillation dividing circuit 210, is used as the reference signal Pab, the phase of the reference signal Pab does not change due to temperature condition and the like. The phases of the transmitted sine wave signals φA and φB, however, change due to the temperature characteristics of the EPF amplifying circuits 221 and 222 in the transmitting circuit 220. Therefore, the phase of the received sine wave signal φC changes and the phase of the received signal Pc also changes, as a result, a phase difference between the received signal Pc and the reference signal Pab changes due to the temperature condition. In order to prevent this, in the present invention, the reference signal generating circuit 250 generates a reference sine wave signal φab based on the transmitted sine wave Outputs φA and φB so that the references signal Pab is obtained. The received sine wave signal φc and the reference sine wave signal φab are generated from the transmitted sine wave signals φA and φB. Further, the amplifying circuit 241 of the receiving circuit 240 for outputting the received signal Pc and the amplifying circuit 251 of the reference signal generating circuit 250 for outputting the reference signal Pab have the same circuit configuration, the relationship 6f the phases in both signals are not changed so that the phases change relatively and uniformly even if they are influenced by the temperature. For this reason, the phase relationship between the signals do not change.

Since the detecting operation of the received signal Pc in this example is the same as that in the first example, the detailed explanation is omitted.

FIG. 24 is a block diagram of the entire electric watch using the position detecting system of the present invention. In FIG. 24, the power supply, such as a solar cell for light power generation and a secondary battery for charging light power generating energy provided in the electric watch are omitted.

In FIG. 24, the oscillation dividing circuit 210 including the quartz oscillating circuit as the reference signal source of the watch is provided, so as to output a plurality of counting time signals. The counting time signals are input into the motor driving circuit 14 by control of control means 21A including a microcomputer for controlling the entire electric watch. Further, the counting time signal is counted so as to be input also into the counting circuit 13 for holding the electric time. When the motor driving circuit 14 operates, the pulse motor 15 rotates in a stepped manner, and the mechanical time information is held by the wheel train mechanism 16 connected with the pulse motor 15. As a result, the time is displayed by the hands of the display means 17.

The output pulses Pa and Pb whose phases are different by π/2 output from the oscillator dividing circuit 210 are input into the transmitting circuit 220 directly or via the control means 21A. The output pulses Pa and Pb are converted into the transmitted sine wave signals φA and φB by the transmitting circuit 220 so as to be input into the transmitting electrodes 231 and 232 of the wheel train mechanism 16. The transmitted sine wave signals φA and φB are modulated and synthesized by the signal modulating means 230 so as to become the received sine wave signal φC. The received sine wave signal φC is received by the receiving electrode 235 and is amplified by the receiving circuit 240 so as to become the received signal Pc. The phase of the received signal Pc is compared in the detecting circuit 260 with the phase of the reference signal Pab generated in the reference signal generating circuit 250, and the mechanical time information held by the wheel train mechanism 16 is detected from the compared result. The control means 21A controls time synchronization or time setting based on the mechanical time information obtained from the detecting circuit 260 and the electric time information held in the counting circuit 13. The control information from an external operating means, not shown, for inputting the time information from the outside is input into the control means 21A, and the wheel train mechanism 16 is directly and mechanically operated so that the time can be set.

The transmitting electrodes 231 and 232 and the receiving electrode 235 are arranged in a non-contact manner so as to sandwich the rotor 233 of the signal modulating means 230. The received sine wave signal $\phi c$, which is obtained by being modulated by capacitive coupling of the transmitting electrodes 231, 232 and the receiving electrode 235, is input into the amplifying circuit 241 of the receiving circuit 240. Similarly, the transmitted sine wave signals $\phi A$ and $\phi B$ from the transmitting circuit 220 are input to the capacitors 252 and 253. The reference sine wave signal $\phi ab$ which is synthesized by capacitive coupling of the capacitors 252 and 253 is input to the amplifying circuit 251 of the reference signal generating circuit 250. The capacitors 252 and 253, which are used for capacitive coupling in order to obtain the reference sine weave signal $\phi ab$, can be chip capacitors, and it is preferable for reducing cost and space so that they are provided in one and the same circuit chip.

Since the received sine wave signal $\phi C$ which is transmitted via the gear is weak due to the size of the gear and a distance between the electrodes (50 to 100 $\mu m$), the capacitors provided in IC may be small. The transmitting circuit 220 and the reference signal generating circuit 2 so as well as the capacitors 252 and 253 are arranged on one and the same circuit chip.

In the position detecting system of the electric watch according to the second example of the present invention, as mentioned above, the transmitted sine wave outputs $\phi A$ and $\phi B$ of the BPF amplifying circuits in the transmitting circuits 220 are transmitted to the transmitting electrodes 231 and 232 of the signal modulating means 230. The received sine wave signal $\phi C$ from the received electrode 235 is amplified so as to be saturated by the amplifying circuit 241 of the receiving signal 240 so that the pulse type received signal Pc is obtained. The reference sine wave signal $\phi ab$ is generated at the capacitor end of the reference signal generating circuit 250 into which the transmitted sine wave outputs $\phi A$ and $\phi B$ are input. The reference sine wave signal $\phi ab$ is amplified so as to be saturated by the amplifying circuit 251 of the reference signal generating circuit 250, so that the pulse shape reference signal Pab is obtained. The two BPF amplifying circuits 221 and 222 of the transmitting circuit 220 have the same circuit configuration, and the amplifying circuit 241 of the receiving circuit 240 and the amplifying circuit 251 of the reference signal generating circuit 250 have the same circuit configuration. The amplitude of the signals and the amplification factor of the circuits are set so as to be equal with each other.

For this reason, the received signal Pc as the output from the receiving circuit 240 and the reference signal Pab as the output from the reference signal generating circuit 250 change together even if they are influenced by the temperature, and thus the phase relationship does not relatively change at all. For this reason, Sens-out of the detected output form the detecting circuit 260 can be stable without the influence of the temperature.

The BPF amplifying circuits 221 and 222 of the transmitting circuit 220, the capacitors 252 and 253 of the reference signal generating circuit 250, and the amplifying circuit 251 are provided in one and the same circuit chip. As a result, the cost reduces and the space can be small.

In the second example of the present invention, the reference signal generating circuit is a circuit which, for example, shapes the transmitted signals transmitted from the transmitting circuit, and outputs the reference signal. Further, it may be a circuit in which at least above-mentioned transmitting circuit and above-mentioned reference signal generating circuit are formed in one and the same circuit chip, and the capacitors for inputting the transmitted signals into the reference signal generating circuit is provided in the circuit chip.

In this example, the reference signal is obtained in the circuit in which the output of the transmitting circuit and the input of the reference signal generating circuit are connected by capacitive coupling using the capacitor formed in the circuit chip, and input signal of the reference signal generating circuit is shaped.

THIRD EXAMPLE

The position detecting system of the electric watch according to a third example of the present invention is explained below with reference to FIGS. 25 and 27.

That is to say, as the third example of the present invention, the electric watch, which has the detecting mechanism for detecting the position information of the rotating member to be measured, includes a transmitting circuit, the transmitting electrode, signal modulating means, the receiving electrode, a receiving circuit, a reference signal generating circuit and a detecting circuit. The transmitting circuit generates a plurality of transmitted signals. The output signal from the transmitting circuit is applied to the transmitting electrode. The receiving electrode receives a signal from the transmitting electrode. The rotor is provided between the transmitting electrode and the receiving electrode, and modulates the transmitted signal output from the transmitting electrode. The modulated signal received by the receiving electrode is input to the receiving circuit. The reference signal generating circuit generates a reference signal for detecting the position information of the rotor based on the transmitted signals output from the transmitting circuit. The detecting circuit compares the output signal from the receiving circuit with the reference signal from the reference signal generating circuit so as to detect the mechanical position information of the rotor. The electric watch further includes a signal fine adjusting circuit for adjusting at least one of the received signal and the reference signal based on the output from the detecting circuit, which represents the relationship between the received signal received by the receiving circuit and the reference signal shaped by the reference signal generating circuit.

That is to say, the position detecting system according to the third example of the present invention is provided with the signal fine adjusting circuit 254 instead of the capacitor 253 in FIG. 22 in order to finely adjust the phase of the reference signal Pab. The signal fine adjusting circuit 254 includes a first switch T1, a second switch T2, a third switch T3, and capacitors 255, 256 and 257 with different capacities. An output terminal of the BPF amplifying circuit 221 is connected with one terminals of the first switch T1, the second switch T2 and the third switch T3. The other terminal of the first switch T1 is connected with one terminal of the capacitor 255, and the other terminal of the second switch T2 is connected with one terminal of the capacitor 256. The other terminal of the third switch T3 is connected with one terminal of the capacitor 257, and the other terminals of the capacitors 255, 256 and 257 are connected with an input terminal of the amplifying circuit 251. The switches T1, T2 and T3 are composed of transmission gates (hereinafter, TG), and these switches as well as the capacitors are formed in an IC circuit chip.

Figure 25:
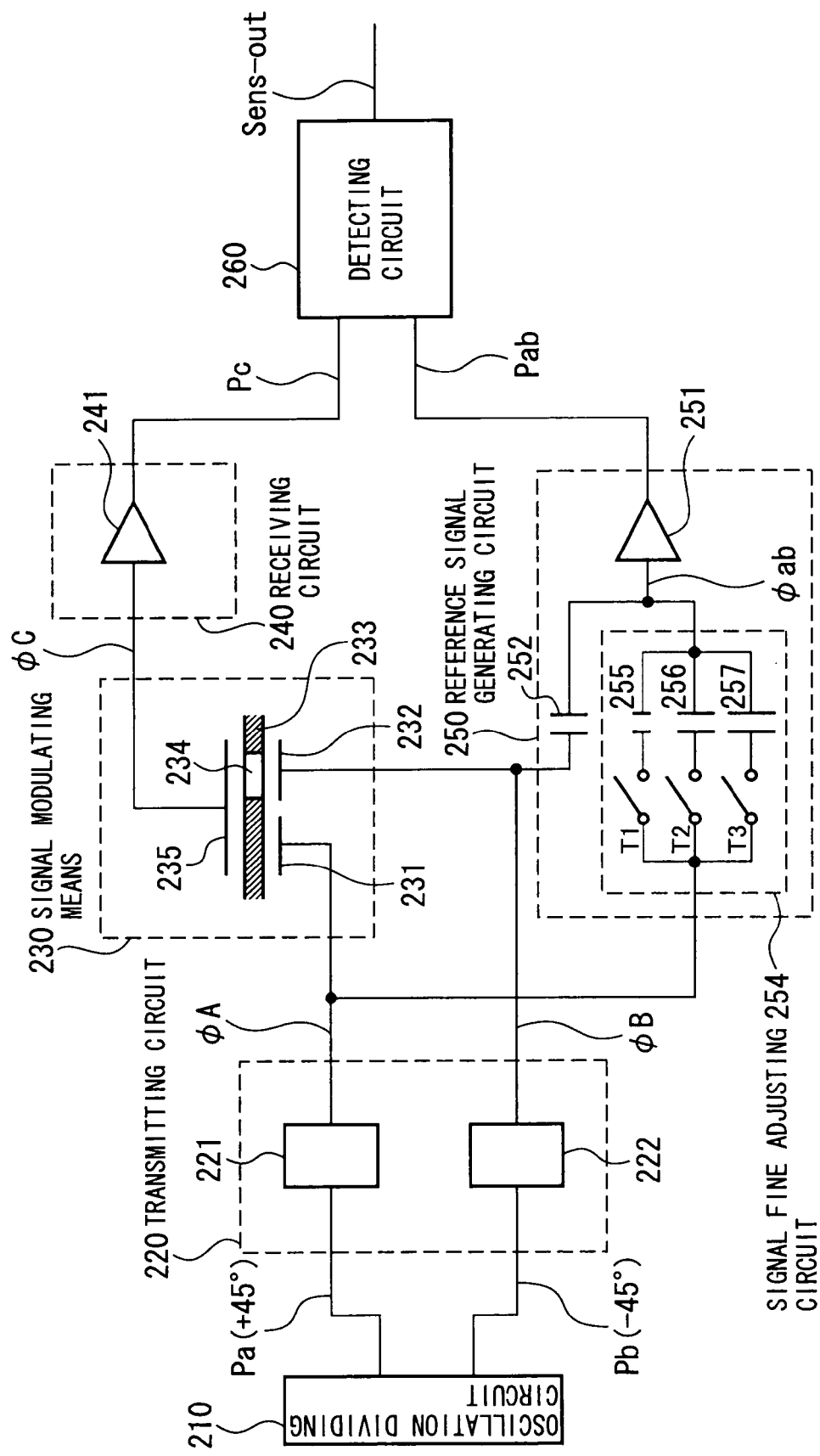
FIG. 25 is a block diagram illustrating a constitution according to a third example of the present invention.

The phase of the transmitted sine wave signal φA is not finely adjusted, but the signal fine adjusting circuit 254 is provided as shown in FIG. 25 instead of the capacitor 252 in FIG. 22 so as to be capable of finely controlling the phase of the reference signal Pab of the reference signal generating circuit 250.

The necessity of the fine adjustment will be explained with reference to FIG. 27.

For detecting hand position of the electric watch using the pulse motor, a phase detection is carried out in a state that the movement of the hands is stopped. When, however, the position of the second hand is detected, for example, the tooth positional relationships between a rotor and a rotor pinion, between a fifth wheel and a fifth pinion, and between a fourth wheel and a fourth shaft in the pulse motor are not established when the parts are assembled. Dispersion occurs in each watch, and the phase of the reference signal is close to the phase of the detected signal. Since the jolting of the backlash of the gears are always present, mis-detection is made that the phase of the received signal Pc is close to the phase of the reference signal Pab in the watches.

Figure 27:
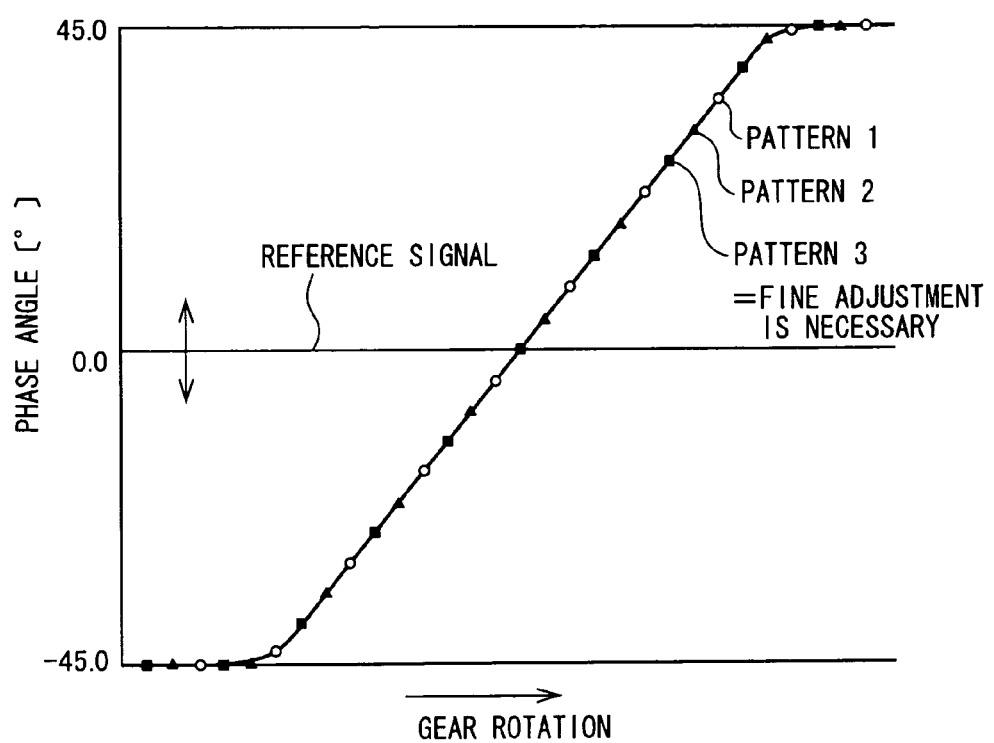
FIG. 27 is a diagram explaining a reason that a reference signal should be finely adjusted according to the third and fourth example of the present invention.

FIG. 27 is an explanatory diagram of the reason that the fine adjustment of the phases of the reference signal and the detected signal is necessary. The phase angles of the detected signal and the reference signal are plotted along a vertical axis, and the rotating position of the detecting wheel 43 (FIG. 6) is plotted along a horizontal axis. Each plot represents a stop position of the detecting wheel 43. As the rotation of the detecting wheel 43 proceeds, the received signal changes from −45° to +45°. For example in FIG. 27, in the case of a pattern 1, since the stop angles corresponding to white circle shift from the phase angle of the reference signal, the phase of the received signal is separated from the phase of the reference signal, and thus, mis-detection is not made. Similarly, in the case of a pattern 2, since the stop angles corresponding to black triangles shift from the phase angle of the reference signal, mis-detection is not made. In the case of a pattern 3, since some of the stop angles corresponding to black squares are close to the phase angle of the reference signal, the phase of the received signal is close to the phase of the reference pulse signal, and mis-detection is made.

In the case of the pattern 3, therefore, one of the transmitted sine wave signals φA and φB in FIG. 25 are modulated by a capacity value which is adjusted in capacitance which is obtained in a manner that the transmission gates T1, T2 and T3 are controlled so as to switch the capacitors 255, 256 and 257 of the signal fine adjusting circuit 254. The shift of a first reference signal Pab as the initial setting in the reference signal generating circuit 250 is shifted to the delay or advance direction so as to be a second reference signal Pab. As a result, like the pattern 1 or 2, the phases of the received signal and the reference signal are separated from each other, thereby preventing mis-detection.

It is desirable that the signal fine adjusting circuit of this example is configured so as to finely adjust either one of the phase of the received signal and the phase of the reference signal. Further, it is desirable that the signal fine adjusting circuit has a plurality of capacitors, and the capacitance value of the circuit is adjustable.

Further, in this example, it is preferable that the signal fine adjusting circuit has an amplitude adjusting circuit, and the amplitude adjusting circuit adjusts the amplitude of the transmitted signal on a path between the transmitting circuit and the transmitting electrode or between the transmitting circuit and the reference signal generating circuit.

On the other hand, in this example, as explained above, it is preferable that the signal fine adjusting circuit creates two-level states between the received signal and the reference signal, and selects a stable state based on the detected results of the states at plural times by means of the detecting circuit. Further, it is preferable that the signal fine adjusting circuit creates three-level states between the received signal and the reference signal, and selects a suitable state based on the detected result of the states by means of the detecting circuit.

FOURTH EXAMPLE

The position detecting system of the electric watch according to a fourth example of the present invention is explained below with reference to FIG. 26.

In the fourth example, the signal fine adjusting circuit 242 is provided in the input of the receiving circuit 240 in FIG. 22 of the second example. In the case of the pattern 3 in FIG. 27, instead of the phase of the reference signal Pab from the reference signal generating circuit 250 being shifted, the phase of the received signal Pc from the receiving circuit 240 is shifted.

Figure 26:
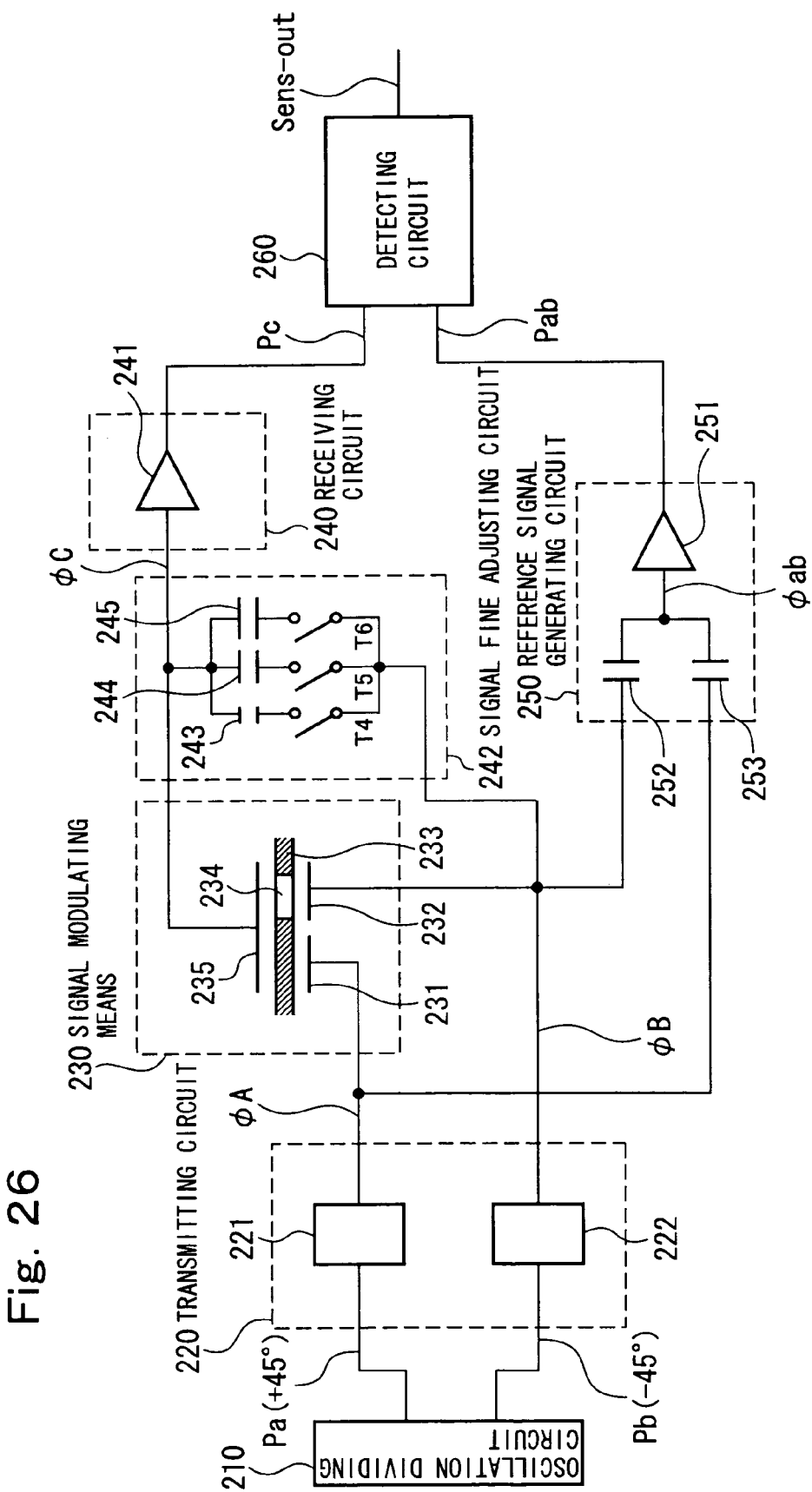
FIG. 26 is a block diagram illustrating a constitution according to a fourth example of the present invention.

The signal fine adjusting circuit 242 in FIG. 26 has the same circuit configuration as that of the signal fine adjusting circuit 254 in FIG. 25. The signal fine adjusting circuit 242 includes a fourth switch T4, a fifth switch T5, a sixth switch T6, and the capacitors 243, 244 and 245 with different capacities. An output terminal of the BPF amplifying circuit 222 is connected with one terminals of the fourth, the fifth and the sixth switches T4, T5 and T6, and the other terminal of the fourth switch T4 is connected with one terminal of the capacitor 243. The other terminal of the fifth switch T5 is connected with one terminal of the capacitor 244, and the other terminal of the sixth switch T6 is connected with one terminal of the capacitor 245. The other terminals of the capacitors 243, 244 and 245 are connected with an input terminal of the amplifying circuit 241 of the receiving circuit 240. The other connection is similar to that in FIG. 22. The control means 21A controls switching of the switches T4 to T6, so that the phase of the first received signal Pc as the initial setting is shifted to the delay or advance direction so as to be switched into the second received signal Pc. The phases of received signal and the reference signal are separated from each other, thereby preventing mis-detection. Instead that the detected signal φC is synthesized with the transmitted signal φB, the detected signal φC may be synthesized with the transmitted signal φA.

In the third and the fourth examples of the present invention, the first reference signal Pab as the initial setting is switched into the second reference signal Pab obtained by adjusting the phase using the signal fine adjusting circuit. In another manner, the first detected signal Pc as the initial setting is switched into the second detected signal Pc obtained by adjusting the phase using the signal fine adjusting circuit. As a result, the position can be detected even if each watch has dispersion.

FIFTH EXAMPLE

The position detecting system of the electric watch according to a fifth example of the present invention is explained below with reference to FIGS. 28 to 31.

In the position detecting system of the fifth example, three reference signals are used, and the detecting accuracy is heightened. Since the circuit configuration is the approximately same as that of the position detecting system in the third example, it is explained with reference to FIGS. 24, 25, 28, 29, 30 and 31.

Figure 31:
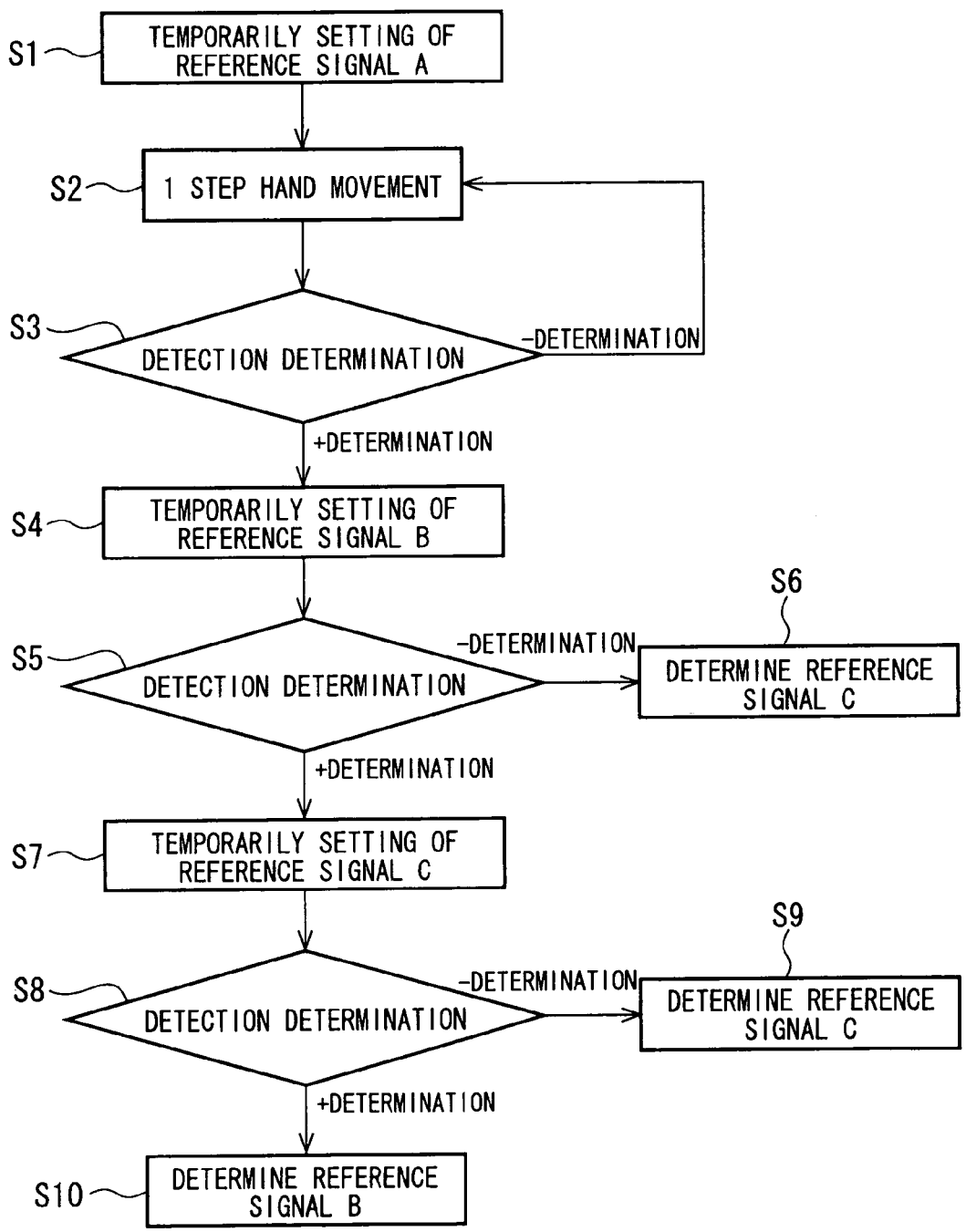
FIG. 31 is a flowchart illustrating an operation according to the fifth example of the present invention.

The control means 21A in FIG. 24 controls the switches T1, T2 and T3 of the signal fine adjusting circuit 254 in FIG. 25 according to a flowchart of a reference signal setting program software in FIG. 31, and the reference signal generating circuit 250 generates three reference pulse signals with different phases. The three pulse reference signals with different phases are a reference signal A, a reference signal B and a reference signal C.

Figure 28:
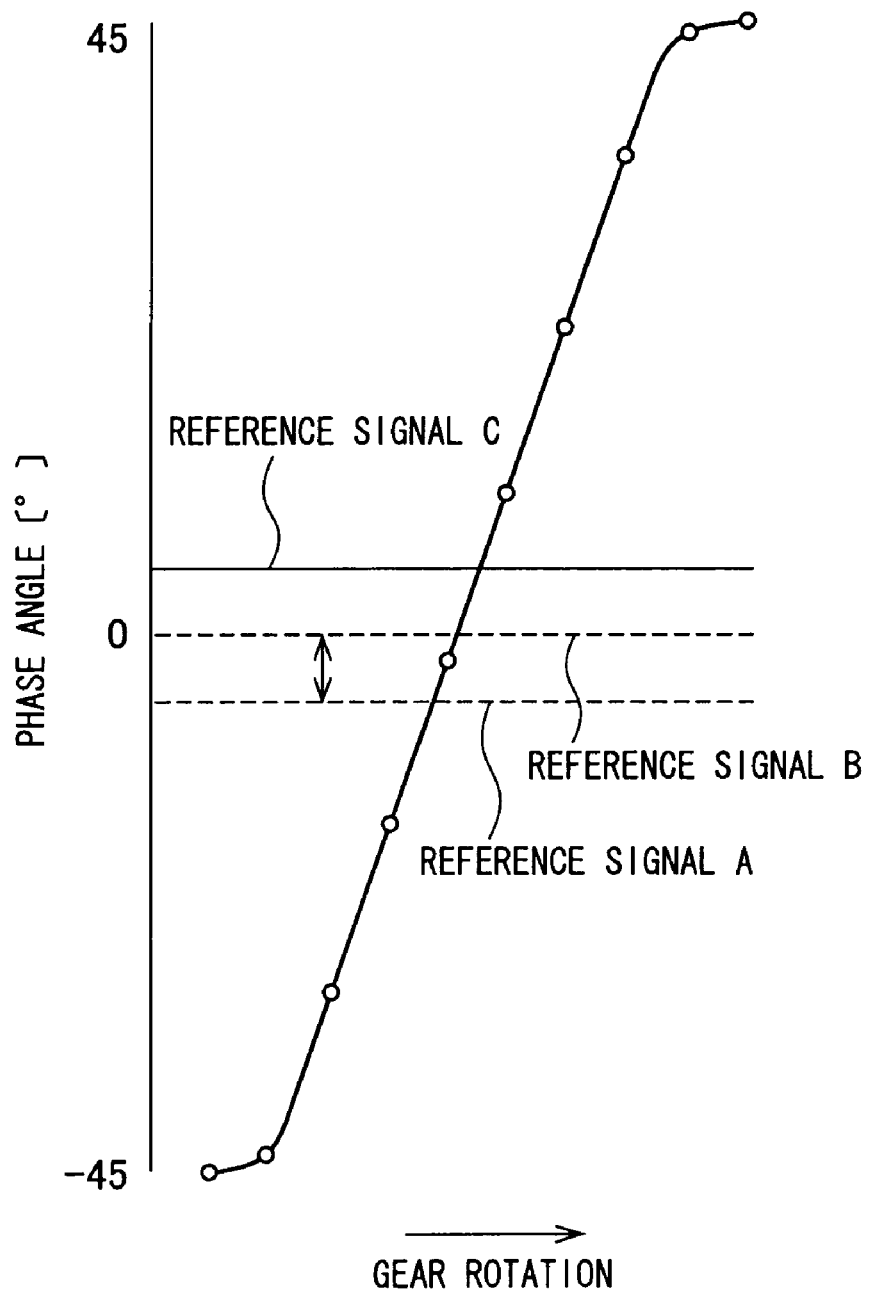
FIG. 28 is a diagram explaining a fifth example of the present invention.

As shown in FIG. 28, the setting of the reference signal, when the hand moving step of the hand position detection comes to a position slightly delayed from the phase angle 0°, is explained below.

In FIG. 28, the hand moving step is stopped in positions represented by white circles, and enters a range represented by an arrow. In FIG. 31, the initial setting is executed so that the reference signal A is temporarily set at step 1 (hereinafter, S1), the hand is moved by one step at S2, and detection is made at S3. When the detected result is the L level in FIG. 13 (hereinafter, "−"), the sequence returns to S2, and the hand is again moved by one step, and the detection is made at S3. When the detected result is the H level in FIG. 13 (hereinafter, "+"), the reference signal B is temporarily determined at S4, and detection is made at S5. Since the result is "−", the reference signal C is determined at S6. As a result, the reference signal C with large phase angle is used, and thus the reference signal can be set in an approximately intermediate position between the stop position of the gear and the next stop position with avoiding the reference signal A or B close to the stop position.

Figure 29:
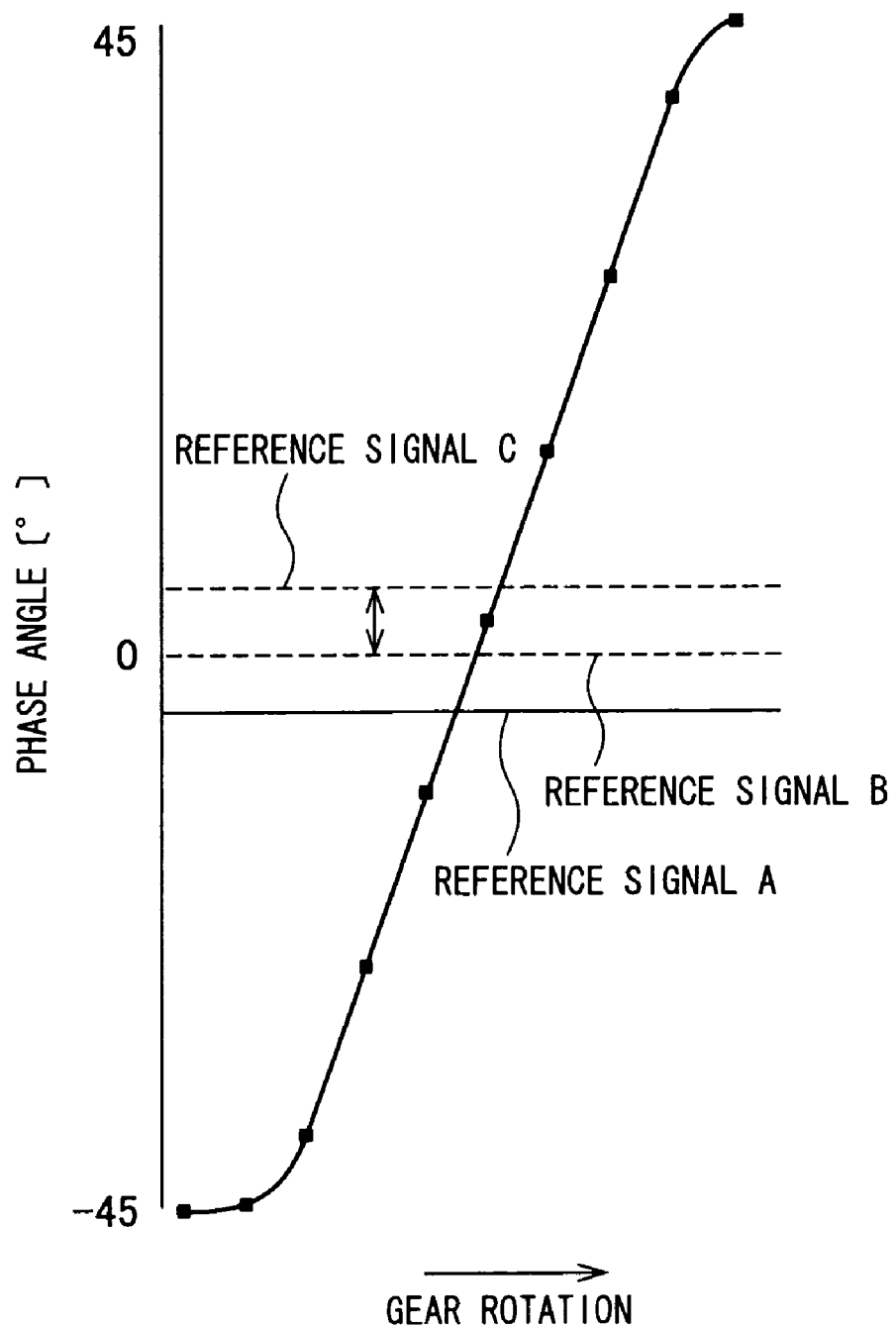
FIG. 29 is a diagram explaining the fifth example of the present invention.

As shown in FIG. 29, the state that the hand moving step comes to a position slightly advancing with respect to the phase angle 0° is explained.

In FIG. 29, the hand moving step stops in positions represented by black squares, and enters a range represented by an arrow. In FIG. 31, the initial setting is executed so that the reference signal A is temporarily set at S1, and the hand is moved in a stepped manner at S2, and the detection is made at S3. When the result is "−", the sequence returns to S2, and the hand is moved again by one step, and the detection is made at S3. When the result is "+", the reference signal B is temporarily set at S4, and detection is made at S5. Since the result is "+", the reference signal C is temporarily set at S7, and detection is made at S8. Since the result is the reference signal A is determined at S9. As a result, the reference signal A with small phase angle is used, so that the reference signal B or C which is close to the stop position is avoided, and the reference signal can be set in an approximately intermediate position between the stop position of the wheel and the next stop position.

Figure 30:
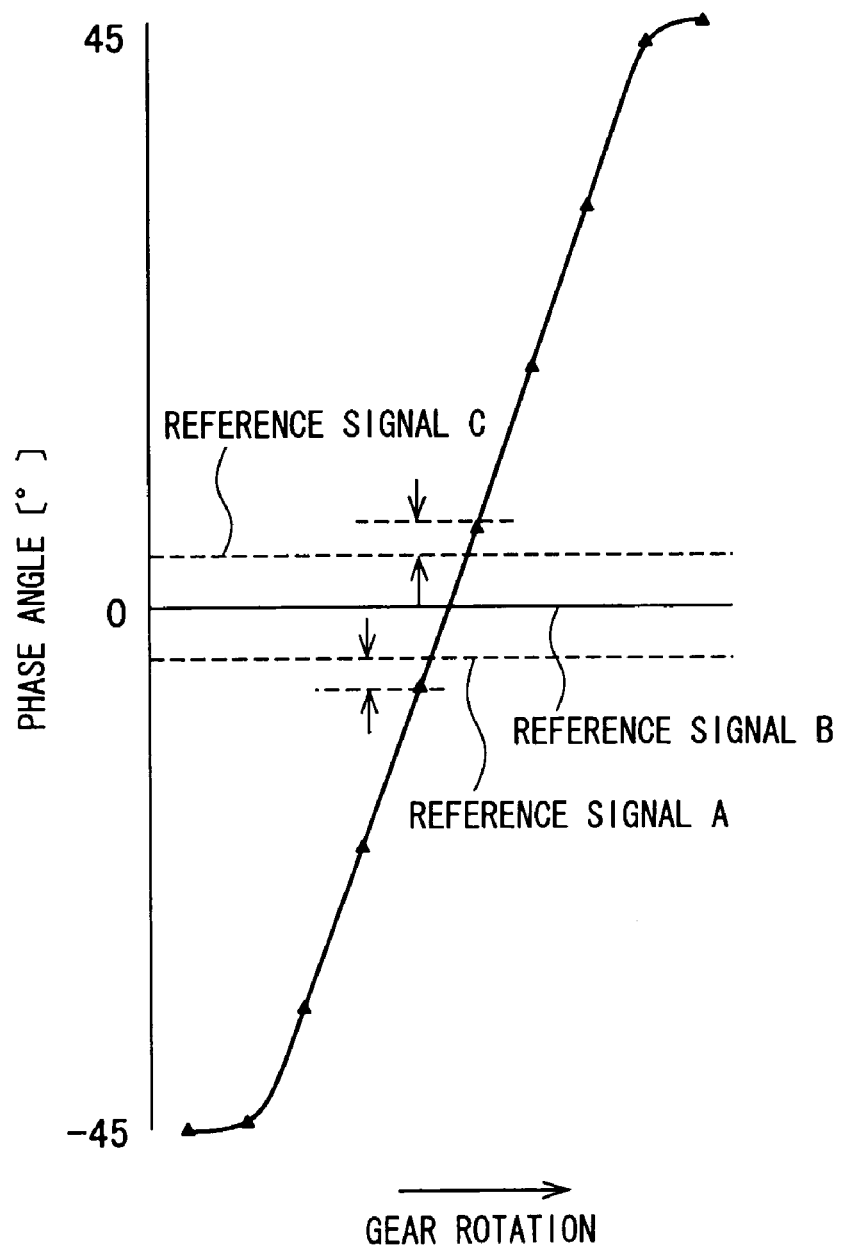
FIG. 30 is a diagram explaining the fifth example of the present invention.

Further, as shown in FIG. 30, the state that the hand moving step comes to a position separated from the phase angle of 0° is explained.

In FIG. 30, the hand moving step stops in positions represented by black triangles, and enters a range represented by an arrow. In FIG. 31, the initial setting is executed so that the reference signal A is temporarily set at S1, and the hand is moved by one step at S2, and detection is made at S3. When the result is "−", the sequence returns to S2 so that the hand is again moved by one step, and detection is made at S3. When the result is "+", the reference signal B is temporarily determined at S4, and detection is made at S5. Since the result is "+", the reference signal C is temporarily set at S7, and detection is made at S8. When the result is "+", the reference signal B is determined at S10. As a result, the reference signal B which is close to the phase angle of 0° is used, so that the reference signal A or C which is close to the stop position is avoided, and the reference signal can be set in an approximately intermediate position between the stop position of the gear and the next step position.

When the three reference signals with different phases are switched, the reference signal can be set at the approximately intermediate phase of the Stop positions of the gear. For this reason, even if there are backlashes or dispersions of the tooth positional relationships between the rotor and the rotor pinion of the pulse motor which rotates 180° in one step, between the fifth wheel and the fifth pinion and between the fourth wheel and the fourth shaft at the time of assembly of parts in each watch or backlash in each gear, the position can be detected accurately. Although the two or three reference signals are switched in the above example, when more than three reference signals are used, more fine measurement can be made. When the phase is changed from minus to plus, the phase of the reference signal can be set just in the middle between the stop state of the gear and the next stop state. When a change amount of the phase at one pitch of the gear is extremely small, this case is particularly effective.

SIXTH EXAMPLE

The position detecting system of the electric watch according to a sixth example of the present invention is explained below with reference to FIGS. 32 to 34.

Figure 34:
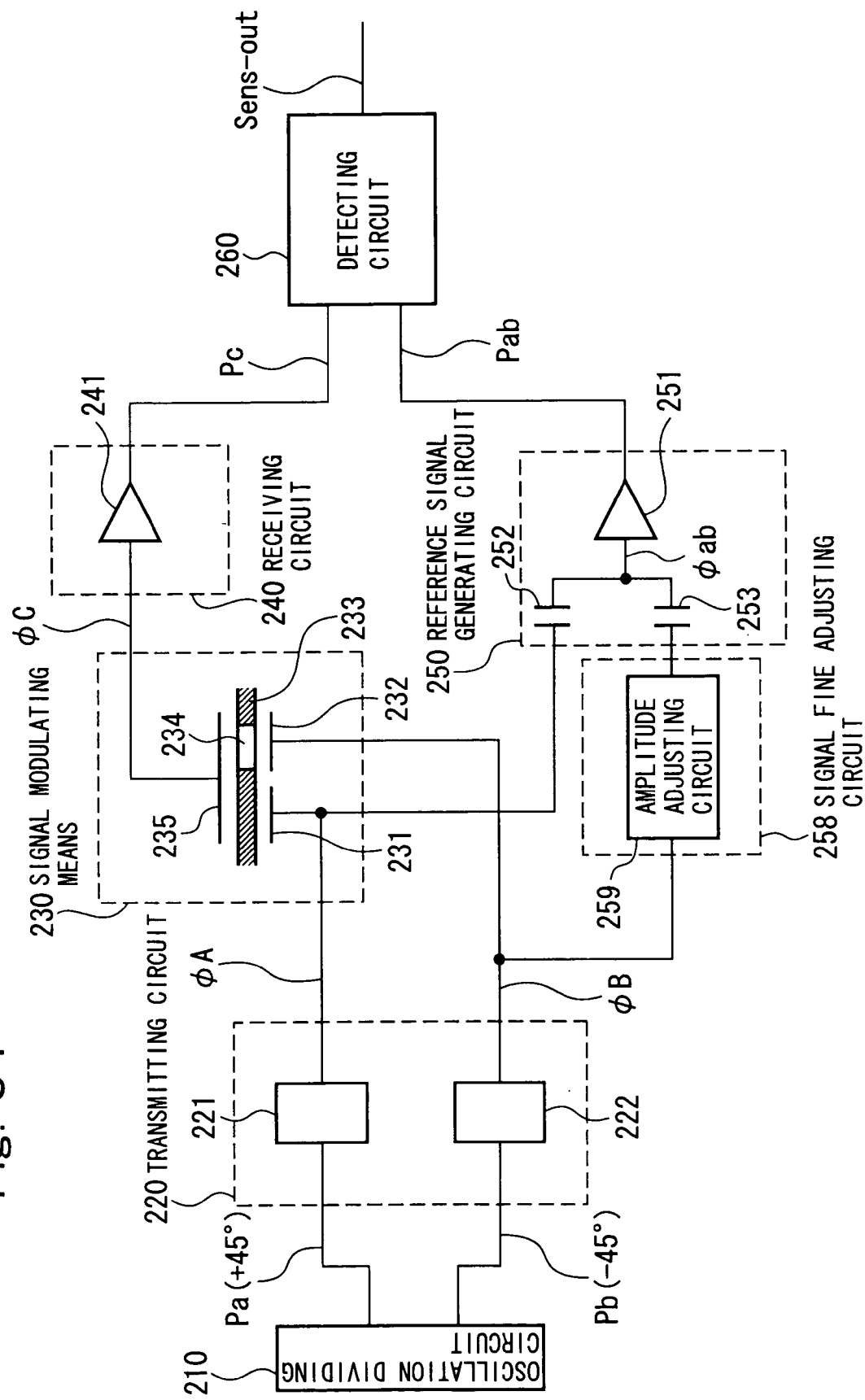
FIG. 34 is a block diagram illustrating another constitution according to, the sixth example of the present invention.

The position detecting system of the sixth example has a signal fine adjusting circuit 258 having an amplitude adjusting circuit 259 which is provided on either one of the signal paths between the output terminal of the transmitting circuit 220 and the transmitting electrodes 231 and 232 (FIG. 32) or as shown in FIG. 34, on either one of the signal paths between the output terminal of the transmitting circuit 220 and the capacitors 252 and 253 of the reference signal generating circuit 250.

Figure 32:
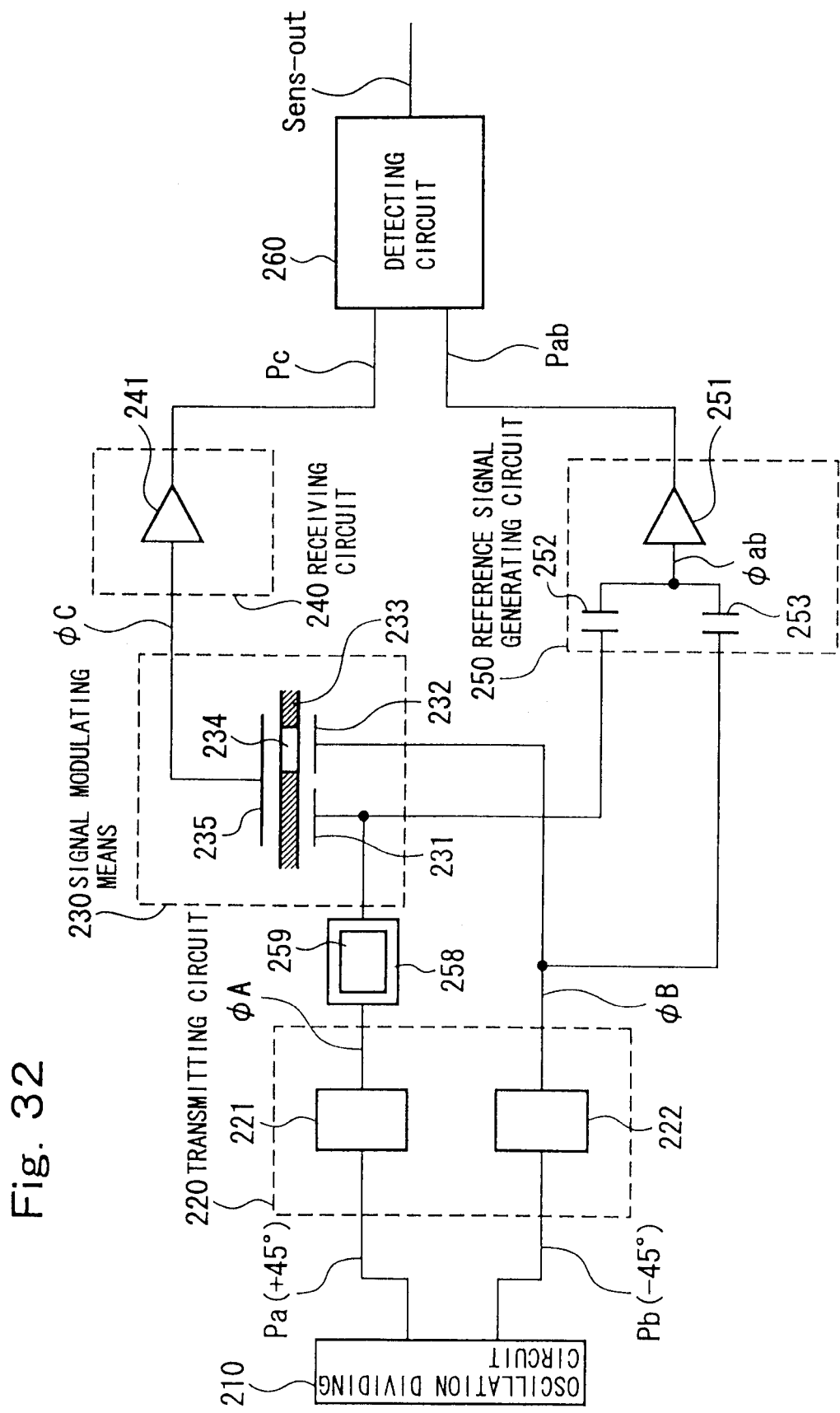
FIG. 32 is a block diagram illustrating a constitution according to a sixth example of the present invention.
Figure 33:
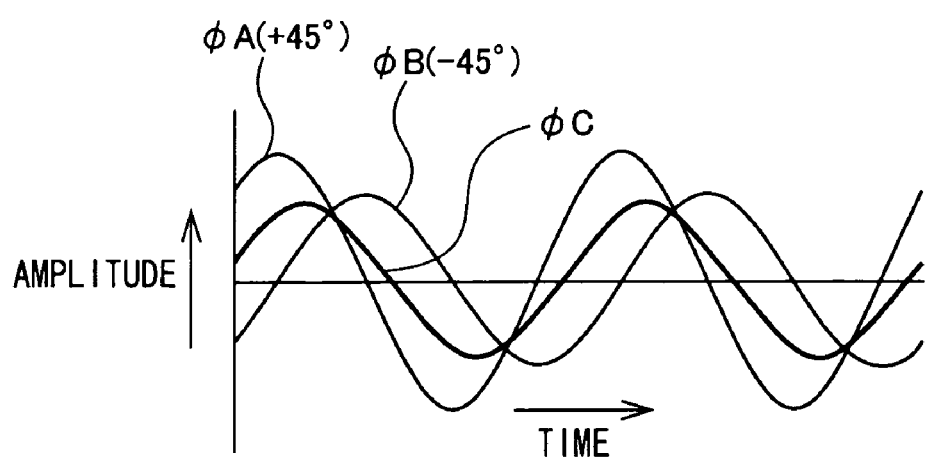
FIG. 33 is a waveform chart for explaining fine adjustment of the phase of the position detecting system according to the sixth example of the present invention.

As shown in FIG. 32, the signal fine adjusting circuit 258 including the amplitude adjusting circuit 259 is provided between the BPF amplifying circuit 221 of the transmitting circuit 220 and the transmitting electrode 231, and the amplitude of the transmitted sine wave signal φA is set to be large by the amplitude adjusting circuit 258 as shown in FIG. 33. In this case, the phase of the received sine wave signal φC is close to the phase of φA. In such a manner, the amplitude of the transmitted sine wave signal which is one input of the signal modulating means 230 is finely adjusted, so that the phase of the received signal Pc from the receiving circuit 240 can be finely adjusted.

Similarly as shown in FIG. 34, the signal fine adjusting circuit 258 having the amplitude adjusting circuit 259 is provided between the transmitting circuit 220 and one capacitor of the reference signal generating circuit 250 so as to finely adjust the amplitude of the transmitted sine wave signal φA or φB. As a result, the phase of the reference signal Pab can be finely adjusted.

As is clear from the above explanation, in the respective examples of the present invention, the received sine wave signal φC from the receiving electrode 235 in the signal modulating means 230 receiving the transmitted sine wave signal φA or φB of the BPF amplifying circuit in the transmitting circuit 220 is amplified so as to be saturated by the amplifying circuit 241 of the receiving circuit 240 so that the received signal Pc is obtained. The transmitted sine wave signal C is amplified so as to be saturated by the amplifying circuit 251 of the reference signal generating circuit 250 inputting the transmitted sine wave signal φA or φB, so that the reference signal Pab is obtained. Further, the two BPF amplifying circuits 221 and 222 of the transmitting circuit 220 have the same circuit configuration, and the receiving circuit 240 whose output is the received signal Pc and the amplifying circuit 251 of the reference signal generating circuit 250 have the same circuit configuration. The amplitude of the signals and the amplification factors of the circuits are set to be equal with each other.

As described above, in the second to sixth examples, the received signal Pc which is the output from the receiving circuit 240 and the reference signal Pab which is the output from the reference signal generating circuit 250 change together even if they are influenced by temperature, accordingly, the relative phase relationship between the received signal Pc and the reference signal Pab does not change at all. For this reason, Sens-out as the detected output from the detecting circuit 260 becomes a stable output which is not influenced by temperature.

In the above examples of the present invention, the BPF amplifying circuits 221 and 222 of the transmitting circuit 220, the capacitors 252 and 253 of the reference signal generating circuit 250, and the amplifying circuit 251 are formed in one and the same circuit chip. As a result, the cost is reduced, and the space can be small.

Further, the two or three reference signals with different phases are switched according to the stop positions of the hand moving step, so that the position can be detected by the reference signal with optimal phase. As a result, even if there are dispersions of the tooth positional relationships between the rotor and the rotor pinion of the pulse motor, between the fifth wheel and the fifth pinion, and between the fourth wheel and the fourth shaft at the assembly of the parts in each watch or the backlash in each gear, the position can be detected securely.

Not only the second position detection but also the mechanical position detections of the day plate, the week plate and the like of the watch can be made, so that the position detecting system of the electric watch with non-contact, low electric power, small space, low cost and high reliability can be realized.

As a result, a wrist watch with high reliability of holding time, a radio wave correcting wrist watch with a time early correcting function, a wrist watch with a month-end automatic correcting function, a wrist watch with large hands and good design properties, and the like can be put into a practical use.

SEVENTH AND EIGHTH EXAMPLES

The position detecting system of the electric watch according to seventh and eighth examples of the present invention is explained below with reference to FIGS. 35 to 38.

The basic technical constitution of the seventh and eighth examples of the present invention is the electric watch having the detecting mechanism for detecting the position information of the rotating member to be measured. The electric watch includes a transmitting circuit, the transmitting electrode, signal modulating means, the receiving electrode, a receiving circuit. The transmitting circuit generates a plurality of transmitted signals. The output signal from the transmitting circuit is applied to the transmitting electrode. The receiving electrode receives a signal from the transmitting electrode. The rotor is provided between the transmitting electrode and the receiving electrode, and modulates the transmitted signal output from the transmitting electrode. The modulated signal received by the receiving electrode is input to the receiving circuit and is amplified by the receiving circuit. The reference position of the rotor is detected based on the phase change of the received signal. The plural transmitting electrodes and the receiving electrode are arranged so as to be opposed to each other along the approximately entire rotating surface of the rotor.

In the seventh and eighth examples, since the circuit configuration in FIG. 22 is used as the electric constitution, the waveforms of the respective portions are as shown in FIG. 11.

Figure 35:
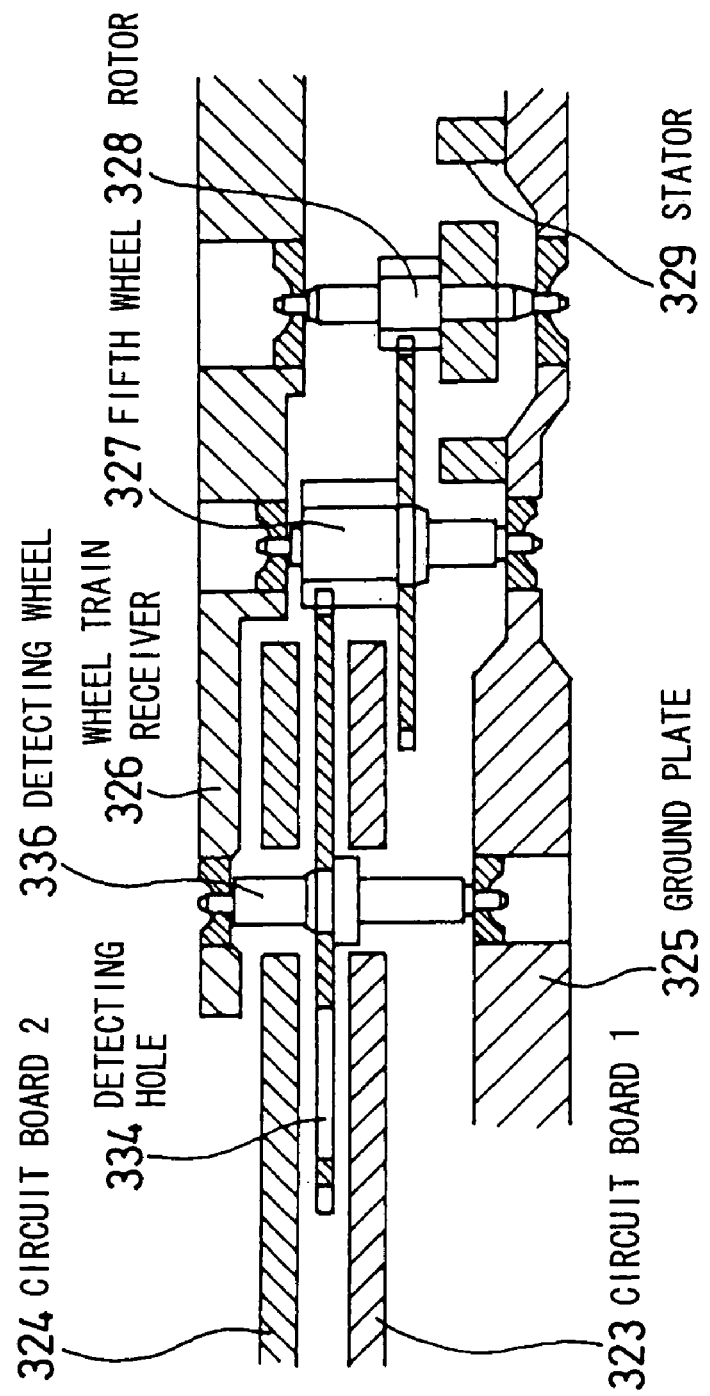
FIG. 35 is a sectional view of a wheel train mechanism including signal modulating means in the position detecting system of the electric watch according to a seventh example of the present invention.

FIG. 35 illustrates the wheel train mechanism including signal modulating means in the position detecting system according to the seventh and eighth examples.

As shown in FIG. 35, the rotating shafts of the respective wheel trains are mounted to a ground plate 325 and a wheel train receiver 326 rotatively. The numeral 328 designates the rotor of the pulse motor, the numeral 329 designates a stator, and the numeral 327 designates the fifth wheel for decelerating and transmitting the rotation of the rotor 328 of the pulse motor. The fifth wheel 327 transmits the rotation of a reduction ratio to the fourth wheel, not shown, and transmits the rotation of the same reduction ratio to the detecting wheel 336 which is the rotor 233 composing the signal modulating means 230 (FIG. 22). The second hand is fixed to the fourth wheel, and second information is displayed thereon. The fourth wheel and the detecting wheel 336 move the hand synchronously in the stepped manner by one rotation at 60 steps, namely, 6° per step.

The detecting wheel 336 is composed of a metal member having electrically conductivity, and electrically conductive bearings such as metal bushes are used as upper and lower bearings of the detecting wheel 336. The detecting wheel 336 is grounded to a high potential side or a low potential side of a power supply line via the wheel train receiver or the ground plate (not shown). This example uses the bearings, but needless to say, the upper and lower bearings may be integral with the wheel train receiver or the ground plate. The rotating surface of the detecting wheel 336 has a detecting hole 334. Electric conductivity or permittivity of the detecting wheel 336 in the rotating direction are different from those of the other portion due to the detecting hole 334. The transmitting electrode is formed on a circuit board 1 (323) below the rotating surface of the detecting wheel 336, and the receiving electrode is formed on a circuit board 2 (324) above the rotating surface.

Figure 36:
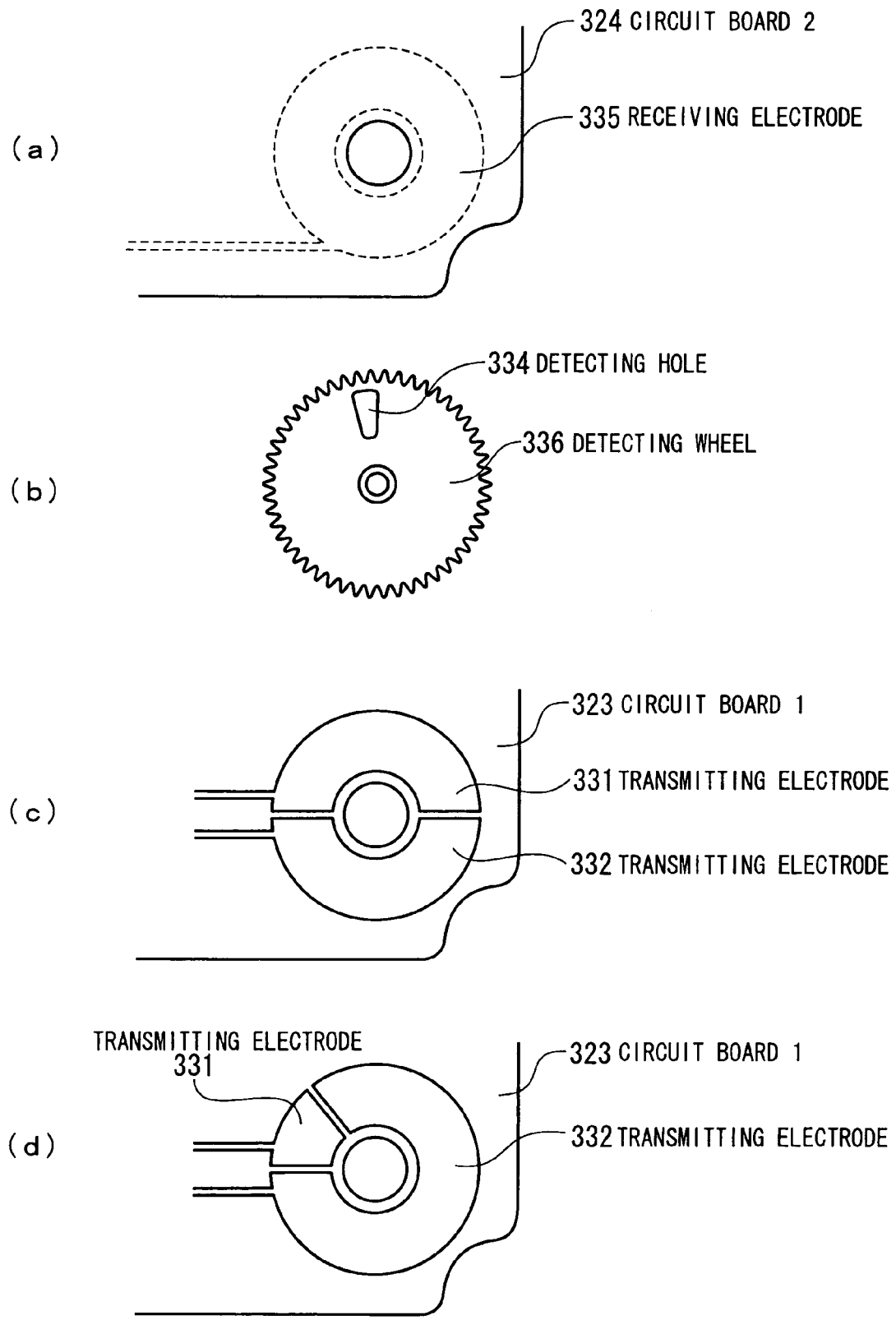
FIG. 36(a) is a plan view of the receiving electrode according to the seventh example.
FIG. 36(b) is a plan view of the detecting wheel according to the seventh example.
FIG. 36(c) is a plan view of the transmitting electrode according to the seventh example.
FIG. 36(d) is a plan view of the transmitting electrode according to an eighth example.

The signal modulating means of the seventh example is explained with reference to FIG. 36. FIG. 36($a$) is a plan view of the receiving electrode 335, and the receiving electrode 335 is formed on the circuit board 2 (324) opposed to the rotating surface of the detecting wheel 336. FIG. 36($b$) is a plan view of the detecting wheel 336 as the rotor, and the detecting hole 334 is provided on the rotating surface. FIG. 36($c$) is a plan view of the transmitting electrode in the seventh example. The transmitting electrodes 331 and 332 are arranged on the circuit board 1 (323) so as to occupy same area for 180° and be opposed to the rotating surface of the detecting wheel 336.

FIG. 36($d$) is a plan view of the transmitting electrodes of the eighth example. The area of one transmitting electrode 331 is small, and the area of the other transmitting electrode 332 is large, so that the phase angle changes only by a portion of one rotation of the detecting wheel 336.

Figure 37:
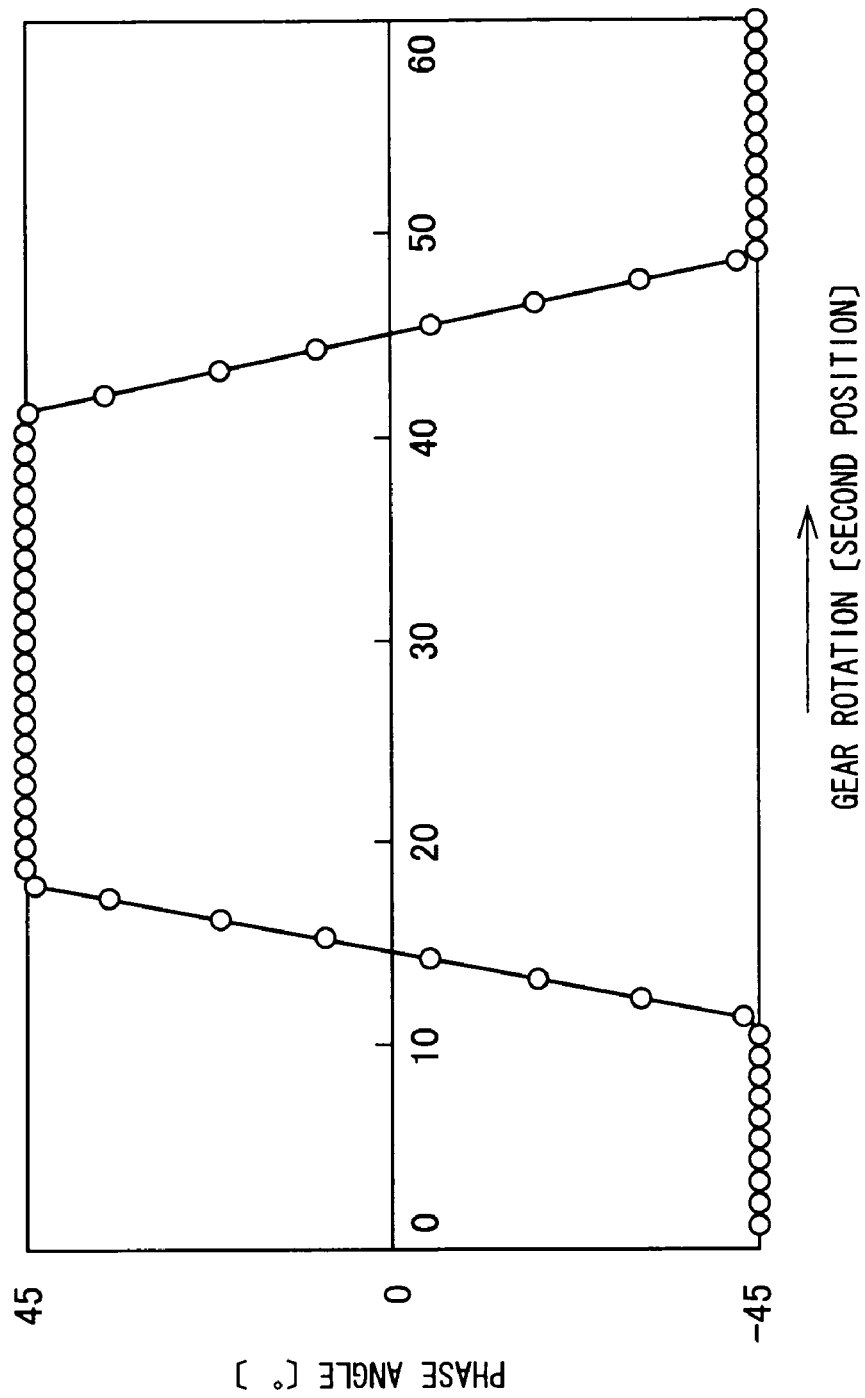
FIG. 37 is an explanatory diagram of a phase change of a received signal according to the seventh example.

The phase change of the received signal from the receiving electrode in the seventh example when the transmitting electrodes in FIG. 36($c$) are used is explained with reference to FIG. 37. The transmitted signals φA and φB transmitted from the transmitting electrodes 331 and 332 in FIG. 36($c$) are received by the receiving electrode 335 in FIG. 36($a$), but the phase change of the received signal Pc due to the rotation of the detecting wheel 336 is shown in FIG. 37. The phase angles of the received signal Pc and the reference signal Pab are plotted along a vertical axis, and the rotating position of the detecting wheel 336 is plotted along a horizontal axis. The plotted points represent the stop positions of the detecting wheel 336.

In FIG. 37, the detecting hole 334 of the detecting wheel 336 is on the transmitting electrode 332, and the phase angle is −45°. As the detecting hole 334, however, overlaps with a portion of the transmitting electrode 331, the phase angle advances due to the rotation of the detecting wheel 336. When the center of the detecting hole 334 comes to a boundary between the transmitting electrodes 331 and 332, the phase angle becomes 0°. Further, when detecting wheel 336 rotates and the detecting hole 334 comes onto the transmitting electrode 331, the phase angle becomes +45°. As the detecting wheel 336 further rotates and the detecting hole 334 overlaps a portion of the transmitting electrode 332, the phase angle delays. When the center of the detecting hole comes onto the boundary between the transmitting electrodes 331 and 332, the phase angle becomes 0°. When the detecting wheel 336 further rotates so as to be on the transmitting electrode 332, the phase angle is again in the initial state, namely, −45°. The explanatory diagram of the phase change of the received signal shown in FIG. 37 illustrates an ideal phase change for easy understanding of the explanation. Even when the detecting hole 334 is on one transmitting electrode, the transmitted signal from the other transmitting electrode is slightly transmitted to the receiving electrode 335. For this reason, an actual phase change amount reduces as compared with the line in FIG. 37. In an explanatory diagram of another phase change, mentioned later, the ideal phase change is shown similarly to FIG. 37 in order to clarify the explanation.

The transmitting electrodes 331 and 332 are arranged in a divided manner by 180° so as to opposed to the approximately entire periphery of the rotating surface of the detecting wheel 336. The receiving electrode 335 is formed along the entire periphery of the rotating surface of the detecting wheel 336, so that the phase angle can be detected even if the detecting wheel 336 is in any positions. For this reason, when the transmitting electrodes and the receiving electrode are arranged on a portion opposed to the detecting wheel 336, presence or non-presence of signals is checked according to the electric field intensity of the received signal, and the position should be detected by the phase angle of the received signal. When, however, the transmitting electrodes and the receiving electrode are arranged on the approximately entire periphery of the detecting wheel 336, the position of the detecting wheel 336 can be detected only by detecting the phase angle of the received signal. For this reason, the circuit configuration can be greatly simplified, and the detecting accuracy can be improved. According to this configuration, since the phase changes twice a tone rotation, the position can be detected twice a tone rotation, so that the detecting accuracy is improved.

As an eighth example of the present invention, the phase change of the received signal from the receiving electrode when the second transmitting electrodes in FIG. 36(d) are used in the signal modulating means is explained below with reference to FIG. 38.

Figure 38:
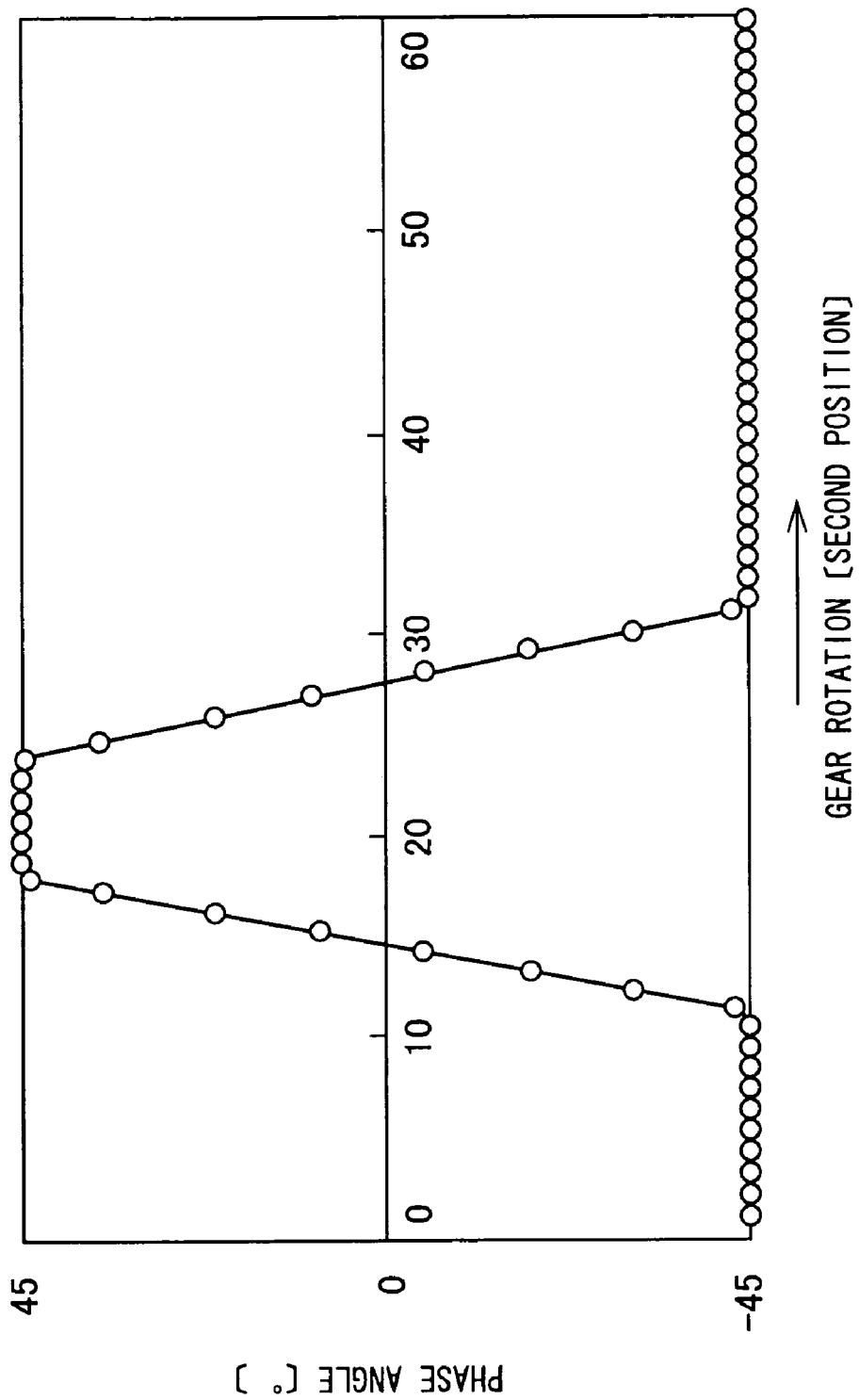
FIG. 38 is an explanatory diagram of a phase change of a received signal according to the eighth example.

The transmitted signals φA and φB transmitted from the transmitting electrodes 331 and 332 in FIG. 36(d) are received by the receiving electrode 335 in FIG. 36(a), but the phase change of the received signal Pc due to the rotation of the detecting wheel 336 is similarly as shown in FIG. 38. In the phase change, the angle of +45° decreases as compared with the seventh example, and the phase change is mostly −45°. Since the other parts of the change is completely similar to the example using the first transmitting electrode in FIG. 36(c), the detailed explanation thereof is omitted.

That is to say, since the sizes of the two transmitting electrodes can be set freely, they can be set at a suitable ratio according to the factor of the circuit configuration and the factor of the arrangement of the receiving electrode.

The configuration is such that the transmitting electrode 331 which is small and the transmitting electrode 332 which is large are arranged so as to opposed to the approximately entire periphery of the rotating surface of the detecting wheel 336 and a part of the phase is changed. The receiving electrode 335 is formed along the entire periphery of the rotating surface of the detecting wheel 336, so that the phase angle can be detected even if the detecting wheel 336 is in any positions as compared with the case where the transmitting electrodes and the receiving electrode are arranged opposed to the detecting wheel on one portion. Further, since the phase is changed twice every one rotation, the circuit configuration can be simplified and the detecting accuracy is improved.

NINTH EXAMPLE

Figure 39:
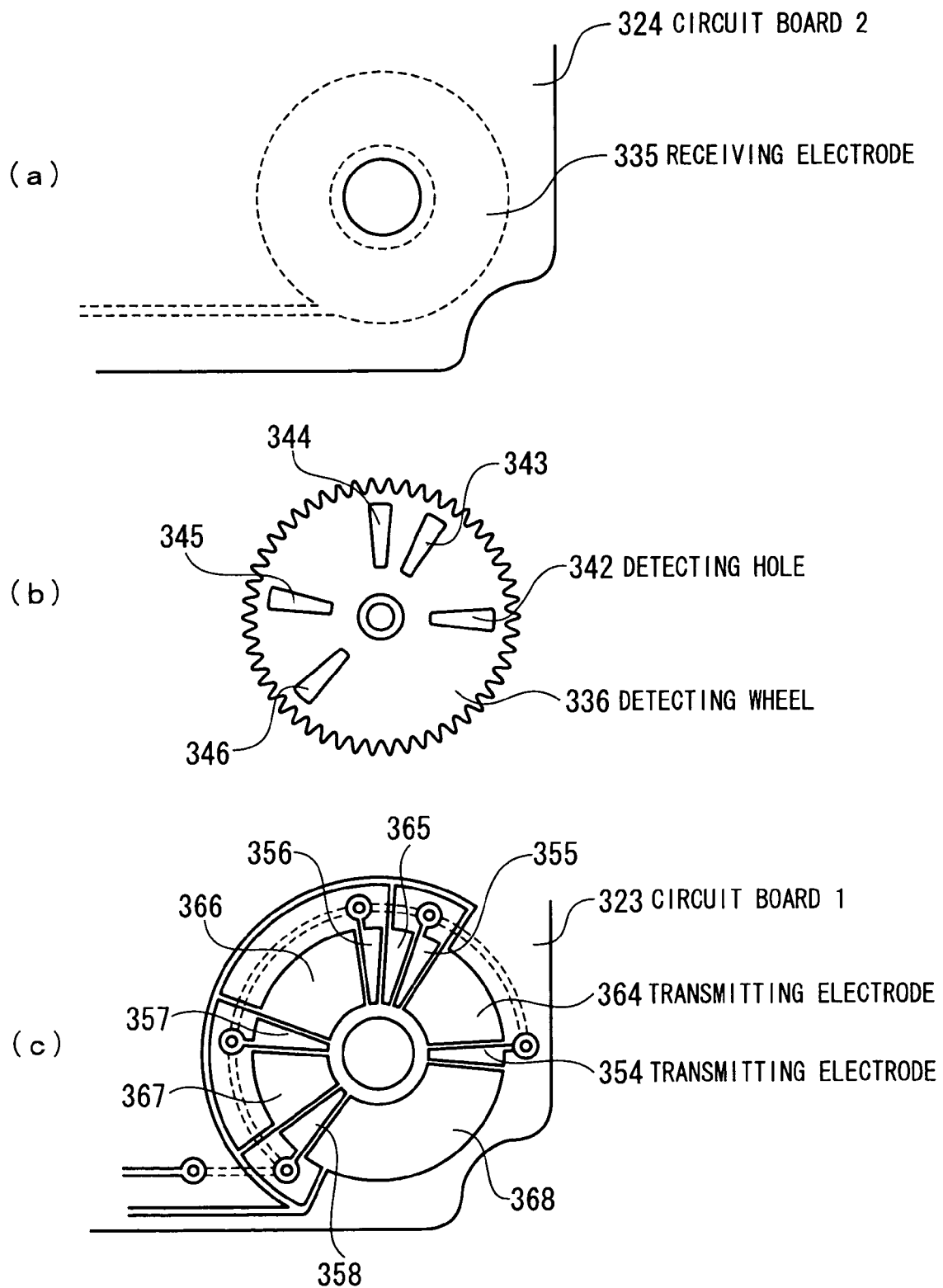
FIG. 39 is a diagram explaining a ninth example.

The position detecting system of the electric watch according to a ninth example of the present invention is explained below with reference to FIGS. 39 and 40.

FIG. 39(a) is a plan view of the receiving electrode. Similarly to the receiving electrode in FIG. 36(a), the receiving electrode 335 is formed on the circuit board 2 (324) opposed to the rotating surface of the detecting wheel 336. FIG. 39(b) is a plan view of the detecting wheel 336 which is the rotor 233 (FIG. 22). The rotating surface of the detecting wheel 336 has a plurality of detecting holes 342, 243, 344, 345 and 346, in which each angle formed between a pair of two adjacently arranged holes to each other with respect to a rotating axis of the rotor is different from that formed between a separate pair of two adjacently arranged holes to each other with respect to the rotating axis. FIG. 39(c) is a plan view of the transmitting electrodes. A plurality of transmitting electrodes 354, 355, 356, 357 and 358 for transmitting one of the two transmitted signals, and a plurality of transmitting electrodes 364, 365, 366, 367 and 368 for transmitting the other transmitted signal are arranged alternatively on the circuit board 1 (323) so that their number is the same as that of the detecting holes. The transmitting electrodes are formed into a cord shape so that all boundary portions of the transmitting electrodes match the detecting holes of the detecting wheel 336 only once, respectively, at one rotation of the detecting wheel 336. The transmitting electrodes 354, 355, 356, 357 and 358 are connected by a pattern on the rear side of the board, and the transmitting electrodes 364, 365, 366, 367 and 368 are connected by a pattern on the surface side.

The phase change of the received signal from the receiving electrode when the signal modulating means of the ninth example is used is explained with reference to FIG. 40. The transmitted signal φB transmitted from the transmitting electrodes 354, 355! 356, 357 and 358 in FIG. 39(c) and the transmitted signals φA transmitted from the transmitting electrodes 364, 365, 366, 367 and 368 are received by the receiving electrode 335 in FIG. 39(a). The phase change of the received signal Pc due to the rotation of the detecting wheel 336, however, is as shown in FIG. 40. The phase angles of the received signal Pc and the reference signal Pab are plotted along a vertical axis of FIG. 40, and the rotating position of the detecting wheel 336 is plotted along a horizontal axis. Plotted points represent the stop positions of the detecting wheel.

Figure 40:
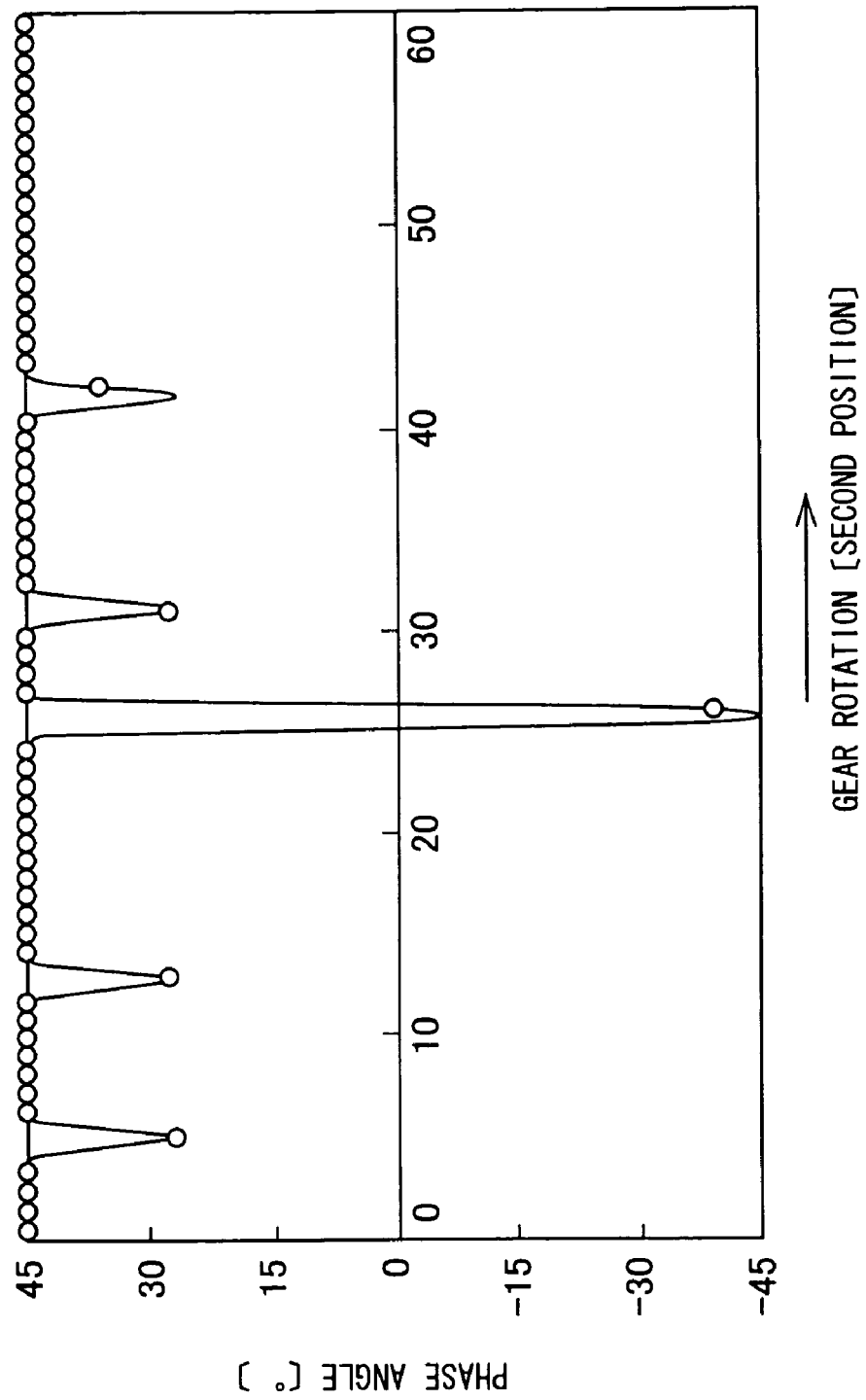
FIG. 40 is an explanatory diagram of a phase change of a received signal according to the ninth example.

In FIG. 40, all the detecting holes 342, 343, 344, 345 and 346 of the detecting wheel 336 are on any of the transmitting electrodes 364, 365, 366, 367 and 368, and the phase angle is +45°. When any one of the detecting holes 342, 343, 344, 345 and 346, however, comes onto the transmitting electrode 354, 355, 356, 357 or 358 due to the rotation of the detecting wheel 336, the phase angle changes slightly to the delay direction. When the detecting wheel 336 further rotates, all the detecting holes 342, 343, 344, 345 and 346 are again on any of the transmitting electrodes 364, 365, 366, 367 and 368, and the phase angle is +45°. This state is repeated hereinafter, but all the detecting holes 342, 343, 344, 345 and 346 come onto the transmitting electrodes 354, 355, 356, 357 and 358 only once every rotation of the detecting wheel 336. Only at this time, the phase angle is −45°.

That is to say, when the detecting holes 342, 343, 344, 345 and 346 come onto boundaries between the transmitting electrodes 364, 365, 366, 367 and 368 and the transmitting electrodes 354, 355, 356, 357 and 358, the phase of the received signal is changed from the plus into the minus state. For this reason, this timing can be detected as the reference position.

The five detecting holes 342, 343, 344, 345 and 346 are provided on the rotating surface of the detecting wheel 336 so as to form different angles with the rotating axis being the center. The five transmitting electrodes 354, 355, 356, 357 and 358 for transmitting the transmitted signal φB and the five transmitting electrodes 364, 365, 366, 367 and 368 for transmitting the transmitted signal φA are arranged alternatively. The transmitting electrodes are formed into the cord shape so that all the detecting holes match all the boundary portions of the transmitting electrodes only once at per rotation of the detecting wheel 336, so that the phase is detected in five places. As a result, the phase change amount of the received signal at one step is larger than that of the detection in one place, so that the detecting ability becomes high and the detection can be made accurately.

TENTH EXAMPLE

Figure 42:
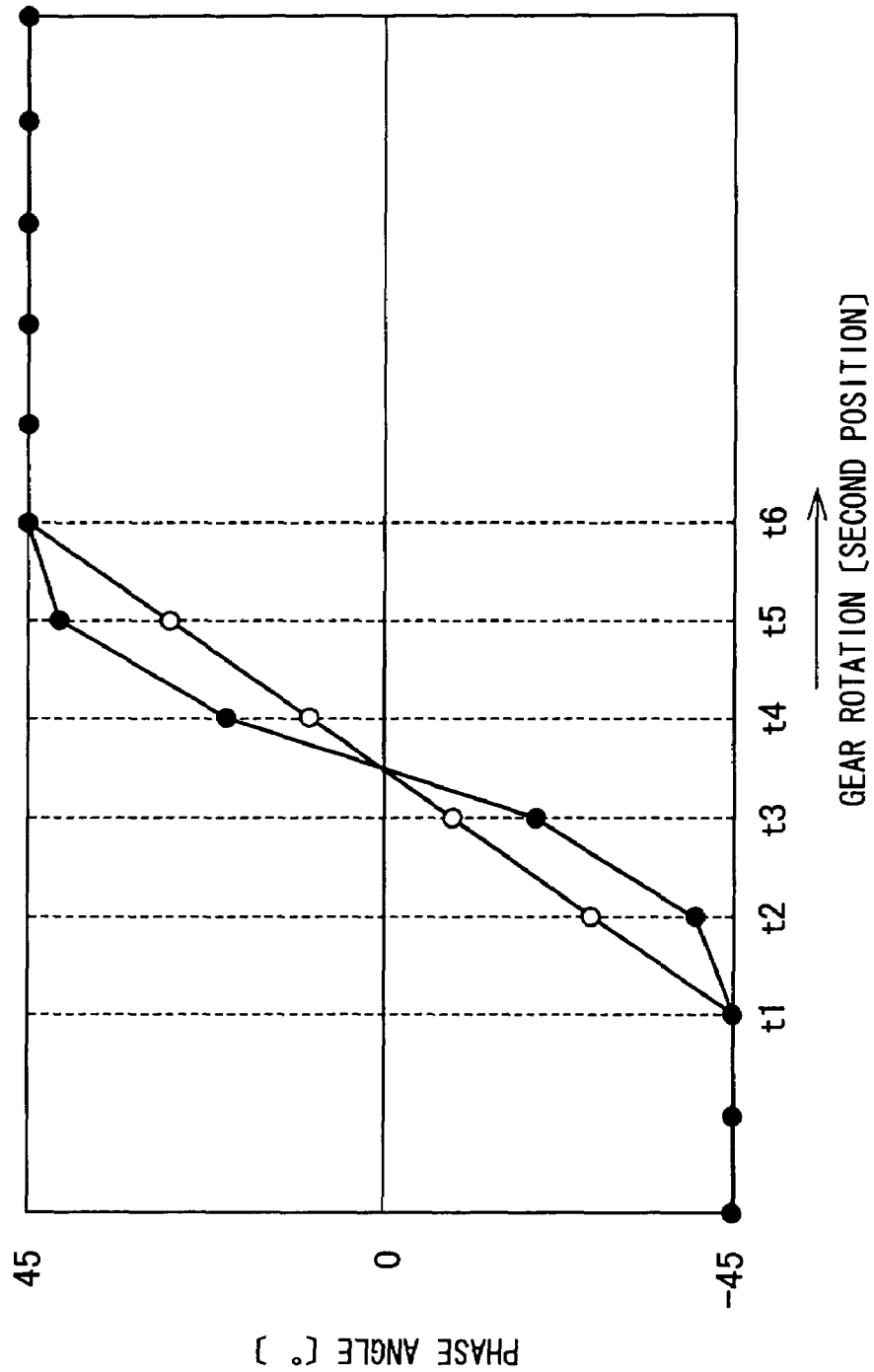
FIG. 42 is an explanatory diagram for comparing phase changes of the received signals when the transmitting electrode of the seventh example and the transmitting electrode of the tenth example are used.

The position detecting system of the electric watch according to a tenth example of the present invention is explained below with reference to FIGS. 41 and 42.

FIG. 41(a) is a plan view of the transmitting electrodes. The transmitting electrodes 331 and 332 are formed on the circuit board 1 (323), and an electrode shape of the boundary portion between the transmitting electrodes 331 and 332 is constituted so as to have a smaller area than the other portion. FIG. 41(b) is an explanatory diagram illustrating an area change of the transmitting electrodes opposed to the detecting hole due to the rotation of the detecting wheel when the transmitting electrodes in the signal modulating means of the seventh example are used. FIG. 41(c) is an explanatory diagram illustrating an area change of the transmitting electrodes opposed to the detecting hole due to the rotation of the detecting wheel when the transmitting electrodes of the signal modulating means in the tenth example are used. FIG. 42 is an explanatory diagram for comparing the phase change of the received signal from the receiving electrode when the transmitting electrodes in the signal modulating means of the tenth example are used with the phase change when the transmitting electrodes in the signal modulating means of the seventh example are used.

As to the transmitted electrodes in the signal modulating means of the seventh example, as shown in FIG. 41(b), the electrode shape of the boundary portion between the transmitting electrodes 331 and 332 is the same as the electrode shape of the other portion. For this reason, the phase angle of the received signal from the receiving electrode changes so that a comparatively straight line is drawn from −45° and gently rises to reach +45° as shown by white circles in FIG. 41 according to the movement of the stop positions t1, t2, t3, t4, t5 and t6 (corresponding to the second hand positions) due to the rotation of the detecting wheel.

On the contrary, as to the transmitting electrodes in the signal modulating means of the tenth example, as shown in FIG. 41(c), the electrode area of the boundary portion between the transmitting electrodes 331 and 332 is set so as to be smaller than the electrode area of the other portion. For this reason, when the detecting hole 334 passes through the boundary between the transmitting electrodes 331 and 332, namely, when the phase of the received signal for detecting the position passes through 0° according to the movement of the stop positions t1, t2, t3, t4, t5 and t6 due to the rotation of the detecting wheel as shown by black circles in FIG. 42, the phase angle of the received signal from the receiving electrode changes greatly. As a result, the position detecting ability can be improved.

ELEVENTH EXAMPLE

The position detecting system of the electric watch according to an eleventh example of the present invention is explained below with reference to FIGS. 43 and 44.

Figure 43:
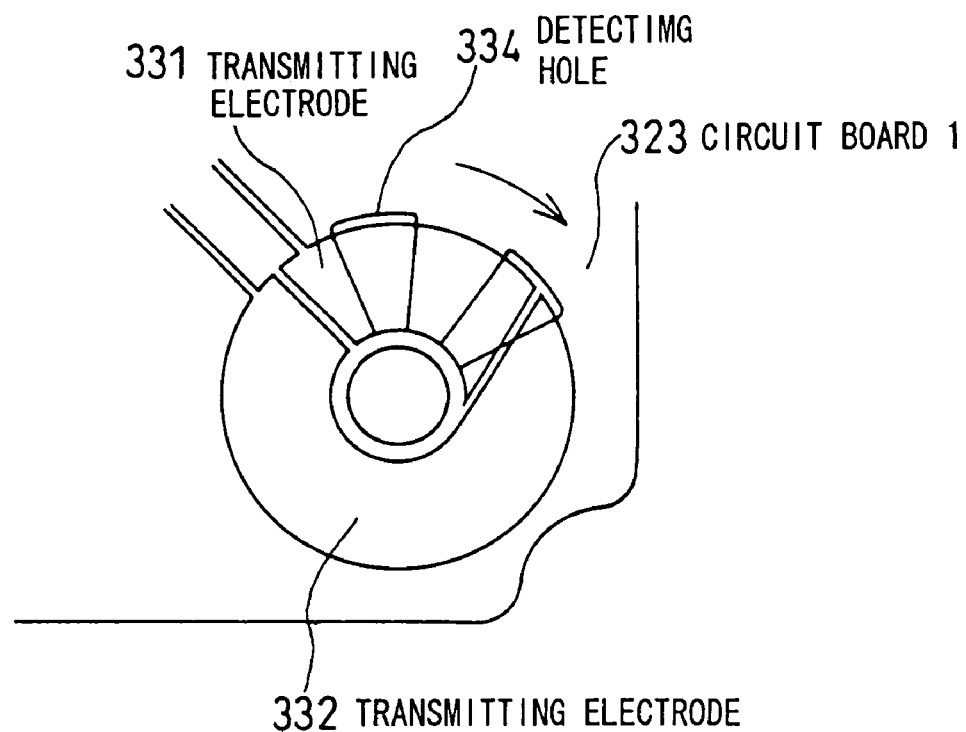
FIG. 43 is a plan view of the transmitting electrode according to an eleventh example.

FIG. 43 is a plan view of the transmitting electrodes. The transmitting electrodes 331 and 332 are arranged on the circuit board 1 (323) so that two electrode shapes of the boundary portions therebetween are different from each other. FIG. 44 is an explanatory diagram of the phase change of the received signal from the receiving electrode when the transmitting electrodes in the signal modulating means of the eleventh example are used.

Figure 44:
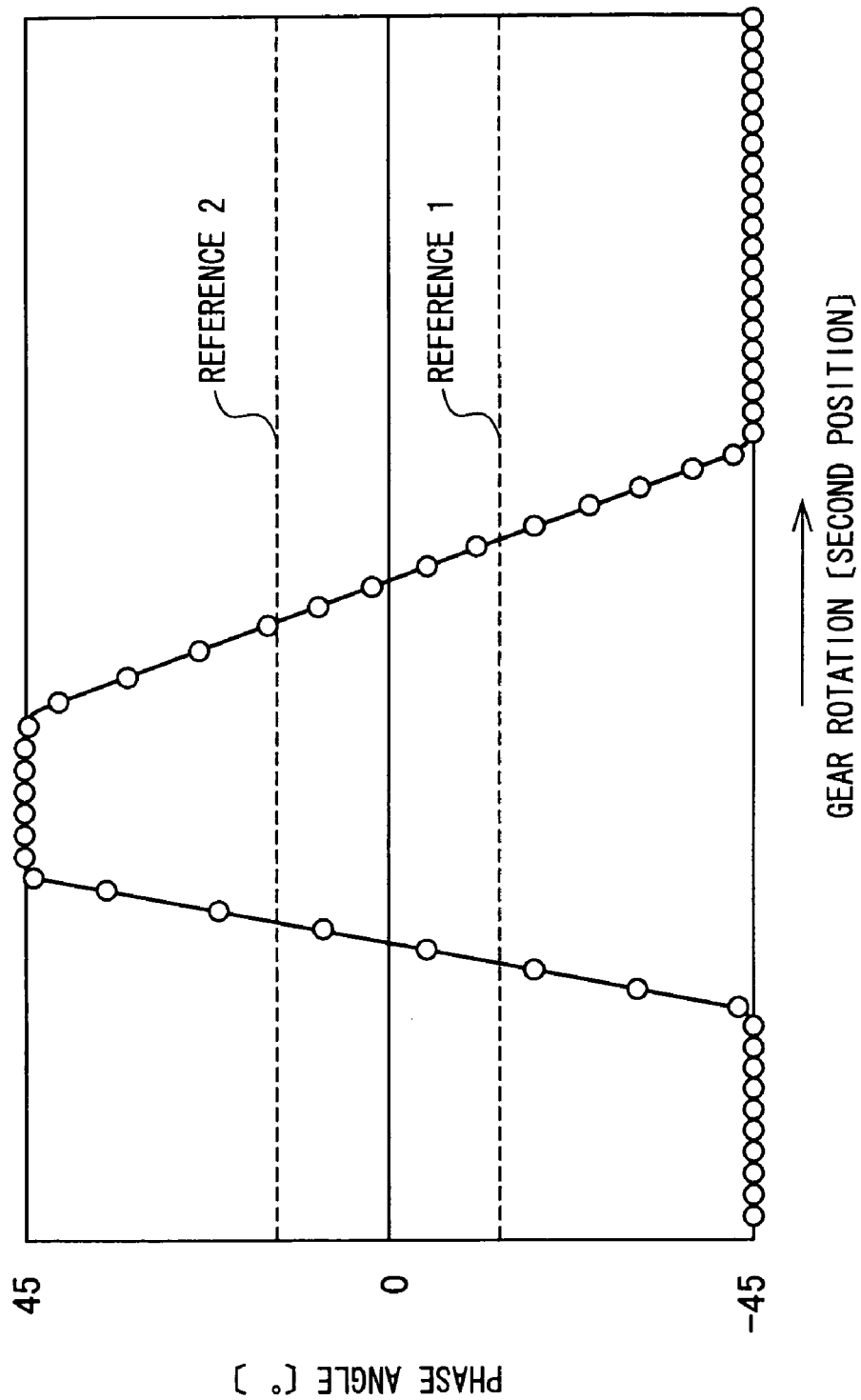
FIG. 44 is an explanatory diagram illustrating a phase change of a received signal according to the eleventh example.

In FIG. 44, the detecting hole 334 of the detecting wheel is on the transmitting electrode 332 at first, and the phase angle of the received signal from the receiving electrode is −45°. When, however, the detecting wheel rotates and the detecting hole 334 comes to the first boundary portion, the phase angle becomes 0°, and when the detecting wheel further rotates and the detecting hole 334 comes onto the transmitted electrode 331, the phase angle becomes +45°. Further, when the detecting wheel rotates, the detecting hole 334 again comes from the transmitting electrode 331 onto the detecting electrode 332 via the second boundary portion between the transmitting electrodes. Since, however, the electrode shape of the second boundary portion is different from the electrode shape of the first boundary portion, a gradient of the phase change in the second boundary portion is more gentle than that of the first boundary portion. When two signals of the references 1 and 2 shown in FIG. 44 are prepared and they are used as the reference signals of the detecting circuit 60, a detection can be made which gradient is for the phase change. In addition to the mechanical position information, the rotating direction can be detected according to a change in the phase and the gradient of the received signal from the receiving electrode due to the rotation of the detecting wheel. That is to say, a number of the stop positions in an intermediate phase changing from a state that the phase of the received signal delays with respect to that of the reference 1 signal into a state that the phase of the received signal advances with respect to that of the reference 2 signal is counted. In FIG. 44, the rotating direction can be detected in such a manner that when the number of the stop positions is two, the rotating direction is a regular direction, and when the number is four, the rotating direction is a reverse direction.

TWELFTH EXAMPLE

Figure 45:
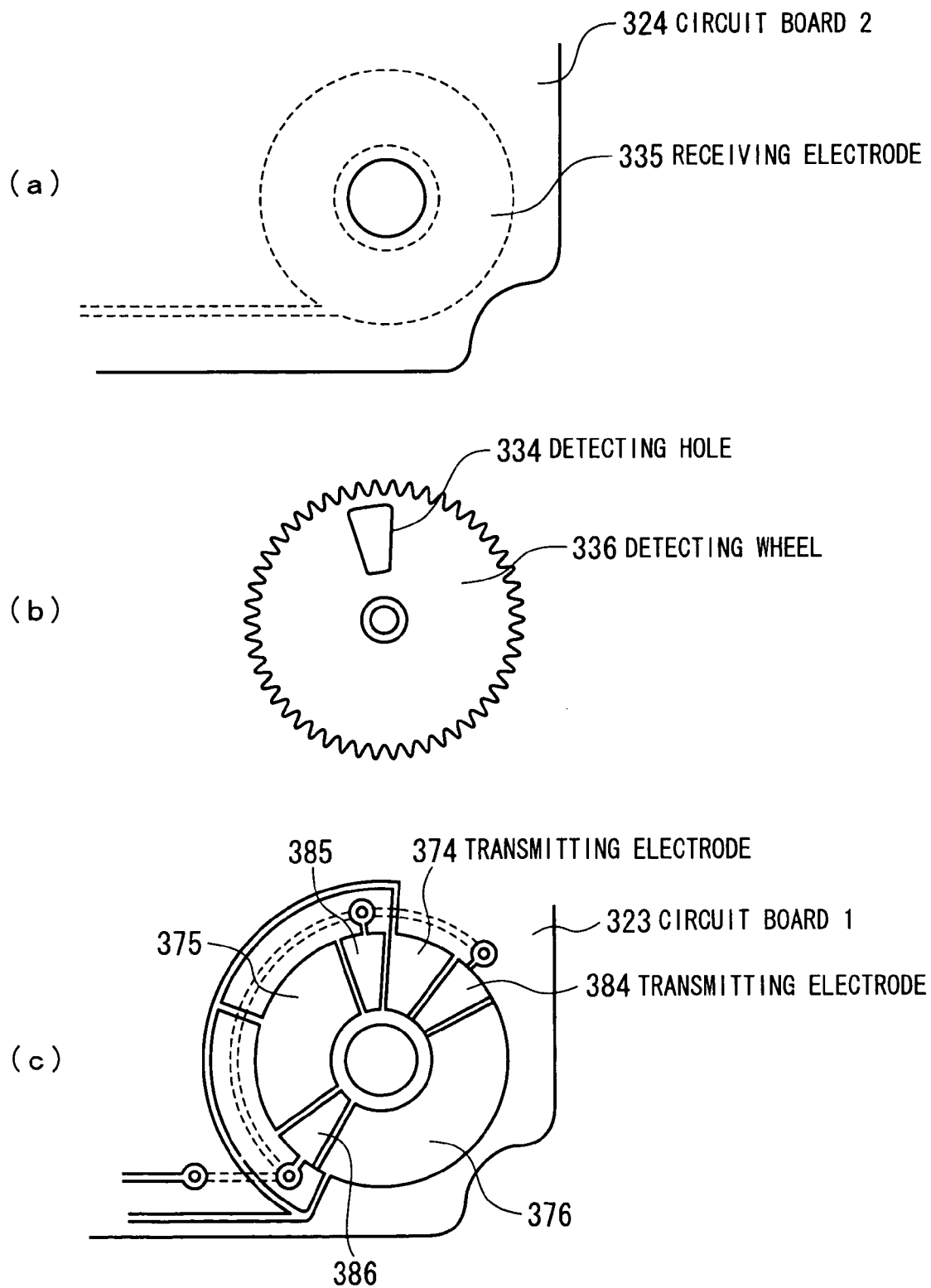
FIG. 45 is a diagram explaining a twelfth example.

The position detecting system of the electric watch according to a twelfth example of the present invention is explained below with reference to FIGS. 45 and 46.

FIG. 45(a) is a plan view of the transmitting electrodes. The transmitting electrode 335 is formed on the circuit board 2 (324). FIG. 45(b) is a plan view of the detecting wheel, and the rotating portion of the detecting wheel 336 has the detecting hole 334. FIG. 45(c) is a plan view of the transmitting electrodes. The transmitting electrodes 374, 375 and 376 for transmitting one of the two transmitted signals and the transmitting electrodes 384, 385 and 386 for transmitting the other transmitted signal are formed alternatively on the circuit board 1 (323). The transmitting electrodes 374, 375 and 376 are connected by a pattern on the circuit board 1 (323), and the transmitting electrodes 384, 385 and 386 are connected by a pattern on a rear side of the circuit board 1 (323). The electrode constitution is such that the transmitting electrodes change at different angles in at least three places with the rotating shaft of the detecting wheel 336 being a center.

Figure 46:
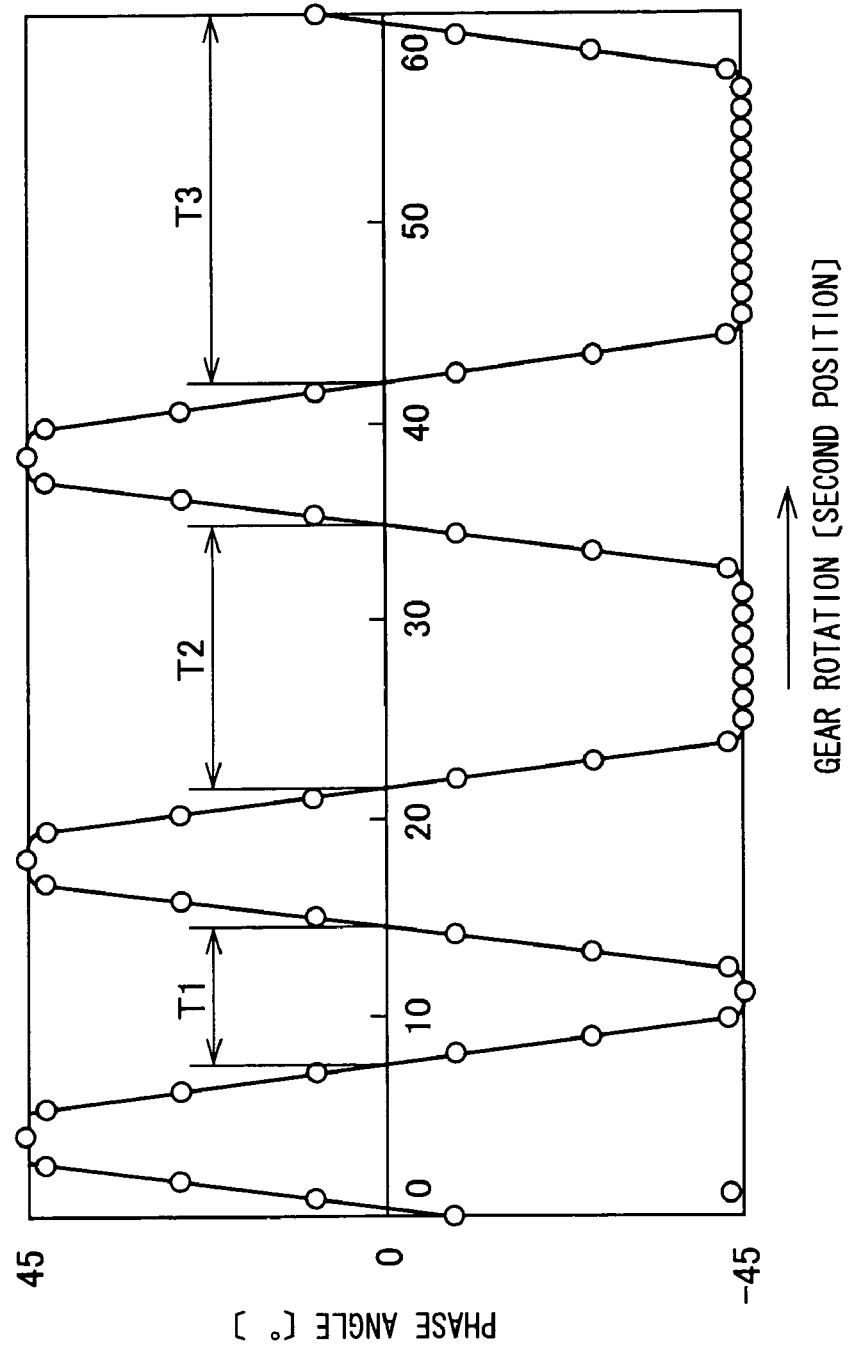
FIG. 46 is an explanatory diagram illustrating a phase change of a received signal according to the twelfth example.

FIG. 46 is an explanatory diagram illustrating the phase change of the received signal from the receiving electrode when the signal modulating means of the twelfth example is used.

Since the transmitting electrodes have the shape such that they are changed at different angles, the phase change according to the rotation of the detecting wheel 336 is as shown in FIG. 46. Since the angles between the boundary portions formed between the transmitting electrodes are T1, T2 and T3, namely, are different from each other, the angle T1, T2 and T3 is detected in order in the regular rotation, and the angle T1, T3 and T2 is detected in order in the reverse rotation. In such a manner, since the change patterns are different, by detecting the above mentioned order, the rotating direction as well as the mechanical position information can be detected.

THIRTEENTH EXAMPLE

The position detecting system of the electric watch according to a thirteenth example of the present invention is explained below with reference to FIGS. 47 and 48.

Figure 47:
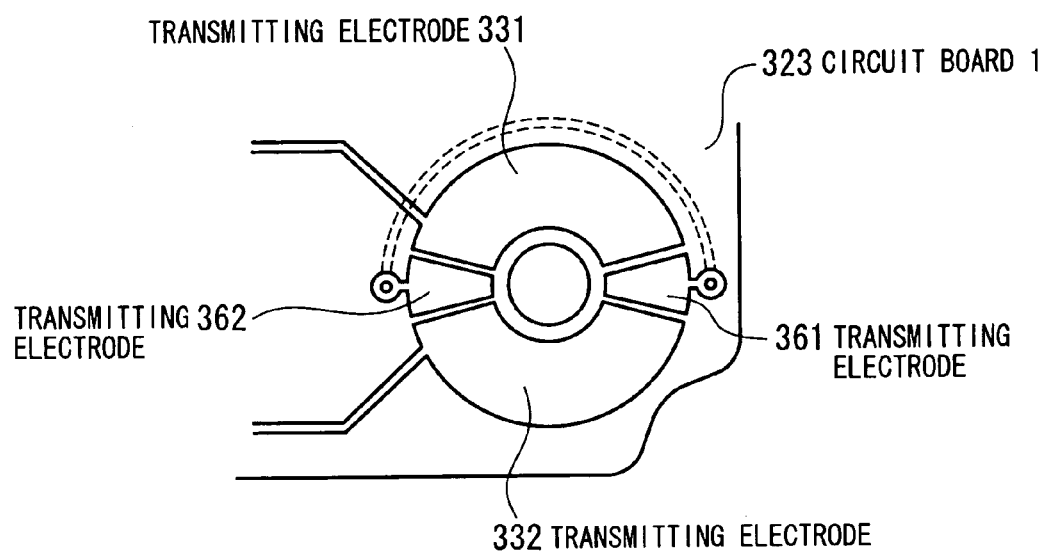
FIG. 47 is a plan view of the transmitting electrode according to a thirteenth example.

FIG. 47 is a plan view of the transmitting electrodes. The transmitting electrode 331 having a large area for transmitting the transmitted signal with phase of +90°, the transmitting electrode 332 having large area for transmitting the transmitted signal with phase of −90°, and the transmitting electrodes 361 and 362 having small area for transmitting the transmitted signal with phase of 0° are formed on the circuit board 1 (323). The transmitting electrode 361 and the transmitting electrode 362 are connected by a pattern on the rear side of the circuit board 1 (323).

Figure 48:
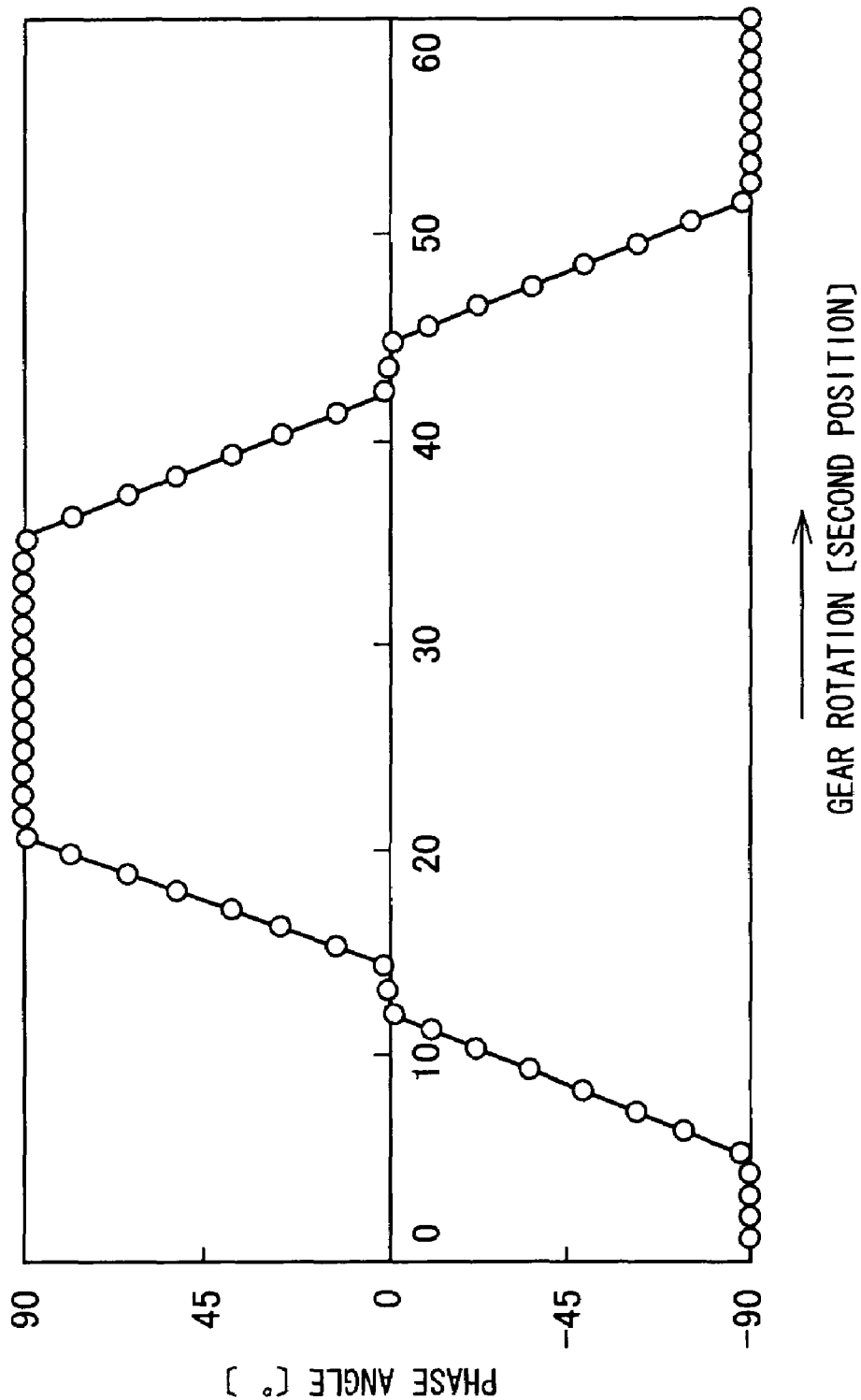
FIG. 48 is an explanatory diagram illustrating a phase change of a receiving signal according to the thirteenth example.

FIG. 48 is an explanatory diagram illustrating the phase change of the received signal from the receiving electrode when the signal modulating means of the thirteenth example is used. The detecting hole of the detecting wheel is on the transmitting electrode 332 at first, and the phase angle of the received signal from the receiving electrode is −90°. When the detecting wheel rotates and the detecting hole is overlapped with a part of the transmitting electrode 362, the phase angle starts to increase. When the detecting hole is on the transmitted electrode 362, the phase angle of the received signal from the receiving electrode becomes 0°. When the detecting wheel further rotates and the detecting hole is on the transmitting electrode 331, the phase angle of the received signal from the receiving electrode becomes +90°. When the detecting wheel further rotates and the detecting hole is overlapped with a part of the transmitting electrode 361, the phase angle starts to decrease. The detecting hole is on the transmitting electrode 361, the phase angle of the received signal becomes 0°. When the detecting wheel further rotates and the detecting hole is again on the transmitting electrode 332, the phase angle of the received signal from the receiving electrode becomes −90°.

When the phase difference between the two signals is designated by $\pi$, the amplitude of the received signal becomes zero so as not to be detected. When, however, the two transmitted signals with phase difference of $\pi$, and the one transmitted signal with a just middle phase between the phases of the two transmitted signals are used, the phase change of the received signal can be theoretically enlarged to $\pi$ by one rotation of the detecting wheel as the rotor.

In the constitution where the moment when the phase of the received signal is changed from the plus state to the minus state is detected as the reference position, it is not necessary to enlarge the width of the phase change of the received signal in the ideal structure. Actually even when the detecting hole is on one transmitting electrode, however, the signal from the adjacent transmitting electrode is slightly received. For this reason, it is effective to enlarge the entire width of the phase change of the received signal.

As shown in FIG. 48, since the phase change between one step becomes small around the phase angle of 0°, in the thirteenth example, the phase of the reference signal may be shifted slightly from 0° to the plus or minus direction.

In the position detecting system of the electric watch according to the seventh example of the present invention, as shown in the sectional view of FIG. 35, the circuit pattern for transmitting electrode is formed on the circuit board 1 (323) as a printed-circuit board provided below the detecting hole 334 of the detecting wheel 336 as the signal modulating means, and the circuit pattern for the transmitting electrode is formed on the circuit board 2 (324) provided above the detecting hole 334.

The transmitting electrodes and the receiving electrode in the signal modulating means of the seventh and the thirteenth examples can be formed easily as the circuit pattern on the printed-circuit board.

The printed-circuit board is more realistic and practical than a metal plate or the like.

The board may be a glass epoxy board or an FPC board.

In this example, the transmitting electrodes and the receiving electrode are formed on the printed-circuit boards, but either one of the transmitting electrodes and the receiving electrode may formed on the printed-circuit board.

FOURTEENTH EXAMPLE

The position detecting system of the electric watch according to an fourteenth example of the present invention is explained below with reference to FIG. 49.

Figure 49:
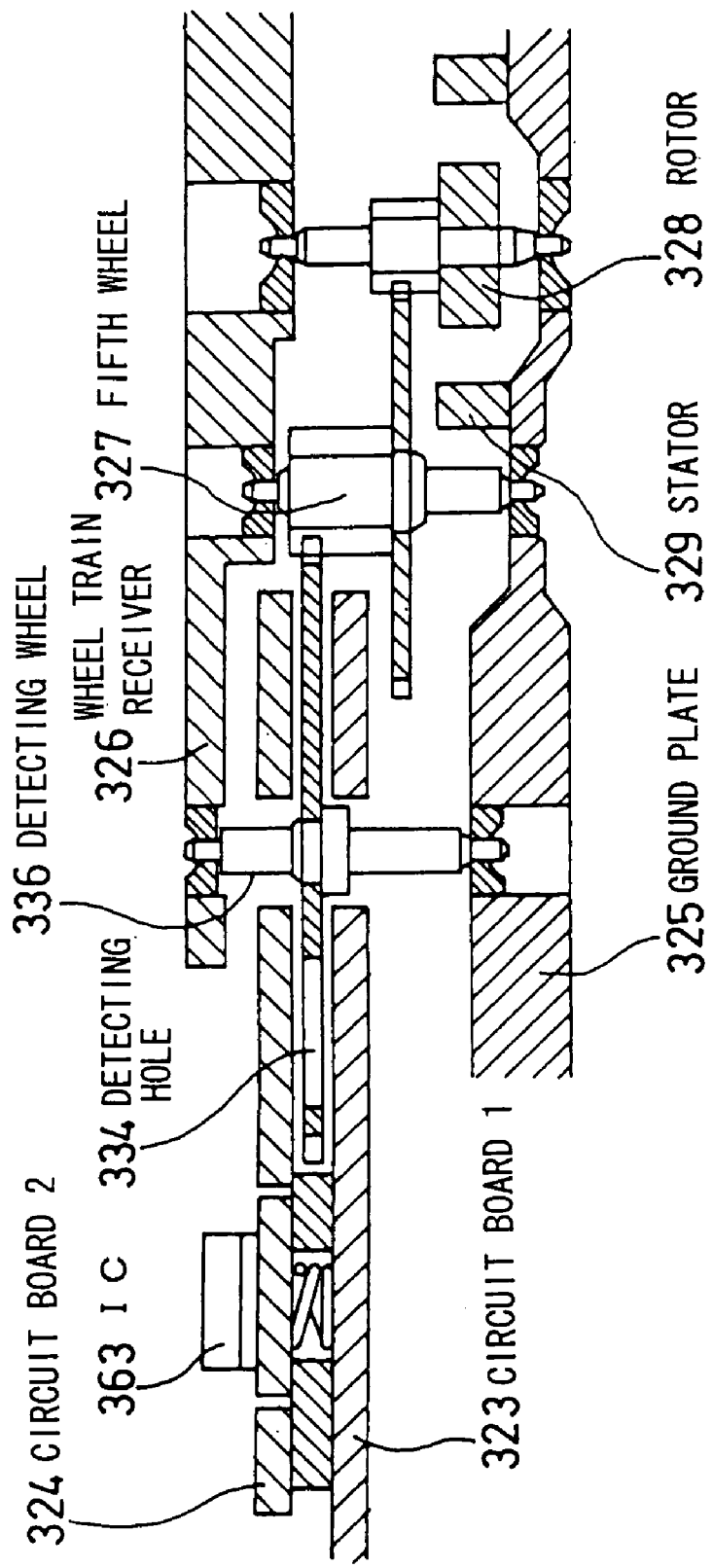
FIG. 49 is a diagram illustrating a sectional constitution of the position detecting system in the electric watch according to a fourteenth example of the present invention.

FIG. 49 is a diagram illustrating a sectional constitution of the position detecting system of the electric watch according to the present invention. Only the constitution around the circumference of the receiving electrode is different from the seventh example, and since the other portion is the same, only corresponding portion is explained.

The transmitting electrode below the detecting hole 334 of the detecting wheel 336 is formed on the circuit board 1 (323) as the printed-wiring board, and the receiving electrode above the detecting hole 334 is formed on the circuit board 2 (324). An integrating circuit (IC) 363 having the receiving circuit is mounted on the circuit board 2 (324).

The IC 363 is mounted on the circuit board 2 (324) forming the receiving electrode thereon so that a circuit block is formed, and thus the receiving electrode and the receiving circuit can be connected by the shortest length. For this reason, a very small received signal is prevented from being influenced by an external noise or by its transmitted signal, thereby preventing deterioration of the detecting ability.

Figure 50:
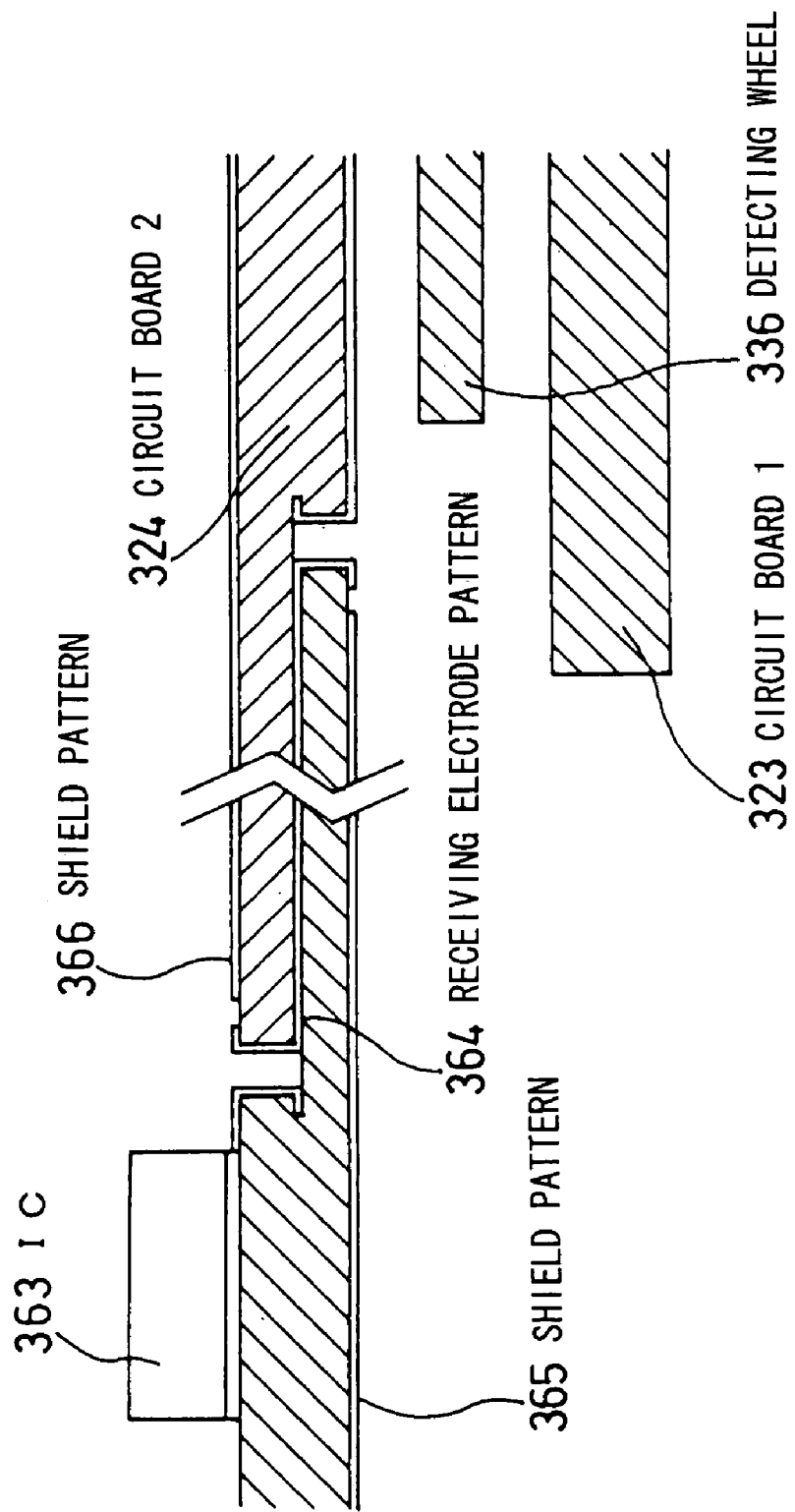
FIG. 50 is a diagram illustrating another sectional constitution of the position detecting system in the electric watch according to the fourteenth example of the present invention.

Further, as shown in FIG. 50, the receiving electrode, is constituted so that received signal pattern electrically connects a receiving electrode pattern 364 formed on the circuit board 2 (324) as the printed-wiring board and the integrated circuit (IC) 363 having the receiving circuit. A pattern on the lower surface of the received signal pattern is shielded by a shield pattern 365 as a ground electrode, and a pattern on an upper surface is shielded by a shield pattern 366 as a ground electrode. These shield patterns include the patterns on the upper and lower surfaces, but needless to say, any one of them may be provided.

The upper and lower surfaces of the received signal pattern for electrically connecting the receiving electrode and the integrated circuit having the receiving circuit are shielded, so that the receiving electrode is hardly influenced by the external noise and the transmitted signal. As a result, the deterioration of the detecting ability can be prevented. It is effective to shield only one side surface of the double-sided board, but it is the most effective to allow the received signal to transmit through a laminated board, and both the upper and lower surfaces of the received signal pattern is shielded.

Figure 51:
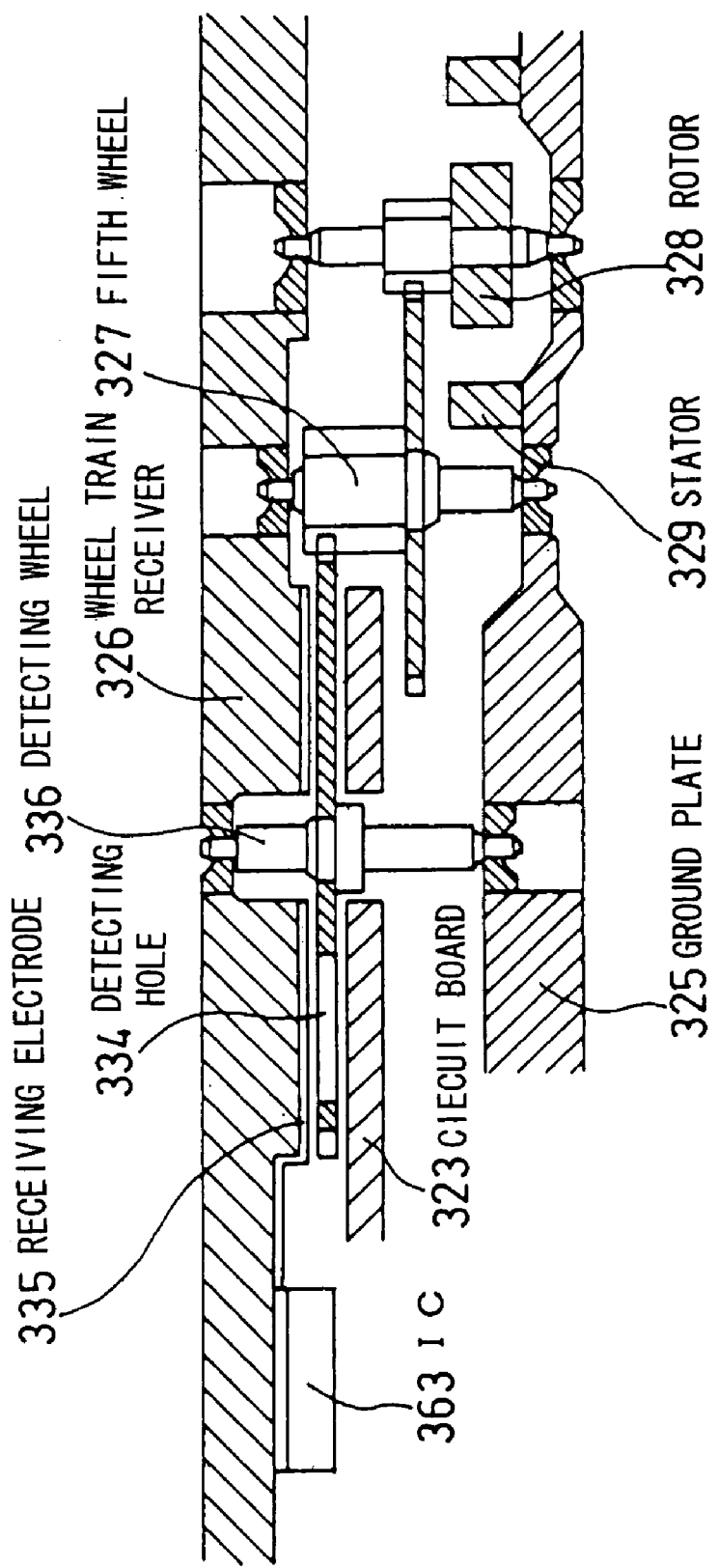
FIG. 51 is a diagram illustrating another sectional constitution of the position detecting system in the electric watch according to the fourteenth example of the present invention.

Further, a sectional constitution of the position detecting system of the electric watch according to the present invention is explained with reference to FIG. 51.

In this example, the transmitting electrode below the detecting hole 334 of the detecting wheel 336 is formed on the circuit board 1 (323) as the printed-wiring board, and the receiving electrode 335 above the detecting hole 334 is constituted so that a conductive film is formed on the surface of the wheel train receiver 326 as a supporting member of the electric watch. Needless to say, the transmitting electrode may be constituted so that a conductive film is formed on the surface of another supporting member such as a ground plate 325.

Instead that the electrodes are formed on the circuit board, the ground plate 325 and the wheel train receiver 326 are made of plastic, and the electrodes can be formed thereon by plating and coating. The circuit board is not required, thereby enabling thinning and reduction in the cost.

As is understood from the above examples of the present invention, one characteristic of the technical constitutions according to the seventh to the fourteenth examples is that the transmitting electrodes and the receiving electrode are arranged so as to be opposed to the approximately entire periphery of the rotating surface of the rotor.

Further, the rotating surface of the rotor in the signal modulating means of the present invention has on its rotating surface a plurality of detecting holes, in which each angle formed between a pair of two adjacently arranged holes to each other with respect to a rotating axis of the rotor is different from that formed between a separate pair of two adjacently arranged holes to each other with respect to the rotating axis. The transmitting electrodes transmit two kinds of the transmitted signals. The one transmitting electrode for transmitting one transmitted signal and the other transmitting electrode for transmitting the other transmitted signal are arranged alternatively so that their number is the same as that of the detecting holes. It is preferable that the boundary portions of the transmitting electrodes coincide with all the detecting holes of the rotor only once per rotation of the rotor.

Further, in this example of the present invention, the following constitution is preferable. The rotor has on its rotating surface a plurality of detecting holes, in which each angle formed between a pair of two adjacently arranged holes to each other with respect to a rotating axis of the rotor is different from that formed between a separate pair of two adjacently arranged holes to each other with respect to the rotating axis. A first transmitting electrode outputs a first transmitted signal, and a second transmitting electrode outputs a second transmitted signal different from the first transmitted signal. The first and the second transmitting electrodes are arranged alternatively so that their number is the same as that of the holes, and all the first transmitting electrodes coincide with the holes of the rotor only once every rotation of the rotor. Just before and after the coincidence, all the second transmitting electrodes coincide with the holes of the rotor.

On the other hand, in this example of the present invention, also the following constitution is preferable. The transmitting electrodes transmit two kinds of the transmitted signals, and the electrodes on the boundary portions opposed to the detecting holes have smaller area than that of the electrodes on the other portion.

It is desirable that the transmitting electrodes transmit two kinds of the transmitted electrodes, the electrode shapes on at least the two boundary portions are different from each other, the rotating direction as well as the mechanical position information is detected. Further, the transmitting electrodes transmit the two kinds of the transmitted signals, and the shapes of transmitting electrodes, having different angles with respect to the rotating direction with the rotating axis of the rotor being the center, is different from each other, and these transmitting electrodes are provided in at least three or more places.

On the other hand, in the example of the present invention, the transmitted signals are three kinds of signals with different phases, and the three transmitting electrodes are provided so as to transmit the three transmitted signals simultaneously. Further, the first transmitting electrode outputs the first transmitted signal, and the second transmitting electrode outputs the second transmitted signal different from the first transmitted signal.

On the other hand, in this example of the present invention, the first transmitting electrodes output the first transmitted signals, the second transmitting electrodes output the second transmitted signals different from the first transmitted signals, and the fist transmitting electrodes and the second transmitting electrodes are arranged alternatively in the rotating direction with the rotating axis of the rotor being the center. The first transmitting electrodes have different electrode areas.

In this example of the present invention, the first transmitting electrodes output the first transmitted signals, and the second transmitting electrodes output the second transmitted signals different from the first transmitted signals. Further, the third transmitting electrodes output the third transmitted signals different from the first and the second transmitted signals. The first, the second and the third transmitted signals are transmitted simultaneously.

In another basic constitution in this example of the present invention, for example, the electric watch having the detecting mechanism for detecting the position information of the rotating member to be measured includes a transmitting circuit, the transmitting electrode, signal modulating means, the receiving electrode, a receiving circuit. The transmitting circuit generates a plurality of transmitted signals. The output signal from the transmitting circuit is applied to the transmitting electrode. The receiving electrode receives a signal from the transmitting electrode. The rotor is provided between the transmitting electrode and the receiving electrode, and modulates the transmitted signal output from the transmitting electrode. The modulated signal received by the receiving electrode is input to the receiving circuit and is amplified by the receiving circuit. The reference position of the rotor is detected based on the phase change of the received signal. One of the transmitting electrode and the receiving electrode may be constituted by a printed-wiring board.

In another constitution, the electric watch having the detecting mechanism for detecting the position information of the rotating member to be measured includes a transmitting circuit, the transmitting electrode, signal modulating means, the receiving electrode, a receiving circuit. The transmitting circuit generates a plurality of transmitted signals. The output signal from the transmitting circuit is applied to the transmitting electrode. The receiving electrode receives a signal from the transmitting electrode. The rotor is provided between the transmitting electrode and the receiving electrode, and modulates the transmitted signal output from the transmitting electrode. The modulated signal received by the receiving electrode is input to the receiving circuit and is amplified by the receiving circuit. The reference position of the rotor is detected based on the phase change of the received signal. The receiving electrode may be formed by a printed-wiring board, and an integrated circuit including the receiving circuit may be mounted on the printed-wiring board.

Further, the electric watch may be constituted so that at least an upper surface or a lower surface of the received signal pattern, which connects the receiving electrode formed on the printed-wiring board with the integrated circuit having the receiving circuit, is shielded by a pattern as a ground electrode Further, in another constitution of the electric watch, the electric watch having the detecting mechanism for detecting the position information of the rotating member to be measured includes a transmitting circuit, the transmitting electrode, signal modulating means, the receiving electrode, a receiving circuit. The transmitting circuit generates a plurality of transmitted signals. The output signal from the transmitting circuit is applied to the transmitting electrode. The receiving electrode receives a signal from the transmitting electrode. The rotor is provided between the transmitting electrode and the receiving electrode, and modulates the transmitted signal output from the transmitting electrode. The modulated signal received by the receiving electrode is input to the receiving circuit and is amplified by the receiving circuit. The reference position of the rotor is detected based on the phase change of the received signal. The receiving electrode or the transmitting electrode may be an electrically conductive film formed on the surface of a supporting member of the rotor.

As is clear from the above explanation, in the position detecting system of the electric watch according to the respective examples of the present invention, the transmitting electrodes 331 and 332 are arranged so as to be divided by 180°. They are opposed to the approximately entire periphery of the rotating surface of the detecting wheel 336 of the signal modulating means composing the position detecting system. In another manner, the transmitting electrode 331 is made to be small, the transmitting electrode 332 is made to be large, and the receiving electrode 335 is disposed so as to oppose to the entire periphery of the rotating surface of the detecting wheel 336. As a result, even if the detecting wheel 336 is in any position, the phase angle can be detected, and further the phase changes twice per rotation. For this reason, as compared with the case where the transmitting electrode and the receiving electrode are arranged on a portion opposed to the detecting wheel 336, the detecting accuracy is improved, and the circuit configuration becomes very simple.

In the present invention, the five detecting holes 342, 343, 344, 345 and 346 are provided on the rotating surface of the detecting wheel 336 so as to form different angles each other with the rotating axis being the center. The five transmitting electrodes 354, 355, 356, 357 and 358 for transmitting the transmitted signal φB and the five transmitting electrodes 364, 365, 366, 367 and 368 for transmitting the transmitted signal φA are arranged alternatively. The transmitting electrodes are formed into the cord shape so that all the detecting holes match all the boundary portions between the transmitting electrodes only once per rotation of the rotating wheel 336. The detection is made in five places. As a result, the amplitude of the received signal becomes larger than that in the case where the detection is made in one place, and thus the detecting ability is heightened, thereby enabling more accurate detection.

Further, in the present invention, the electrode area of the boundary portion between the transmitting electrodes 331 and 332 is set to be smaller than that in the other portion, so that the change in the phase of the received signal from the receiving electrode due to the rotation of the detecting wheel becomes large. For this reason, the position detecting ability can be improved.

On the other hand, in the present invention, the electrode shapes on the two boundary portion between the transmitting electrodes 331 and 332 are different from each other, so that the gradient of the phase change on the first boundary portion is different from the gradient of the phase change on the second boundary portion As a result, the rotating direction as well as the mechanical position information of the detecting wheel can be detected.

In the present invention, the transmitting electrodes have such a shape that the transmitting electrodes are different from each other and have different angles each other, so that change patterns of the phase in the regular rotation and the reverse rotation due to the rotation of the detecting wheel are different from each other. In this state, the detection is made, so that the rotating direction as well as the mechanical position information can be detected.

Further in the present invention, the two transmitted signals whose phases are different by $\pi$, and the one transmitted signal with a just middle phase between the phases of the two transmitted signals are used and the phase change of the received signal can be theoretically enlarged to $\pi$ by one rotation of the detecting wheel as the rotor.

In the present invention, the transmitting electrode and the receiving electrode are formed as circuit patterns on the printed board, so as to be formed freely into desirable shapes. This method is more realistic and practical than a method of forming the electrodes using a metal plate or the like. The board can be a glass epoxy board or an FPC board. In the examples, the transmitting electrode and the receiving electrode are formed on the printed-wiring board, but only one of the transmitting electrode and the receiving electrode may be formed on the printed-wiring board.

Further in the present invention, the integrated circuit (IC) is mounted on the circuit board forming the receiving electrode so as to form a circuit block, so that the receiving electrode and the receiving circuit can be connected by the shortest length. This can prevent the weak received signal from being influenced by external noise and by the transmitted signal, thereby preventing the detecting ability from being deteriorated.

On the other hand, in the present invention, the upper and lower surfaces of the received signal pattern electrically connect the integrated circuit having the receiving electrode and the receiving circuit, are shielded. As a result, the receiving electrode is hardly influenced by the external noise and the transmitted signal, thereby preventing deterioration of the detecting ability. It is also effective that only a side surface of a both-sided board opposite to the received signal is shielded, but the effect is the best when a laminated board is utilized so that its both upper and lower surfaces throughout the laminated board are shielded against the received signal.

FIFTEENTH EXAMPLE

The position detecting system of the electric watch according to a fifteenth example of the present invention is explained below with reference to FIGS. 52 to 57.

In the fifteenth example of the present invention, the electric watch having the detecting mechanism for detecting the position information of the rotating member to be measured basically includes the transmitting circuit, a plurality of transmitting electrodes, the receiving electrode, the rotor, and a relay electrode. The transmitting circuit outputs a plurality of transmitted signals. The transmitting electrodes are formed on an insulating member and transmit the transmitted signals. The receiving electrode is formed on the insulating member. The rotor is provided so as to be opposed to the transmitting electrodes and the receiving electrode. The relay electrode is formed on the rotating surface of the rotor so as to be opposed to the transmitting electrodes and the receiving electrode. More concretely, the electric watch having an angle rotating position detecting mechanism of the rotating member to be measured in the watch includes the transmitting circuit, a plurality of transmitting electrodes, the receiving electrode, the rotor, the relay electrode, a position detecting circuit. The transmitting circuit outputs a plurality of transmitted signals. The transmitting electrodes are formed on the insulating member and transmit the transmitted signals. The receiving electrode is formed on the insulating member. The rotor is mechanically coupled with the rotating member to be measured so as to rotate. The relay electrode is arranged on the rotor so as to be opposed to the transmitting electrodes and the receiving electrode. The position detecting circuit receives a propagated signal induced by the relay electrode as the received signal via the receiving electrode, and inputs the received signal therein so as to detect the mechanical rotating position of the operating mechanism.

Figure 52:
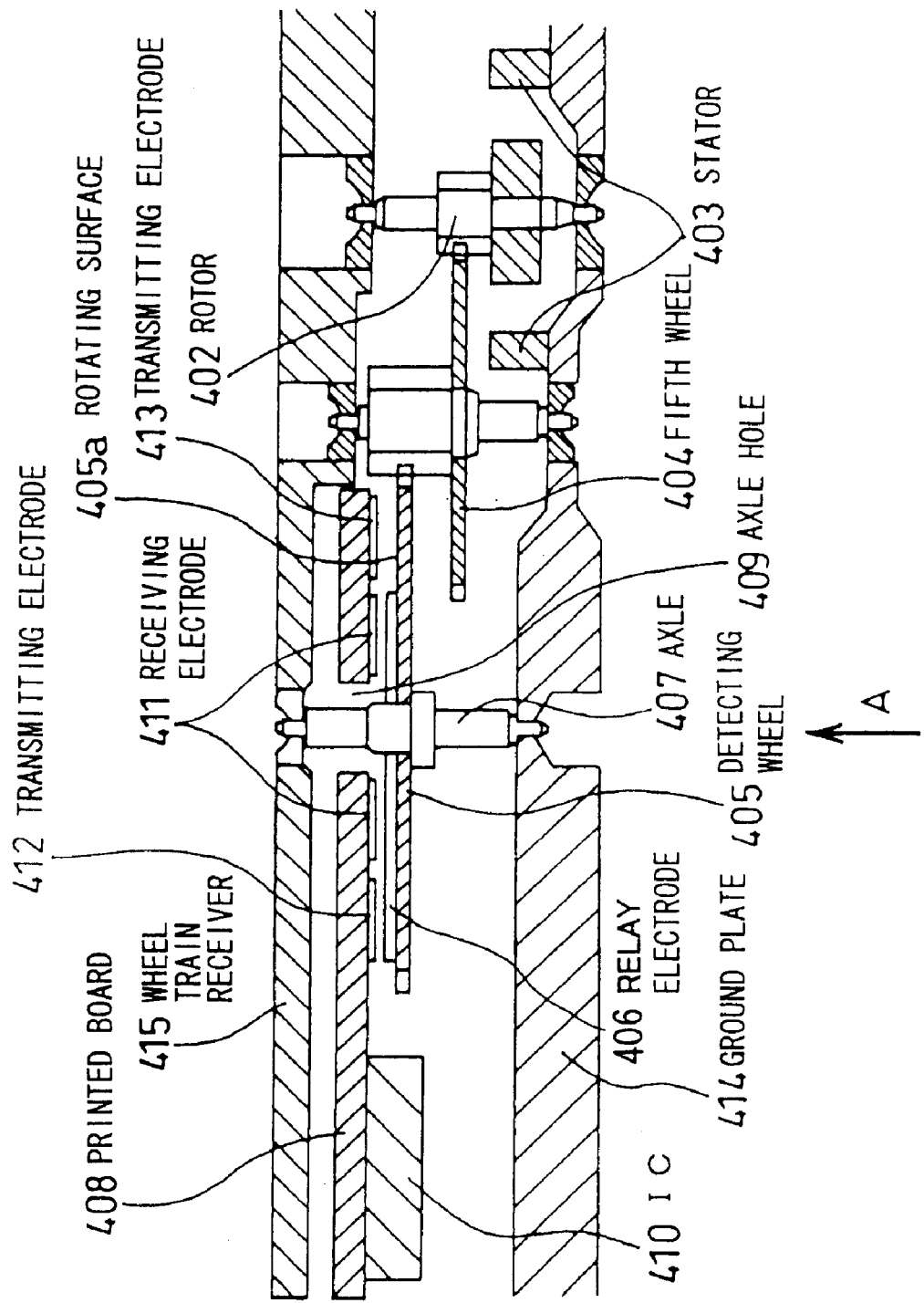
FIG. 52 is a partial sectional view of a fifteenth example of the present invention.

The mechanical constitution of the position detecting system in the electric watch according to the fifteenth example of the present invention is explained with respect to FIGS. 52 and 53. The numeral 402 designates a rotor, the numeral 403 designates a stator, and they as well as a coil, not shown, compose a step motor as the power source of the electric watch. The numeral 404 designates the fifth wheel for decelerating the rotation of the rotor 402, and the fifth wheel 404 decelerates and propagates the rotation to a fourth wheel, not shown, for driving the second hand.

The numeral 405 designates the detecting wheel as the rotor constituted by an insulator made of plastic or the like, and the rotation is decelerated and propagated from the fifth wheel 404 to the detecting wheel 405 at a reduction ratio which is the same as a reduction ratio from the fifth wheel 404 to the fourth wheel, not shown. The numeral 406 designates the relay electrode made of a plate-shaped electrically conductive member arranged on the rotating surface 405a of the detecting wheel 405, and its shape spreads to three directions radially as shown by slanted lines in FIG. 53(a). The numeral 407 designates an axle of the detecting wheel 405 composed of the conductor.

The numeral 414 designates a ground plate constituted by an insulator made of plastic or the like, and the numeral 415 designates a wheel train receiver constituted by an insulator made of plastic or the like. The ground plate 414 and the wheel train receiver 415 support the wheel train composed of the rotor 402, the fifth wheel 404 and the like, and the axle 407 of the detecting wheel 405.

The numeral 408 designates a printed board made of an insulating member arranged adjacently to the detecting wheel 405, and the numeral 409 designates an axle hole of the printed board 408 through which the axle 407 of the detecting wheel 405 is inserted. The numeral 410 designates the integrated circuit (hereinafter, IC) including the respective control circuits mounted on the printed board 408. The numeral 411 designates the receiving electrode made of copper foil formed into a circular shape with the axle hole 409 of the printed board 408 being the center. The receiving electrode 411 is electrically connected with the IC 410 by a received signal line 411a shown in FIG. 53(b).

The numerals 412 and 413 designate two sets of the transmitting electrodes which are formed by copper foil on the surface of the printed board 408 and output a plurality of transmitted signals. Its detailed constitution is shown in FIG. 53(b). One transmitting electrode 412 is composed of three transmitting electrodes 412a, 412b and 412c, each being arranged in approximately fan-shaped patterns. The transmitting electrodes 412a, 412b and 412c are electrically connected by a transmitting electrode connecting line 412d which passes through the rear surface of the printed board 8. They are connected with the IC 410 by a transmitted signal line 412e. The other transmitting electrode 413 is composed of three transmitting electrodes 413a, 413b and 413c, each being arranged in approximately fan-shaped patterns. They are electrically connected with each other by a transmitting electrode connecting line 413d formed on the printed board 408, and are connected with IC 410 by a transmitted electrode connecting line 413e.

The transmitting electrodes 412a, 412b, 412c, 413a, 413b and 413c are arranged and formed so as to surround the circular receiving electrode 411 in a position relationship of a concentric circle. Further, the detecting wheel 405 is arranged so that the axle 407 pierces the axle hole 409 of the printed board 408. For this reason, the relay electrode 406 arranged on the rotating surface of the detecting wheel 405, the transmitting electrodes 412a, 412b, 412c, 413a, 413b and 413c and receiving electrode 411 formed on the printed board 408 are arranged so as to be opposed to each other. They adjoin each other in a non-contact manner.

As a result, the transmitting electrodes 412a, 412b, 412c, 413a, 413b and 413c and the receiving electrode 411 are electrically capacity-coupled with the relay electrode 406 provided on the detecting wheel 405.

The outline of the basic operation of the position detecting system in the electric watch according to the present invention is explained below with reference to FIGS. 52 and 53. When a driving signal (not shown) is output from IC 410 to the coil of the step motor, not shown, every one second, the rotor 402 starts to rotate. Its rotating force is decelerated and transmitted to the fifth wheel 404. Further, the rotating force is transmitted to the detecting wheel 405 and the fourth wheel, not shown, at the same reduction ratio, and the detecting wheel 405 and the fourth wheel rotates by 6° every one second. On the other hand, the IC 410 has a time counting circuit (not shown) for adding a counted value every time when the rotor 402 is driven, a calendar circuit (not shown), and the like. The time and calendar information are electrically held in the IC 410.

When the detecting wheel 405 rotates, the relay electrode 406 on the rotating surface 405a of the detecting wheel 405 also rotates by 6° every one second while the transmitting electrodes 412a, 412b, 412c, 413a, 413b and 413c and the receiving electrode 411 and the relay electrode 406 adjoining and being in the non-contact manner. As a result, since the adjoining area between the relay electrode 406 and the transmitting electrodes 412a, 412b, 412c, 413a, 413b and 413c changes, the states of electrical capacitive coupling between both the electrodes changes every one second. Since, however, the adjoining surface of the relay electrode 406 and the receiving electrode 411 is circular, even when the relay electrode 406 rotates, the adjoining area thereof does not change, and neither does the capacitive coupling.

Figure 54:
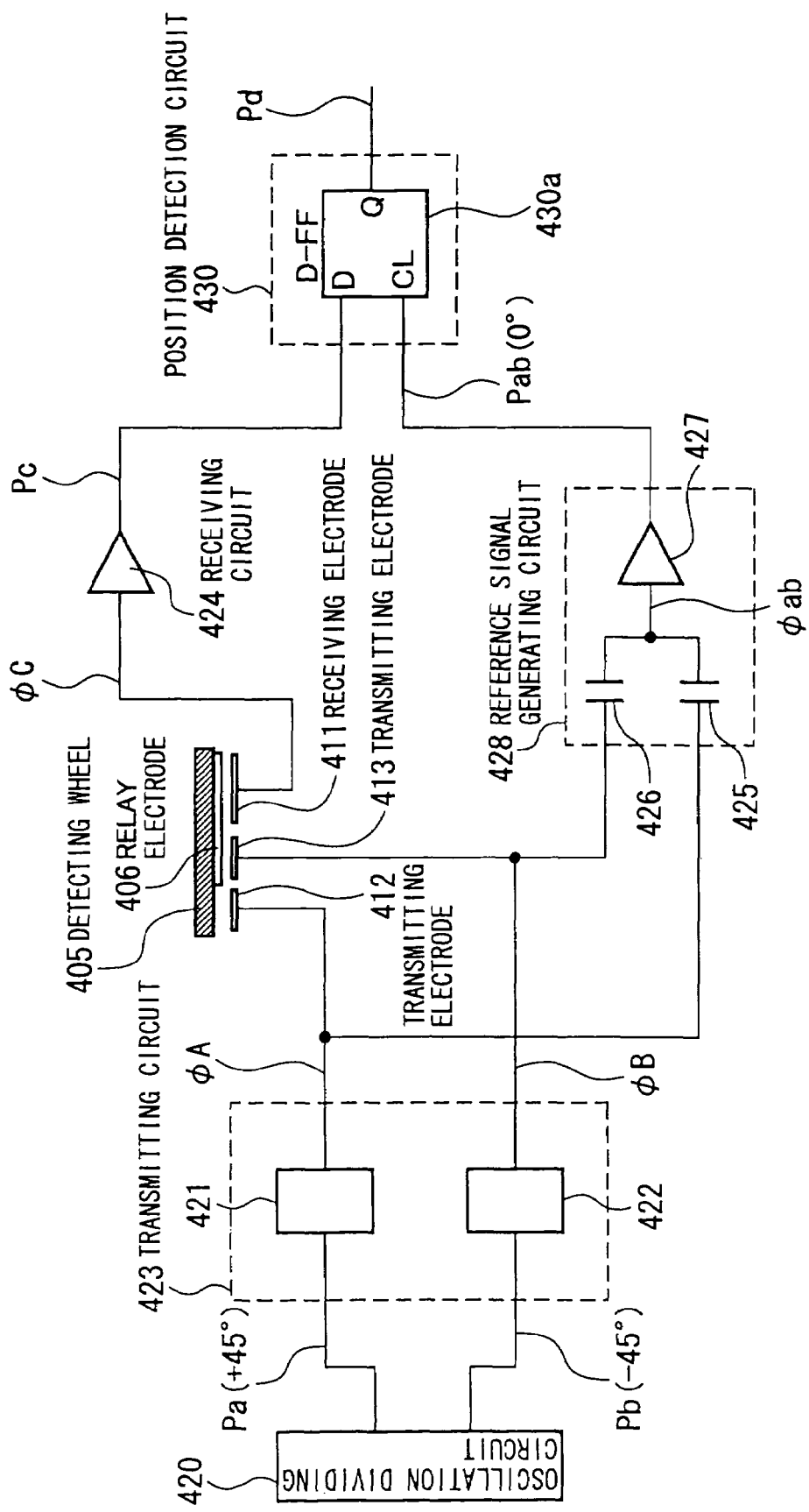
FIG. 54 is a block diagram illustrating an electric constitution according to the fifteenth example.

The electrical constitution and the electrical operation of the position detecting system in the electric watch of the present invention are explained below with reference to FIG. 54. FIG. 54 is a block diagram illustrating the electrical constitution of the position detecting system. The constitution of the position detecting system is composed of an oscillation dividing circuit 420, the transmitting circuit 423, the receiving electrode 411, the transmitting electrodes 412 and 413, the detecting wheel 405, the relay electrode 406, a receiving circuit 424 composed of an amplifying circuit, a reference signal generating circuit 428, and a position detecting circuit 430. The oscillation dividing circuit 420 generates output signals. The transmitting circuit 423 is composed of two bandpass filter amplifying circuits (hereinafter, BPF amplifying circuits) 421 and 422. The relay electrode 406 is arranged on the detecting wheel 405. The reference signal generating circuit 428 is composed of capacitors 425 and 426 and the amplifying circuit 427.

The electrical connecting relationship of the position detecting system is explained below with reference to FIG. 54. The oscillation dividing circuit 420 outputs various control signals (not shown) and driving signals (not shown), and outputs an output pulse Pa(+45') whose phase advances by 45° and an output pulse Pb(−45°) whose phase delays by 45° (hereinafter, Pa (+45°) is designated by Pa, and Pb (−45°) is designated by Pb. The input signal of the BPF amplifying circuit 421 of the transmitting circuit 423 is the pulse Pa and the BPF amplifying circuit 421 outputs the transmitted signal φA. The input signal of the BPF amplifying circuit 422 of the transmitting circuit 423 is the pulse Pb and the BPF amplifying circuit 422 outputs the transmitted signal φB.

The transmitted signal φA is input into the transmitting electrode 412 and the capacitor 425, and the transmitted signal φB is input into the transmitting electrode 413 and the capacitor 426. The receiving electrode 411 outputs the received signal φC via the transmitting electrode 406, and the received signal φC is input to the receiving circuit 424 and the receiving circuit 424 outputs a received pulse signal Pc. A synthesized signal φab obtained by synthesizing the two transmitted signals φA and φB via the two capacitors 425 and 426 is input to the amplifying circuit 427 of the reference signal generating circuit 428, and the amplifying circuit 427 outputs a reference signal Pab (0°) whose phase does not advance or delay (hereinafter, Pab (0°) is designated by Pab). The received pulse signal Pc and the reference signal pab are input to the position detecting circuit 430 and the position detecting circuit 430 outputs a position signal Pd.

The electrical operation of the position detecting system is explained below with reference to FIG. 54. The oscillation dividing circuit 420 outputs the two output pulses Pa and Pb whose phases are shifted by $\pi/2$ by an internal quartz oscillating circuit (not shown) and a logic circuit (not shown). The output pulses Pa and Pb are input to the two BPF amplifying circuits 421 and 422 of the transmitting circuit 423, respectively, and in the BPF amplifying circuits 421 and 422, a high-frequency component is removed and only a fundamental wave component is amplified. The BPF amplifying circuits 421 and 422 generate the two transmitted signals φA and φB which are sine waves and phase difference between them is $\pi/2$.

The generated two transmitted signals φA and φB are transmitted from the transmitting electrodes 412 and 413. Since the transmitting electrodes 412 and 413 are high-impedance loads having extremely small electrostatic capacities, the power consumption of the transmitting circuit 423 is very small. As mentioned above, since the detecting wheel 405 rotates at the rotating angle of 6° per second, the electric capacity coupling between the relay electrode 406 and the transmitting electrodes 412 and 413 changes according to the rotation of the detecting wheel 405. As a result, a relay signal which is modulated according to the rotation of the detecting wheel 405 is induced on the relay electrode 406.

The receiving electrode 411 adjoins the relay electrode 406 in the non-contact manner as mentioned above so that the electrical capacitive coupling is carried out. Even if the detecting wheel 405 rotates, the states of the electrical capacitive coupling does not change. As a result, the propagated signal induced by the relay electrode 406 is not modulated by receiving electrode 411, which is electrically capacitive-coupled with the relay electrode 406, and is transmitted to the receiving electrode 411 as the received signal φC. Further, the received signal φC is amplified so as to be saturated by the receiving circuit 424, and the received pulse signal Pc which holds the phase information of the received signal φC is generated.

The operation of the reference signal generating circuit 428 for generating the reference signal Pab is explained below. The transmitted signal φA whose phase advances by 45° and the transmitted signal φB whose phase delays by 45° are input to capacitors 425 and 426 of the reference signal generating circuit 428, and generates the synthesized signal φab. Since capacity values of the capacitors 425 and 426 are equal with each other, however, the phase of the synthesized signal φab has a sine wave with a phase angle of 0° which is a middle point between the phases of the two transmitted signals φA and φB. The synthesized signal φab is amplified so as to be saturated by the amplifying circuit 427, and the amplifying circuit 427 generates the reference signal Pab which is a pulse signal with phase angle of 0°.

The operation of the position detecting circuit 430 is explained below with reference to FIG. 54. The position detecting circuit 430 is composed of a D-type flip-flop 430a (hereinafter, D-FF) as one example. The received pulse signal Pc is input into a data input terminal D of the D-FF 430a, and the reference signal Pab is input into a clock terminal CL of the D-FF 430a. Further, an output terminal Q of the D-FF 430a outputs the position signal Pd.

When the phase of the received pulse signal Pc input into the data input terminal D of the D-FF 430a advances with respect to the phase of the reference signal Pab input into the clock terminal CL, a logical level of the output terminal Q becomes logic "H". When the phase of the received pulse signal Pc input into the data input terminal D delays from the phase of the reference signal Pab input into the clock terminal CL, the logical level of the output terminal Q becomes logic "L". As a result, the advance and delay of the phase of the received pulse signal Pc with respect to the reference signal Pab can be obtained by the logical level of the position signal Pd.

Figure 55:
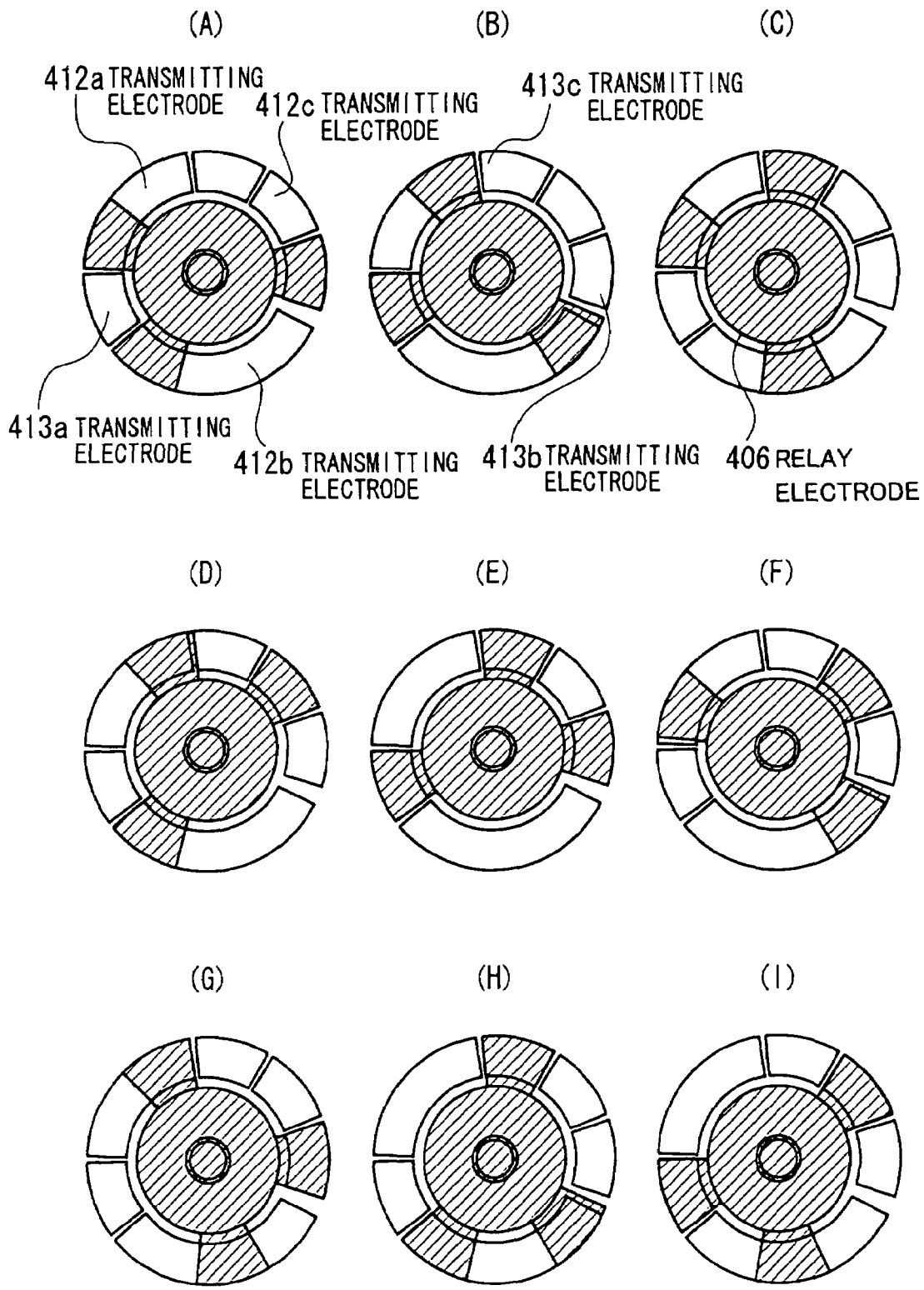
FIG. 55 is a plan view illustrating a change in a position relationship between a relay electrode and the plural transmitting electrodes when the relay electrode arranged on the detecting wheel of the fifteenth example rotates once about a shaft.

A change in the position relationship between the relay electrode 406 and the transmitting electrodes 412 and 413, and a change in the phase of the received signal φC according to the change in the position relationship are explained below. FIG. 55 is a plan view illustrating the change in the position relationship between the relay electrode 406 and the transmitting electrodes 412 and 413 when the relay electrode 406 arranged on the detecting wheel 405 rotates once about the axle 407. FIG. 55(A) to 55(I) illustrate the change in the position relationship at every 40° step of one rotation. As mentioned above, the transmitting electrode 412 transmits the transmitted signal whose phase advances by 45°, and the transmitting electrode 413 transmits the transmitted signal φB whose phase delays by 45°. The relay electrode 406 rotates to a right direction with respect to the transmitting electrodes 412 and 413.

In the state of FIG. 55(a), the two blade portions shown by slanted lines of the relay electrode 406 which spread to three directions are adjacently overlapped with the transmitting electrodes 412a and 412b, and the other blade portion is adjacently overlapped with the transmitting electrode 413b. As a result, the transmitting electrode 412 for transmitting the transmitted signal φA is adjacently overlapped with the relay electrode 406 with an area ratio which is twice as large as the transmitting electrode 413 for transmitting the transmitted signal φB. The relay signal which is induced by the relay electrode 406, therefore, becomes a synthesized wave of the transmitted signals A and B, but its synthesizing ratio becomes transmitted signal φA: the transmitted signal φB=2:1, and thus the influence of the transmitted signal φA is double. For this reason, the doubled influence of the transmitted signal φA exerts on the phase of the transmitted signal, and thus the phase of the propagated signal becomes +15° with respect to the phase of the reference signal Pab which is 0°.

FIG. 55(B) illustrates a state that the relay electrode 406 rotates to the right direction by about 40° from the state in FIG. 55(A). The two blade portions of the relay electrode 406 which spread to the three directions are adjacently overlapped with the transmitting electrodes 412a and 412b, and the other blade portion is adjacently overlapped with the transmitting electrode 413a. As a result, the synthesizing ratio of the relay signal induced by the relay electrode 406 becomes the transmitted signal φA: the transmitted signal φB=2:1 similarly to FIG. 55(A). Accordingly, phase of the relay signal becomes +15° with respect to the phase of the reference signal Pab which is 0°. Hereinafter, in the position relationships in FIGS. 55(C), (G), (H) and (I), the synthesizing ratio of the relay signal becomes the transmitted signal φA: the transmitted signal φB=2:1 similarly. For this reason, when the phase of the reference signal Pab is 0° as the reference, the phase of the propagated signal becomes +15°.

In the state of FIG. 55(D), all of the blade portions of the relay electrode 406 which spread to the three directions are adjacently overlapped with the transmitting electrodes 412a~412b and 412c belonging to the transmitting electrode 412. The relay signal is, therefore, influenced only by the transmitted signal φA, and its phase becomes +45° which is equal with the transmitted signal φA. Similarly, in the state of FIG. 55(F), all of the blade portions of the relay electrode 406 which spread to the three directions are adjacently overlapped with the transmitting electrodes 412a, 412b and 412c belonging to the transmitting electrode 412. The relay signal is, therefore, influenced only by the transmitted signal φA, and its phase becomes +45° which is equal with the transmitted signal φA.

In addition, in the state of FIG. 55(E), all of the blade portions of the relay electrode 406 which spread to the three directions are adjacently overlapped with the transmitting electrodes 413a, 413b and 413c belonging to the transmitting electrode 413. The propagated signal is, therefore, influenced only by the transmitted signal φB, and its phase becomes −45° which is equal with the transmitted signal φB. As mentioned above, the propagated signal induced by the relay electrode 406 is propagated to the receiving electrode 411 as the transmitted signal φC without being modulated. For this reason, the phase information of the received signal φC is equal to the phase information of the propagated signal.

The explanation in FIG. 55 describes the change in the phase in the case of the ideal constitution without leak, but an actual phase change is slightly small.

Figure 56:
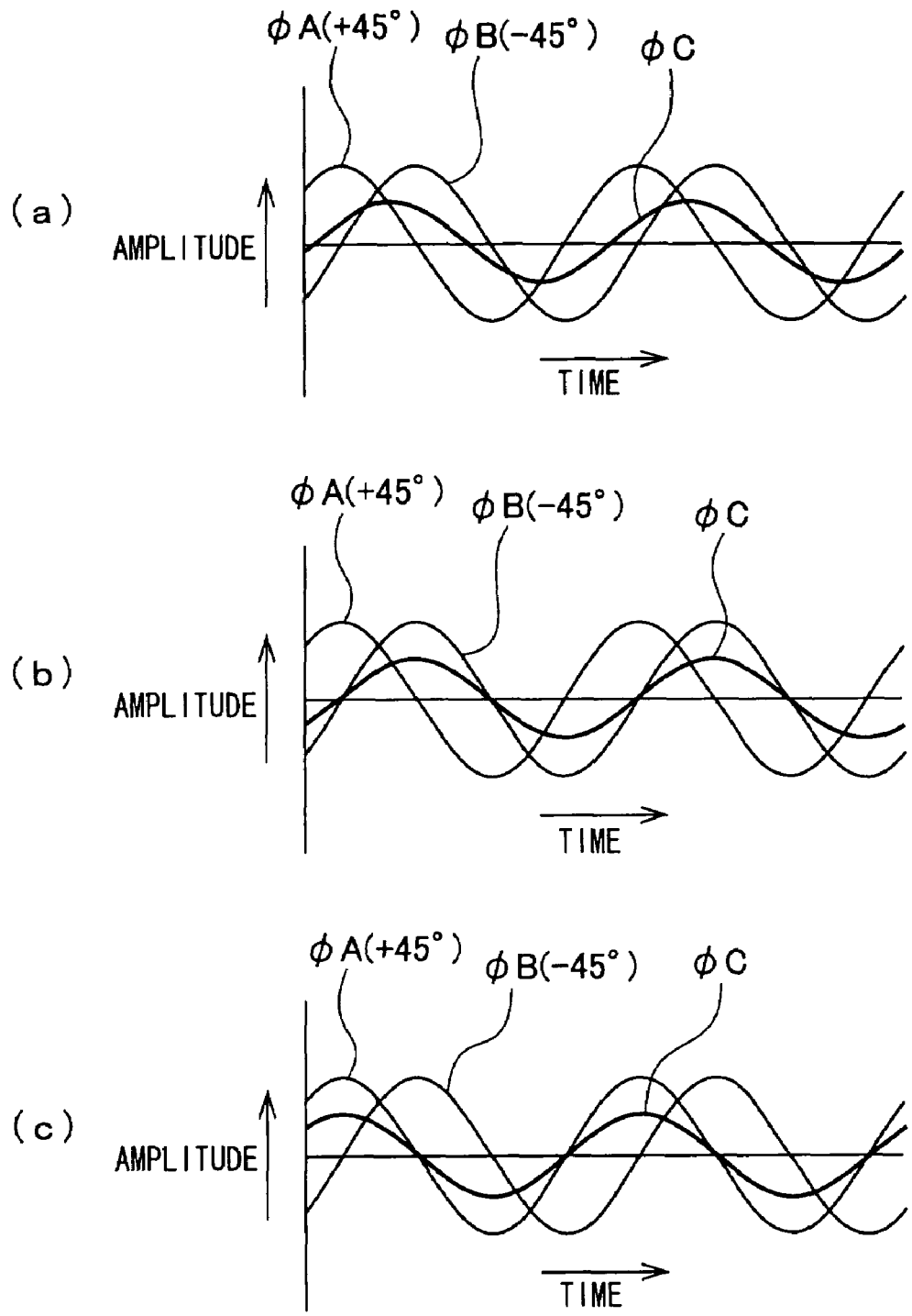
FIG. 56 is a graph illustrating a phase relationship between the transmitted signal and the received signal according to the fifteenth example.

FIG. 56 illustrates the change in the phases of the transmitted signals φA and φB and the received signal φC due to the change in the position relationships between the relay electrode 406 and the transmitting electrodes 412 and 413 shown in FIG. 55. FIG. 56(a) illustrates the phase relationship between the transmitted signals φA, φB and φC when the phase of the received signal φC shown in FIG. 55(A) is +150. FIG. 56(b) illustrates the phase relationship between the transmitted signals φA, φB and φC when the phase of the received signal φC shown in FIGS. 55(D) and 55(F) is +45° which is equal with the phase of the transmitted signal φA. FIG. 56(c) illustrates the phase relationship between the transmitted signals φA, φB and φC when the phase of the received signal φC shown in FIG. 55(E) is −45° which is equal with the phase of the transmitted signal φB. The received signal φC becomes a signal obtained by modulating the transmitted signals φA and φB according to the position relationship between the relay electrode 406 and the transmitting electrodes 412 and 413.

FIG. 57(a) is a graph in which the relationship between a rotating amount of the detecting wheel 405 and the phase of the received signal φC is sampled every movement of the hand per second. The rotating amount (second) of the detecting wheel 405 is plotted along the X axis and the phase angle of the received signal φC is plotted along the Y axis. Black circles on the graph show the phase of the received signal φC per second, and A to I which is described on a lower portion of the graph correspond to the positions of the relay electrode 406 shown in FIGS. 55(A) to 55(I).

That is to say, the position of the detecting wheel 405 shown in FIG. 55(A) is a starting point on the graph of FIG. 57(a) (namely, a left corner). When the detecting wheel 405 is rotated to the right per second, the phase of the received signal φC at the period corresponding to FIGS. 55(A) to 55(C) is maintained at +15°, and the phase of the received signal φC becomes +45° at the period corresponding to FIG. 55(D). The phase of the received signal φC is inverted to be −45° at the period corresponding to FIG. 55(E), and the phase of the received signal φC is again inverted so as to be +45° at the period corresponding to FIG. 55(F). The phase of the received signal φC is again maintained at +15° at the period after FIG. 55(G).

As explained in FIG. 55, FIG. 57(a) shows the change in the phase in the case of the ideal constitution without leak, and the actual phase change is slightly small.

FIG. 57(b) illustrates a waveform of the position signal Pd which is the output from the position detecting circuit 430 corresponding to the phase change of the received signal φC shown in FIG. 57(a). The position signal Pd outputs the logic "H" at the period that the received signal φC advances to the plus side, and outputs the logic "L" at the period that the received signal φC delays to the minus side. For this reason, when the detecting wheel is moved from D to E shown in FIG. 57(a), the position signal Pd is changed from the logic "H" into the logic "L". When the detecting wheel position number is moved from E to F, the position signal Pd is changed from the logic "L" into the logic "H". The logic change of the position signal Pd is captured, accordingly, the accurate rotating position of the detecting wheel 405 can be detected with accuracy of one second unit.

The position detecting circuit 430 detects the phase per movement of the hand every one second and output the position signal Pd. When the detecting wheel 405 stops in the vicinity where the phase of the received signal φc just passes through 0° and the phase is detected, advance and delay occurs instantaneously and mainly in the vicinity where the phase is 0° due to the jolting of the wheel train and the detecting wheel 405. This involves the risk of mis-detection of the position. Even if slight jolting is present on the wheel train and the detecting wheel, therefore, the phases of the reference signal Pab and the transmitted signals φA and φB are finely adjusted in order to prevent the mis-detection of the position. In such a manner, the adjustment may be made so that the positions of the black circles in FIG. 57(a) which are measuring points of the phase do not come to the vicinity of the phase of 0°.

In FIG. 57(a), the black circle positions which pass through the phase of 0° are in the vicinity of +10° and −10° because this adjustment is made. As a result, even if the wheel train and the detecting wheel jolt, the position is not mis-detected. Further, the position detecting system of the present invention does not detect a change in an absolute value of the electrostatic capacity value and an absolute value of the phase angle, but detects a relative change in phase on the basis of the transmitted signals with different phases. For this reason, influences of temperature change, aged deterioration and the other disturbances are canceled, thereby detecting the position with high accuracy and high reliability.

The time correcting method of the electric watch using the position signal Pd which is the output from the position detecting circuit 430 is explained below. For example, the position of the detecting wheel 405 at the moment when the position signal Pd in FIG. 57(b) is changed from the logic "L" into the logic "H" is determined a zero second original point, and the secondhand is attached to the fourth wheel so as to be 12:00:00. In the position of the zero second original point, the time counting circuit (not shown) for storing the electric holding time included in the IC 410 is reset, and the electric watch is started from that state.

The electric watch continuously moves the hand per second, and the time counting circuit in the IC 410 also counts a number per second. For this reason, the display position of the hand as the mechanical holding time does not shift from the information of the time counting circuit for storing the electric holding time. When the one-second hand movement of the train wheel is mis-operated due to the impact and the other disturbances, the display position of the hand does not match the time information of the time counting circuit in the IC 410.

The control circuit (not shown) of the IC 410 always monitors the time information of the time counting circuit and the zero second original point represented by the position signal Pd output from the position detecting circuit 430. When the time information of the time counting circuit does not match the zero second original point represented by the position signal Pd, the rotor 402 is rotated to the regular or reverse direction, and the correction is made so that the time information of the time counting circuit matches the zero second original point represented by the position signal Pd.

According to the fifteenth example, the transmitting electrodes and the receiving electrode are formed on the surface of the insulating member such as one and the same printed board or the like, and the position of the wheel train is detected by the phase detecting means utilizing the change in the electrical capacitive coupling between the transmitting electrodes, the receiving electrode and the relay electrode arranged on the detecting wheel. As a result, the time difference between the mechanical holding time and the electrical holding time in the electric watch is detected, the time can be corrected into proper time. Further, the transmitting electrodes and the receiving electrode are formed on the surface of one and the same insulating member, and the phase detecting means, which utilizes the change in the electrical capacitive coupling between the above electrodes and the relay electrode arranged on the detecting wheel, is adopted. As a result, the constitution of the position detecting system is simple, and thus the wristwatch according to the present invention system can be thin, and the cost of the position detecting system can be reduced. Further, the wristwatch having the month-end automatic correcting function can be constituted by using the system for the mechanical position detection of the day plate and the week plate.

In this example, according to the above-mentioned constitution, the transmitting electrodes and the receiving electrode are formed on the insulating member such as one printed board, and the relay electrode is arranged on the rotor, which is mechanically coupled with the operating mechanism and is rotated, so as to be opposed to the transmitting electrodes and the receiving electrode. The propagated signal induced by the relay electrode is received as the received signal by the receiving electrode, and the received signal is input to the phase detection circuit so that the mechanical rotating position of the operating mechanism is detected. For this reason, the position detecting system, which does not require a lot of energy, is not deteriorated with age and has high reliability, can be constituted.

Further, since the transmitting electrodes and the receiving electrode are formed on the surface of one and the same insulating member, an excessive insulating member such as a printed board is not required, and the constitution of the position detecting system can be simplified. Further, the system can be thinned, and the cost of the position detecting system can be reduced.

SIXTEENTH EXAMPLE

The position detecting system of the electric watch according to a sixteenth example of the present invention is explained below with reference to FIG. 58.

Figure 58:
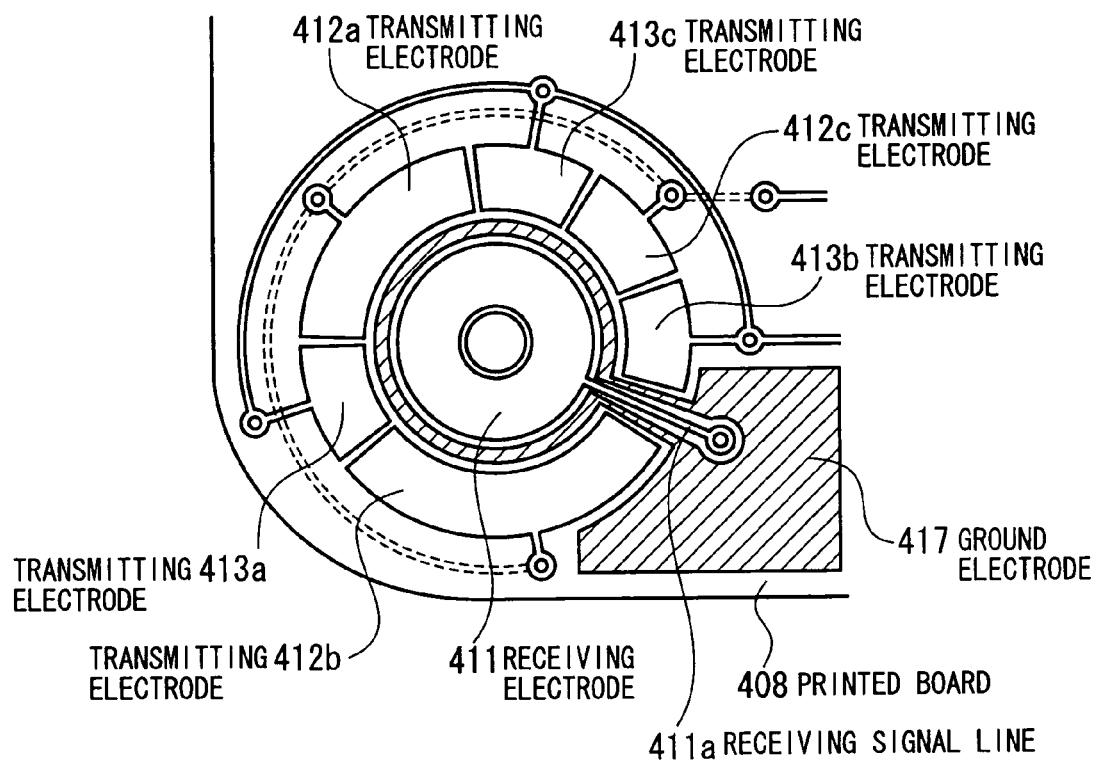
FIG. 58 is a plan view illustrating a constitution of the transmitting electrode and the receiving electrode according to a sixteenth example.

FIG. 58 is a plan view illustrating the constitution of the transmitting electrodes and the receiving electrode according to the sixteenth example of the present invention. The explanation of the portion common with FIG. 53(b) is omitted. The numeral 417 designates a ground electrode electrically grounded, and it is arranged in a gap of the boundary portion between the transmitting electrodes 412a, 412b, 412c, 413a, 413b and 413c and the receiving electrode 411. Further, the ground electrode 417 is arranged so as to cover a periphery portion of the received signal line 411a for propagating the received signal φC.

According to the sixteenth example, the ground electrode 417 is arranged in the gap of the boundary portion between the transmitting electrodes 412a, 412b, 412c, 413a, 413b and 413c and the receiving electrode 411, so that the receiving electrode 411 and the received signal line 411a are shielded by the ground electrode 417 and are separated electrically.

For this reason, the transmitted signals φA and φB transmitted from the transmitting electrodes 412a, 412b, 412c, 413a, 413b and 413c do not leak to the receiving electrode 411, thereby preventing noise from being mixed in the receiving electrode 411 and the received signal line 411a. As a result, the S/N ratio of the received signal φC induced by the receiving electrode 411 can be improved greatly.

SEVENTEENTH EXAMPLE

The position detecting system of the electric watch according to a seventeenth example of the present invention is explained below with reference to FIG. 59.

Figure 59:
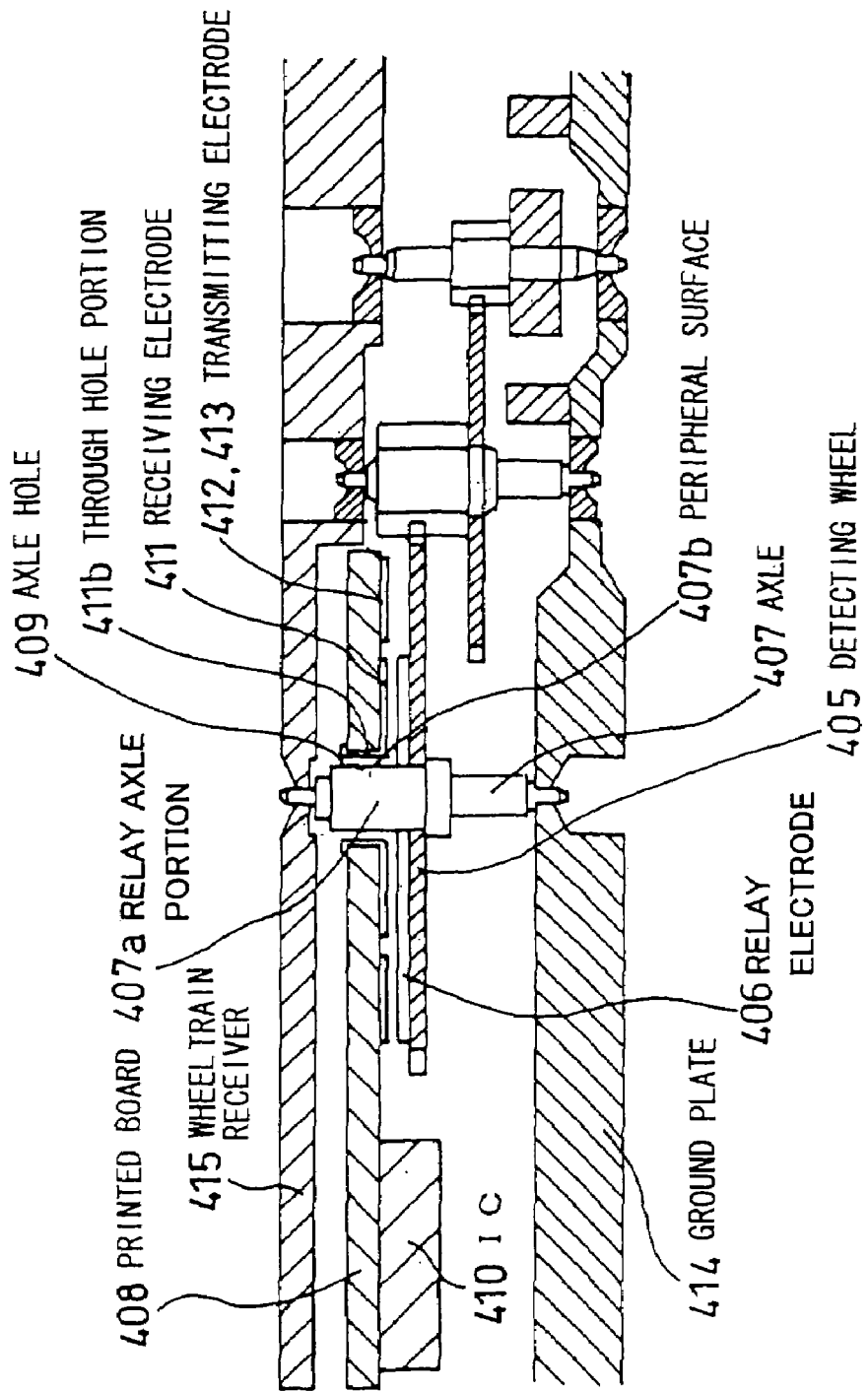
FIG. 59 is a partial sectional view of the position detecting system according to a seventeenth example.

FIG. 59 is a partially sectional view of the position detecting system of the electric watch, and the degree of the capacitive coupling between the relay electrode and the receiving electrode is improved. The explanation of the portion common with FIG. 52 is omitted.

In FIG. 59, the numeral 407a designates a relay axle portion composed of an electrically conductive member which is integral with the axle 407, and the relay axle portion 407a is electrically connected with the relay electrode 406 arranged on the rotating surface 405a of the detecting wheel 405. The numeral 411b designates a through hole portion composed of an electrically conductive member which is formed on an inner surface of the axle hole 409 of the printed board 408 and is electrically connected with the receiving electrode 411. The through hole portion 411b adjoins a peripheral surface 407b of the relay axle portion 407a in a non-contact manner.

The operation in the seventeenth example of the present invention is explained below. The relay signal (not shown) from the transmitting electrodes 412 and 413 induced by the relay electrode 406 is propagated also to the relay axle portion 407a electrically connected with the relay electrode 406. The peripheral surface 407b of the relay axle portion 407a is capacitive-coupled with the through hole portion 411b formed on the axle hole 409. For this reason, the propagated signal is propagated as the received signal φC from the peripheral surface 407b of the relay axle portion 407a to the through hole portion 411b.

On the other hand, as explained in the operation in the fifteenth example, the relay signal is propagated as the received signal φC from the relay electrode 406 also to the receiving electrode 411 formed on the printed board 408. The received signal propagated by the relay axle portion 407a is designated by φC1, and the received signal propagated by the relay electrode 406 is designated by φC2. The received signal φC input into the IC 410 is obtained in such a manner that φC=φC1+φC2. As a result, the level of the received signal φC rises, and the S/N ratio is improved, thereby effectively preventing the mis-detection of the position.

The relay signal is propagated also to the axle 407 of the detecting wheel 405 because the axle 407 is made of the electrically conductive member. The ground plate 414 and the wheel train receiver 415 which receives the upper and lower portions of the axle 407 are, however, made of the insulating member such as plastic. For this reason, noise is not mixed in the propagated signal from another parts via the ground plate 414 and the wheel train receiver 415. Further, when the ground plate 414 and the wheel train receiver 415 are made of the electrically conductive member such as metal, their bearing portions may be received by a gemstone or the like which is the insulating member.

In addition, in the case where the miniaturization of the wrist watch is strongly demanded and thus the outer size of the detecting wheel 405 should be as small as possible, the seventeenth example is extremely effective. That is to say, the receiving electrode 411 is eliminated from the printed board 408, and the received signal φC is received only by the through hole portion 411b of the axle hole 409. As a result, the relay electrode 406 on the rotating surface of the detecting wheel 405 may be opposed only to the transmitting electrodes 412 and 413, thus making the outer shape of the detecting wheel 405 small. For this reason, the wrist watch can be effectively miniaturized.

According to the seventeenth example, not only the received signal propagated between the relay electrode 406 and the receiving electrode 411 but the received signal propagated between the peripheral surface 407b of the relay axle portion 407a and the through hole portion 411b formed on the axle hole 409 is added. For this reason, the level of the received signal rises, and the S/N ratio is improved, thereby preventing the mis-detection of the position. Further, when this example is combined with the sixteenth example, the S/N ratio of the received signal is further improved, thereby further heightening the accuracy of the position detection. As a result, the position detecting system with excellent reliability can be provided.

EIGHTEENTH EXAMPLE

The position detecting system of the electric watch according to the eighteenth example of the present invention is explained below with reference to FIG. 60.

Figure 60:
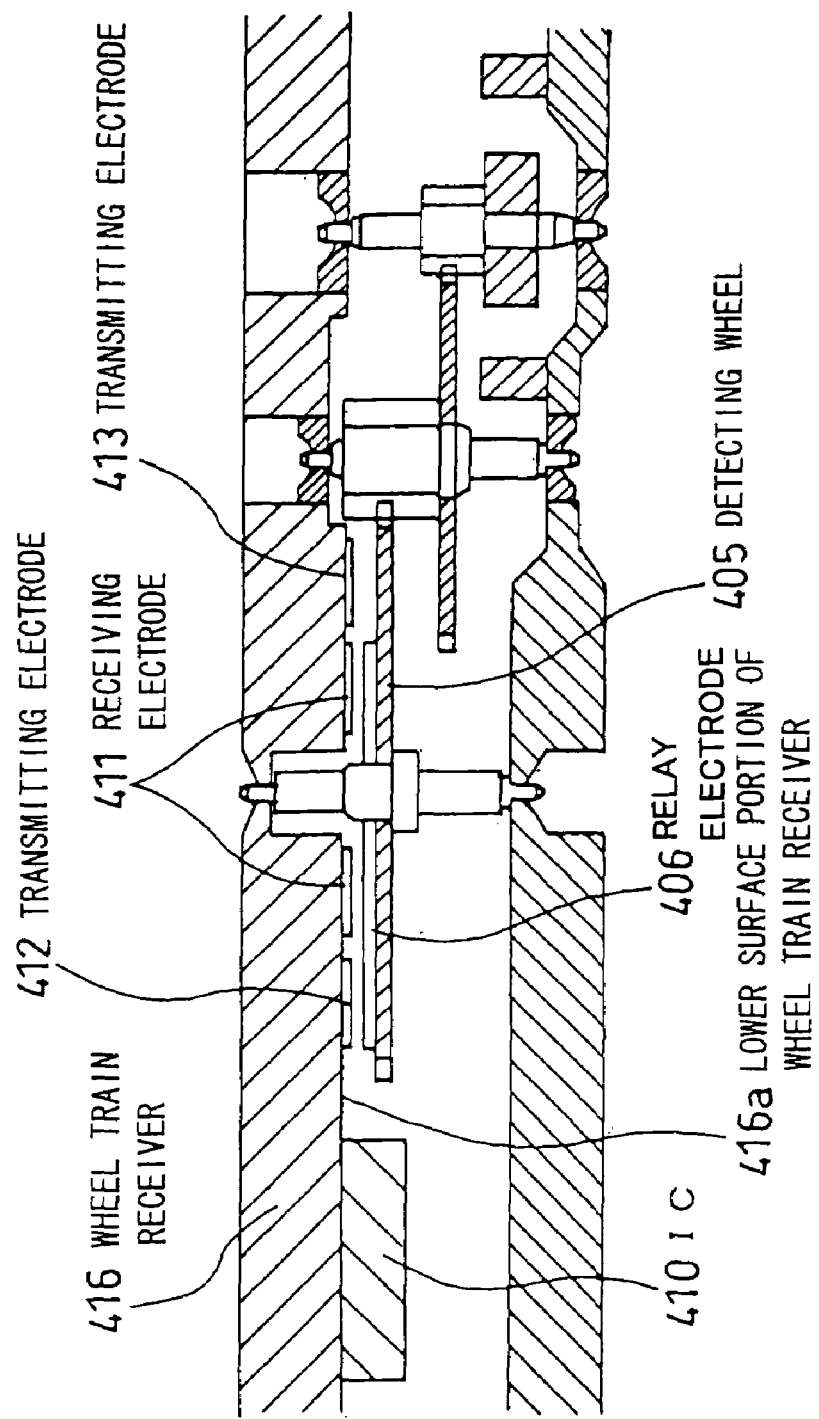
FIG. 60 is a partial sectional view of the position detecting system according to an eighteenth example.

FIG. 60 is a partially sectional view of the position detecting system of the electric watch, and the explanation of the portion common with FIG. 52 is omitted. The numeral 416 designates the wheel train receiver composed of an insulating member such as plastic similarly to the fifteenth example. An electrically conductive film is formed on a lower surface portion 416a of the wheel train receiver, and one portion of the electrically conductive film serves as the transmitting electrodes 412 and 413 and the receiving electrode 411. Further, the IC 410 is directly mounted on the lower surface portion 416a of the wheel train receiver, and the IC 410 are connected with the transmitting electrodes 412, 413 and the receiving electrode 411 and the like by the electrically conductive film.

According to the eighteenth example, since the printed board 408 in the fifteenth example is not necessary, the electric watch can be thinned, and the cost of the parts can be reduced. The wheel train receiver 416 is replaced by a printed board made of a glass-mixed member or the like with less warp, and the transmitting electrodes 412 and 413 and the receiving electrode 411 can be formed by a normal etching technique.

NINETEENTH EXAMPLE

The position detecting system of the electric watch according to a nineteenth example of the present invention is explained below with reference to FIG. 61.

Figure 61:
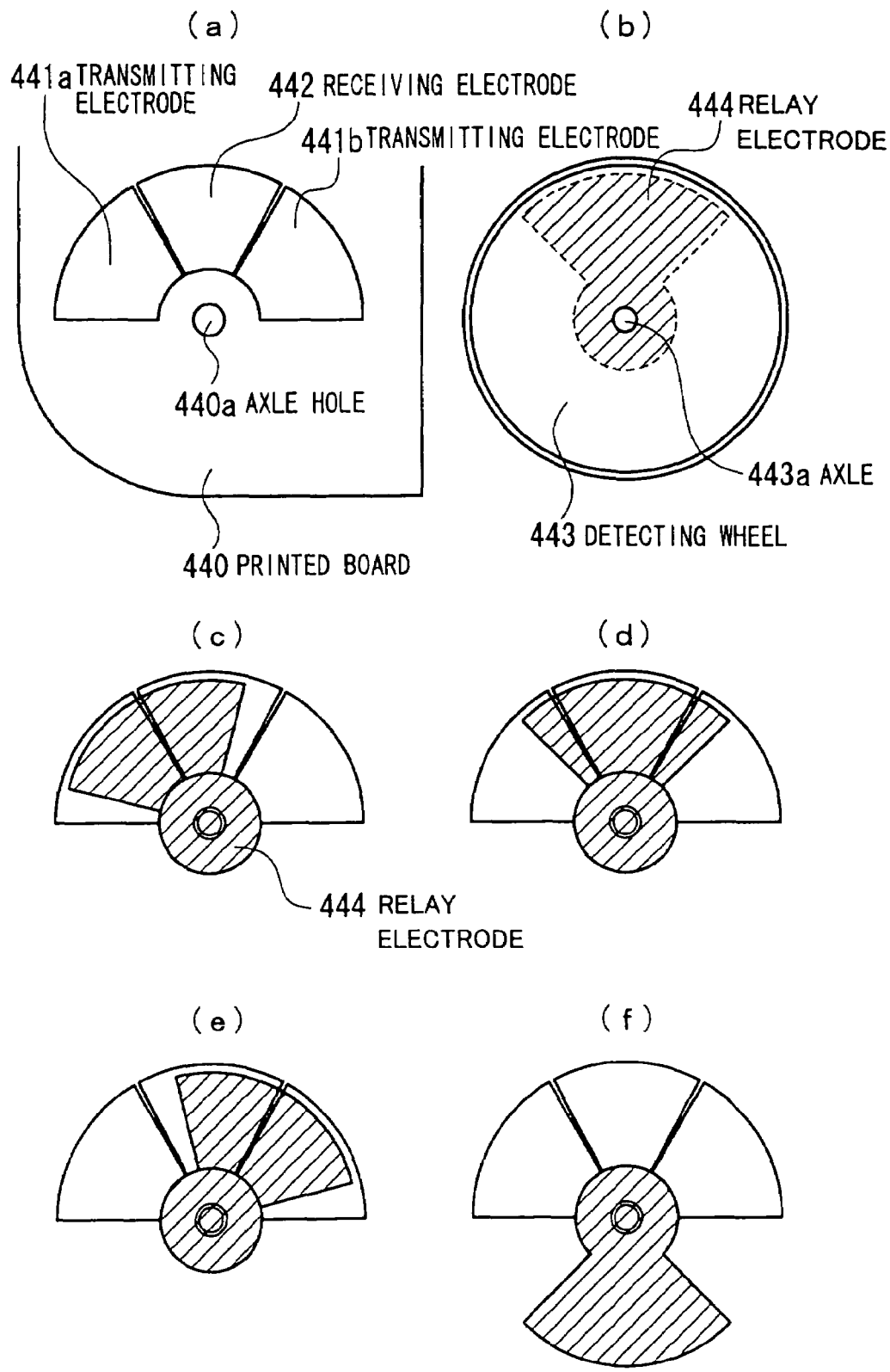
FIG. 61 is a plan view illustrating a position relationship between the transmitting electrode, the receiving electrode and the relay electrode according to a nineteenth example.

FIG. 61 is a plan view illustrating the position relationship between the transmitting electrode, the receiving electrode and the relay electrode according to the nineteenth example of the present invention. In FIG. 61(a), the numeral 440 designates the printed board composed of the insulating member, and the numeral 440a designates the axle hole provided on the printed board 440. The numerals 441a and 441b are the transmitting electrodes made of copper foil or the like having approximately fan shape. The transmitting electrode 441a transmits the transmitted signal φA, and the transmitting electrode 441b transmits the transmitted signal B. The numeral 442 is the receiving electrode made of copper foil or the like having an approximately fan shape, and it is positioned between the transmitting electrodes 441a and 441b.

In FIG. 61(b), the numeral 443 designates the detecting wheel composed of the insulating member, and the numeral 443a designates the axle. The numeral 444 designates the relay electrode composed of the electrically conductive member having an approximately fan shape, and it is arranged on the rear surface of the detecting wheel 443. The axle 443a of the detecting wheel 443 is inserted into the axle hole 440a of the printed board 440, and the detecting wheel 443 rotates in proximity to the relay electrode, the transmitting electrodes 441a, 441b and the receiving electrode 442 with the non-contact manner. For this reason, the electrical capacitive coupling between the relay electrode 444 and the transmitting electrodes 441a and 441b and the electrical capacitive coupling between the relay electrode 444 and the receiving electrode 442 is changed according to the rotation of the detecting wheel 443.

FIGS. 61(c) to 61(f) illustrate a change in the position relationship between the relay electrode 444 of the detecting wheel 443 and the transmitting electrodes 441a, 441b and the receiving electrode 442. In the state of FIG. 61(c), the relay electrode 444 is arranged so as to cross over both of a part of the transmitting electrode 441a and a part of the receiving electrode 442, and the received signal φC, whose phase advances by 45° similarly to the transmitted signal φA, is propagated to the receiving electrode 442. In a state of FIG. 61(d), the relay electrode 444 is arranged so as to entirely cover the receiving electrode 442 and to cross over both of a part of the transmitting electrode 441a and a part of the transmitting electrode 441b. The received signal φC with phase angle of 0° obtained by synthesizing the two transmitted signals φA and φB is propagated to the receiving electrode 442.

In addition, in a state of FIG. 61(e), the relay electrode 444 is arranged so as to cross over both of a part of the transmitting electrode 441b and a part of the receiving electrode 442, and the received signal φC, whose phase delays by 45° similarly to the transmitted signal φB, is propagated to the receiving electrode 442. Further, in a state of FIG. 61(f), since the relay electrode 444 is not overlapped with any one of the transmitting electrodes 441a and 441b and the receiving electrode 442, the received signal φC is a non-signal. Since the phase detecting circuit 403 can detect the moment at which the phase angle of the received signal φC becomes 0°, it can detect the moment at which the detecting wheel 443 passes through the position in FIG. 61(d). As a result, this point can be determined as the zero second original point of the detecting wheel.

According to the nineteenth example of the present invention, there is a disadvantage such that the level of the received signal φC changes according to the rotating position of the detecting wheel 443, but the shape of the transmitting electrodes can be simplified. For this reason, the manufacturing cost can be reduced. Further, the shapes of the receiving electrode 442 and the transmitting electrodes 441a and 441b are not limited to the shape similar to fan like shape, and they may have any shape as long as the received signal φC is modulated according to the rotation of the detecting wheel 443.

As is clear from the fifteenth to the nineteenth examples of the present invention, in the electric watch of the present invention, the transmitting electrodes are arranged into the approximately fan shape on the insulating member, and the receiving electrode is formed into the circular shape on the surface of the insulating member where the transmitting electrodes are formed. It is desirable that the transmitting electrodes and the receiving electrode establish the concentric position relationship.

According to this constitution, the transmitting electrodes formed into the approximately fan shape and the receiving electrode formed into the approximately circular shape establish the concentric position relationship. As a result, even if the relay electrode rotates, its adjacent area does not change, and the capacitive coupling does not change. Further, when the position is detected by the phase detection, the phases of the adjacent transmitting electrodes can be changed greatly, and it can be detected as the large phase change of the transmitting electrodes. As a result, the position detecting system with high detecting accuracy and excellent reliability can be provided.

In the present invention, the axle hole is provided on the concentric center portion of the insulating member on which the transmitting electrodes and the receiving electrode are formed, and the axle of the rotor is inserted through the axle hole. It is preferable that the rotor is adjacent to the transmitting electrodes and the receiving electrode on the insulating member in the non-contact manner so as to rotate.

According to this constitution, the axle of the rotor pierces the axle hole provided on the concentric center portion of the insulating member, so that the rotor can be rotated while it is adjacent to the transmitting electrodes and the receiving electrode on the insulating member. For this reason, the level of the received signal induced by the receiving electrode is made to be large, and the s/N ratio of the received signal can be improved.

Further, in the present invention, the relay electrode is selectively overlapped with a specified transmitting electrode of the transmitting electrodes at least not less than once while the rotor is rotating once. It is preferable example that the electrical capacity coupling between the relay electrode and the specified transmitting electrode becomes maximum.

According to this constitution, when the specified transmitting electrode of the transmitting electrodes is selectively overlapped with the relay electrode at least not less than once while the rotor is rotating once, the electrical capacitive coupling between the relay electrode and the specified transmitting electrode becomes maximum. For this reason, only the position where the electrical capacitive coupling becomes maximum is detected, so that the position detecting system with high detecting accuracy can be provided.

On the other hand, as another example in the above examples of the present invention, the axle hole of the insulating member has the through hole portion made of the electrically conductive member, and the axle of the rotor has the relay axle portion made of the electrically conductive member electrically connected with the relay electrodes. Further, the relay axle portion adjoins the through hole portion of the insulating member in the non-contact manner so that they are capacitive-coupled, and the relay signal induced by the relay axle portion can be received as the received signal by the through hole portion. According to this constitution, the relay axle portion is adjacent to the through hole portion of the axle hole on the insulating member in the non-contact manner so that they are capacitive-coupled. As a result, since the relay signal induced by the relay axle portion can also be received as the received signal by the through hole portion, the level of the received signal rises, and the S/N ratio is improved, thereby preventing the mis-detection of the position.

In the present invention, the ground electrode for electrical grounding is provided, and the ground electrode can be provided in the gap between the transmitting electrodes and the receiving electrode formed on the insulating member.

According to this constitution, since the electrical ground electrode is arranged in the gap between the transmitting electrodes and the receiving electrode formed on the insulating member, the receiving electrode is shielded by the ground electrode. For this reason, the mixing of noise into the receiving electrode can be prevented, and the S/N ratio of the received signal induced by the receiving electrode can be improved greatly.

Further, as explained in the above examples, in the fifteenth to the nineteenth examples, the integrated circuit, which includes the transmitting circuit and the position detecting circuit for detecting the position of the rotor, may be mounted on the insulating member formed with the transmitting electrodes and the receiving electrode. According to this constitution, since the integrated circuit including the transmitting circuit and the position detecting circuit can be mounted on the one and the same insulating member, the distance between the integrated circuit and the receiving electrode can be shorten, thereby preventing the mixing of noise between the integrated circuit and the receiving electrode.

In the present invention, in all the above-mentioned examples, the rotor composing the signal modulating means may be a part of the wheel train mechanism. According to this constitution, it is possible to detect the position of the wheel train mechanism, and this constitution is applicable to the hand position detection in the watch having functions, so that this constitution is applicable to zero locating of a stopwatch and locating of a functional hand.

Further, it is desirable that the wheel train mechanism may be for displaying the time information. According to this constitution, the position of the wheel train mechanism for displaying the time information can be detected, and a difference in time between the mechanical holding time and the electric holding time in the electric watch is detected. As a result, the time can be corrected into correct time, and thus this constitution is applicable to time matching of the radio wave correcting watch at the time of the reference radio wave signal reception, and the automatic time correction when the solar cell watch is returned from a power-saving mode into a normal mode.

Further, the operating mechanism can be a calendar mechanism. According to this constitution, the position of the calendar mechanism can be detected, so that a calendar structure, such that the calendar is fed by using the determined results in the odd months and the even months according to the electric holding time and thus the month-end correction is not required, can be constituted.

As is clear from the above explanations, in the position detecting system of the electric watch of the present invention, the transmitting electrode and the receiving electrode are formed on the surface of the insulating member such as one and the same printed board, and the position of the wheel train is detected by the phase detecting means utilizing the change in the electrical capacitive coupling between the transmitting electrode, the receiving electrode and the relay electrode arranged on the detecting wheel. Further, the time difference between the mechanical holding time and the electrical holding time in the electric watch can be detected so as to be corrected. For this reason, the constitution of the position detecting system is simple and is suitably thinned. Further, this system is very effective for thinning and reducing the cost of the wrist watch having the automatic correcting function to which the position detecting function is applied.

Further, in the position detecting system, since the transmitting electrode having high impedance can be driven, this system can be easily applied to power generating type electric watches which consumes low power and has insufficient power. Moreover, the shield structure is added and the receiving electrode, the relay electrode and the like are improved, so that the S/N ratio is improved, and the level of the received signal can be increased. For this reason, the position detecting system with high detecting accuracy and excellent reliability can be provided.

The invention claimed is:

1. An electric timepiece comprising:
   a transmitting circuit for generating a plurality of transmitted signals;
   a transmitting electrode for applying output signal from said transmitting circuit;
   one receiving electrode for receiving signal output from said transmitting electrode;
   a rotor, provided between said transmitting electrode and said receiving electrode, for modulating said transmitted signal output from said transmitting electrode;
   a receiving circuit for inputting a modulated signal received by said receiving electrode;
   a reference signal generating circuit for generating a reference signal for detecting position information of said rotor based on said transmitted signals output from said transmitting circuit; and
   a detecting circuit for comparing a phase of an output signal of said receiving circuit with a phase of said reference signal from said reference signal generating circuit so as to detect mechanical position information of said rotor,
   wherein said rotor is a wheel driven by a rotation movement transmitted by a wheel train from an electromechanical transducer to a rotating member to be measured having a hand display function, a wheel driven by a rotation movement transmitted by a wheel train from an electromechanical transducer to a rotating member to be measured having a date display function or a date indicator, and said detecting circuit detects a reference position of said rotating member to be measured based on said mechanical position information of said rotor.

2. The electric timepiece according to claim 1, wherein said detecting circuit has a phase detecting circuit and an amplitude detecting circuit, said detecting circuit determines a detecting range of said mechanical position information of said rotor from signal intensity information of said received signal modulated by said rotor, and detects said position information of said rotor based on phase information of said received signal modulated by said rotor.

3. The electric timepiece according claim 1, wherein phases of said plurality of transmitted signals are different each other and frequencies thereof are the same.

4. The electric timepiece according to claim 1, wherein said transmitted signals have sine waves or waveforms approximate to said sine wave.

5. The electric timepiece according to claim 1, wherein said detecting circuit is a phase detecting circuit, and said detecting circuit changes an output voltage of said detecting circuit in accordance with whether said phase of said received signal modulated by said rotor advances or delays with respect to that of said reference signal generated by said reference signal generating circuit.

6. The electric timepiece according to claim 1, wherein said detecting circuit comprising:
   delay/advance detecting means for detecting delay or advance of said phase of said received signal with respect to a phase of said reference signal as a reference of phase detection and outputting a pulse signal, pulse width of which is equal to a phase difference between said reference signal and said received signal;

charge/discharge switching means for charging a capacitor with, a charging amount being proportional to said pulse width of said pulse signal output from said delay/advance detecting means, or for discharging said capacitor with, a discharging amount being proportional to said pulse width of said pulse signal output from said delay/advance detecting means; and voltage comparing means for comparing a terminal voltage of said capacitor with a predetermined voltage so as to output a compared result.

7. The electric timepiece according to claim 1, wherein said rotor has such a constitution that conductivity or permittivity of a part of a shape or a component of said rotor is different from those in the other portion.

8. The electric timepiece according to claim 1, wherein said rotor is made of an electrically conductive metal material, a part of said electrically conductive metal material has a hole, a notch or a convexo-concave shape.

9. The electric timepiece according to claim 1, wherein said rotor is made of a non-conductive member such as plastic and an electrically conductive metal material, and a part of said metal material has a hole, a notch or a convexo-concave shape.

10. The electric timepiece according to claim 1, wherein said rotor is made of a non-conductive member such as plastic, and one part of said non-conductive member is plated with metal.

11. The electric timepiece according to claim 1, wherein said rotation movement is transmitted to a rotating member to be measured having a date display function or a date indicator, and the electric timepiece has a month-end automatic correcting function for detecting a reference position of said rotating member to be measured or said date indicator based on said mechanical position information of said rotor and automatically eliminates a month-end nonexistent day in the month based on electric calendar information held in a timepiece circuit.

12. The electric timepiece according to claim 1, wherein said reference signal generating circuit shapes said plurality of transmitted signals output from said transmitting circuit and outputs said reference signal.

13. The electric timepiece according to claim 12, wherein at least said transmitting circuit and said reference signal generating circuit are formed on one and the same circuit chip, and an output of said transmitting circuit and an input of said reference signal generating circuit are capacitive-coupled by a capacitor formed in said circuit chip.

14. The electric timepiece according to claim 12, wherein said electric timepiece further comprising a signal fine adjusting circuit for modulating at least said received signal or said reference signal based on an output signal, which is output from said detecting circuit, representing a relationship between said received signal received by said receiving circuit and said reference signal shaped by said reference signal generating circuit.

15. The electric timepiece according to claim 14, wherein said signal fine adjusting circuit finely adjusts said phase of said received signal or said phase of said reference signal.

16. The electric timepiece according to claim 14, wherein said signal fine adjusting circuit has a plurality of capacitors, a capacity value of which can be adjusted.

17. The electric timepiece according to claim 14, wherein said signal fine adjusting circuit is provided between said transmitting circuit and said transmitting electrode or between said transmitting circuit and said reference signal generating circuit.

18. The electric timepiece according to claim 14, wherein said signal fine adjusting circuit is capable of generating two or more reference signals with different phases, and said detecting circuit selects a reference signal whose phase is separated the most from a phase showing a position of said rotor so as to detect said position of said rotor using said selected reference signal.

19. The electric timepiece according to claim 1, wherein said rotor has on its rotating surface a plurality of detecting holes, each of which being provided on the respective position different from each other on said rotating surface thereof, so that an angle formed between a pair of two adjacently arranged holes to each other with respect to a rotating axis of said rotor is different from that formed between a separate pair of two adjacently arranged holes to each other with respect to said rotating axis, said transmitting electrode having first transmitting electrodes and second transmitting electrodes, said first and said second transmitting electrodes transmit different transmitted signals, respectively, said first and said second transmitting electrodes are composed of the same number of electrode pieces as that of said detecting holes, said electrode pieces of said first transmitting electrode and said electrode pieces of said second transmitting electrode are arranged alternatively into a ring shape, and when said rotor rotates once, all of said electrode pieces of either one of said first transmitting electrodes or said second transmitting electrodes, coincide with all of said detecting holes of said rotor, only one time.

20. The electric timepiece according to claim 1, wherein said rotor has a detecting hole on its rotating surface, said transmitting electrode having a first transmitting electrode and a second transmitting electrode, said first and said second transmitting electrodes transmit different transmitted signals, respectively, said first and said second transmitting electrodes are arranged into a ring shape, and when said detecting hole is on a boundary portion between said transmitting electrodes, an electrode area opposed to said detecting hole changes according to said position of said rotor.

21. The electric timepiece according to claim 1, wherein said transmitting electrode having a first transmitting electrode and a second transmitting electrode, said first and said second transmitting electrodes transmit different transmitted signals, respectively, said first and said second transmitting electrodes are arranged into a ring shape, and at least one of electrode shapes on said boundary portions of said two transmitting electrodes are different from said electrode shape on another boundary portions so that a rotating direction as well as said mechanical position information of said rotor is detected.

22. The electric timepiece according to claim 1, wherein said transmitting electrode having a first transmitting electrode and a second transmitting electrode, said first and said second transmitting electrodes transmit different transmitted signals, respectively, said first and said second transmitting electrodes are composed of the same number of electrode pieces, said electrode pieces of said first transmitting electrode and said electrode pieces of said second transmitting electrode are arranged alternatively into a ring shape, and lengths of said respective electrode pieces of one transmitting electrode in a circumferential direction are different from each other, so that said rotating direction as well as said mechanical position information of said rotor is detected.

23. The electric timepiece according to claim 1, wherein said transmitting electrode having a first transmitting electrode, a second transmitting electrode and a third transmitting electrode, said first, said second and said third transmitting electrodes are arranged into a ring shape, and said first, said second and said third transmitting electrodes simultaneously transmit transmitting signals each having different phases, respectively.

24. The electric timepiece according to claim 1, wherein either one of said transmitting electrode and said receiving electrode is provided on a printed-wiring board.

25. An electric timepiece comprising at least:
a transmitting circuit for outputting two transmitted signals with the same frequency and different phases;
a transmitting electrode having a first transmitting electrode and a second transmitting electrode arranged on an insulating member for transmitting said two transmitted signals, respectively;
a receiving electrode formed on said insulating member;
a rotor arranged so as to be opposed to said transmitting electrode and said receiving electrode; and
a relay electrode formed on a rotating surface of said rotor and provided so as to be opposed to said transmitting electrode and said receiving electrode,
wherein said two transmitting electrodes are composed of a plurality of electrode pieces, respectively, said electrode pieces of said first transmitting electrode and said electrode pieces of said second transmitting electrode are arranged alternatively into a ring shape, and an area surrounded by said transmitting electrodes is provided with said receiving electrode,
wherein said relay electrode is composed of a first area opposed to said receiving electrode and a second area provided continuously with said first area so as to be opposed to said transmitting electrode,
wherein while said rotor is rotating once, said entire second area of said relay electrode is overlapped only with all said electrode pieces of either one of said two transmitting electrodes at least once, and at this time, an electrical capacity between said relay electrode and said transmitting electrode overlapped with each other becomes maximum,
further wherein, said insulating member is provided with an axle hole into which an axle of said rotor is inserted, said axle hole is formed with a through hole made of an electrically conductive member electrically connected with said receiving electrode, said axle of said rotor is formed with a relay axle portion made of an electrically conductive member electrically connected with said relay electrode, said relay axle portion adjoins said through hole portion of said insulating member in a non-contact manner so as to form electrical capacitive coupling, and said receiving electrode receives a signal via said electrically capacitive coupling.

* * * * *

UNITED STATES PATENT AND TRADEMARK OFFICE
CERTIFICATE OF CORRECTION

| | | |
|---|---|---|
| PATENT NO. | : 7,436,737 B2 | |
| APPLICATION NO. | : 10/493898 | |
| DATED | : October 14, 2008 | |
| INVENTOR(S) | : Fukuda et al. | |

It is certified that error appears in the above-identified patent and that said Letters Patent is hereby corrected as shown below:

Col. 7, line 46, delete "spacial" and insert --spatial-- (Spec., p. 15, line 23).

Signed and Sealed this

Third Day of March, 2009

JOHN DOLL
*Acting Director of the United States Patent and Trademark Office*